United States Patent [19]
Kurtz et al.

[11] Patent Number: 6,015,792
[45] Date of Patent: *Jan. 18, 2000

[54] SPECIFIC EATABLE TASTE MODIFIERS

[75] Inventors: Robert J. Kurtz, New York, N.Y.;
William D. Fuller, San Diego, Calif.

[73] Assignee: Bioresearch, Inc., Alexandria, Va.

[*] Notice: This patent is subject to a terminal disclaimer.

[21] Appl. No.: 09/042,148

[22] Filed: Mar. 13, 1998

Related U.S. Application Data

[62] Division of application No. 08/877,472, Jun. 17, 1997, which is a division of application No. 08/462,265, Jun. 5, 1995, Pat. No. 5,700,792, which is a division of application No. 08/451,063, May 25, 1995, Pat. No. 5,637,618, which is a continuation of application No. 08/067,537, May 26, 1993, abandoned, which is a continuation-in-part of application No. PCT/US92/10179, Nov. 24, 1992, and a continuation-in-part of application No. 07/799,207, Nov. 27, 1991, abandoned, which is a continuation-in-part of application No. 07/531,388, Jun. 1, 1990, Pat. No. 5,232,735.

[51] Int. Cl.[7] .......................... A61K 38/05; A01N 37/14; A01N 37/28; C07C 229/08; C07C 205/02

[52] U.S. Cl. ........................... 514/19; 514/566; 514/562; 514/616; 562/433; 562/553; 562/561; 562/562

[58] Field of Search ............................. 514/19, 562, 566, 514/616; 562/433, 553

[56] References Cited

U.S. PATENT DOCUMENTS

| | | | |
|---|---|---|---|
| 4,910,031 | 3/1990 | Kurtz et al. | 426/96 |
| 5,631,038 | 5/1997 | Kurtz et al. | 426/649 |
| 5,637,618 | 6/1997 | Kurtz et al. | 514/568 |
| 5,643,894 | 7/1997 | Kurtz et al. | 514/113 |
| 5,643,955 | 7/1997 | Kurtz et al. | 514/561 |
| 5,643,956 | 7/1997 | Kurtz et al. | 514/561 |
| 5,646,122 | 7/1997 | Kurtz et al. | 514/19 |
| 5,650,403 | 7/1997 | Kurtz et al. | 514/252 |
| 5,654,311 | 8/1997 | Kurtz et al. | 514/274 |
| 5,665,755 | 9/1997 | Kurtz et al. | 514/398 |
| 5,700,792 | 12/1997 | Kurtz et al. | 514/171 |
| 5,703,053 | 12/1997 | Kurtz et al. | 514/27 |

FOREIGN PATENT DOCUMENTS 052631 of 1978 Japan.

OTHER PUBLICATIONS

CA Abstract, 89:152571, for JP 53052631 (1978).

*Primary Examiner*—Johann Richter
*Assistant Examiner*—Dominic Keating
*Attorney, Agent, or Firm*—Larson & Taylor

[57] ABSTRACT

Ingestible compounds which are substantially tasteless and which have been found to be effective reducers or eliminators of undesirable tastes for eatables.

40 Claims, No Drawings

SPECIFIC EATABLE TASTE MODIFIERS

This application is a division of application Ser. No. 08/877,472 filed Jun. 17, 1997; which is a division of 08/462,265 filed Jun. 5, 1995 now U.S. Pat. No. 5,700,792; which is a division of Ser. No. 08/451,063 filed May 25, 1995 now U.S. Pat. No. 5,637,618; which is a continuation of Ser. No. 08/067,537 filed May 26, 1993 now abandoned; which is a continuation-in-part of International Application No. PCT/US92/10179 filed Nov. 24, 1992; and a continuation-in-part of application Ser. No. 07/799,207 filed Nov. 27, 1991, now abandoned which in turn is a continuation-in-part of application Ser. No. 07/531,388 filed June 1, 1990 now U.S. Pat. No. 5,232,735.

BACKGROUND OF THE INVENTION

This invention relates in general to taste modifying compounds. More particularly it relates to tastands, as such term is used hereinbelow, to reduce or eliminate undesirable tastes, as such term is used hereinbelow.

There are numerous compounds that are known to be salty but have problems associated with their use as salt substitutes. Potassium chloride has a pronounced strong bitter undesirable taste, as such term is used hereinbelow, and ammonium chloride has, at least as sensed in some people, a fishy taste associated with it. Lithium chloride, although a somewhat better tasting salt, is highly toxic. To date there is no universally satisfactory salty tasting substitute for the sodium ion.

The desirability of reducing the sodium ion intake of humans is well documented. An excessive intake of sodium ion has been linked to high blood pressure and premature heart attack. This problem has been addressed by numerous researchers in a variety of ways over the past two decades.

At the current time, reduction of sodium ion intake is achieved via a combination of abstinence and/or the substitution of potassium chloride for sodium chloride and/or mixing sodium chloride with fillers so that less sodium chloride is used on the eatable, as defined hereinbelow, although the volume of material added to the eatable is the same. In addition, for materials that are coated with a surface salt such as for example potato chips, it is known that smaller particle size for the sodium chloride results in a saltier taste perception, and therefore less salt need be added to obtain an equal level of salt perception.

There are a variety of products on the market today utilizing potassium chloride as a saltening agent. All of these salt substitutes rely on other ingredients which are mixed with the potassium chloride to mask the bitter undesirable taste, as such term is used hereinbelow, of potassium chloride. These highly flavorful ingredients consist of items such as onion, garlic, paprika, red pepper, chili powder and many other spices. None of these mixtures or potassium chloride itself has found wide-spread acceptance, probably because the bitter taste of potassium ion is still detectable.

In addition to reducing sodium ion intake by the substitution of sodium chloride by potassium chloride, there are numerous other examples of compounds containing sodium ions used in the food industry which could benefit by the substitution of potassium ion for sodium ion if the bitter taste associated with potassium ion were eliminated. For example, sodium baking soda or baking powder could be substituted with potassium baking soda and potassium baking powder, respectively, in products requiring leavening agents. A few more examples of substitutions which could be made are:

A. monopotassium glutamate for monosodium glutamate in the case of flavoring, and, B. potassium nitrate or nitrite for the corresponding sodium nitrate or nitrite in the case of preservatives, and, C. potassium benzoate, potassium sulfate or sulfite in place of corresponding sodium salts in the case of preservatives would also be highly desirable.

In addition, numerous eatables, as defined hereinbelow, on the market today have a naturally bitter taste and/or undesirable taste, as such terms are used hereinbelow. Many of these materials, as currently used, have the bitter taste or aftertaste partially masked by additives, such as flavorings similar to those stated above. Many of these materials are still bitter and/or still have an aftertaste and could benefit by having a tastand, as such term is used hereinbelow, mixed or ingested along with them to eliminate or substantially reduce the undesirable taste(s), as such term is used hereinbelow. Such eatables as for example, pharmaceuticals, antibiotics, pain killers, aspirin, codeine, ibuprofen, acetaminophen, caffeine, and unsweetened chocolate, and sweeteners, as such term is used hereinbelow, can have their undesirable tastes, as such term is used hereinbelow, reduced and/or eliminated as well as having their palatability enhanced by the use of a tastand, as such term is used hereinbelow. In general, any eatable which has a naturally undesirable taste, as such term is used hereinbelow, should be able to be rendered more palatable by the addition of an appropriate tastand, as such term is used hereinbelow.

SUMMARY OF THE INVENTION

Differences in taste perception between individuals seem to be common. There are more than just the basic or "true" tastes of sweet, sour, bitter, umami, and salty. A few examples of these other tastes are alkaline, astringent, tangy, dry, sharp, cool, hot, burning, acidic, spicy, pungent, and/or metallic.

As used herein and in the appended claims, "undesirable taste(s)" shall mean any taste which is sweet, bitter, sour, alkaline, astringent, tangy, dry, sharp, cool, hot, burning, acidic, spicy, pungent, woody, smokey, umami and/or metallic. Such undesirable taste shall include any and all tastes, if such taste(s) is unwanted and include any and all aftertaste (s), if such aftertaste is unwanted.

There can be more than one perception of a single taste, whether such taste is a "true" taste or another taste. There are a number of different "bitter" tastes that can be noted by some individuals. This can be demonstrated by the following:

Some tastands which reduce or substantially eliminate the off-taste of:
1. For example, caffeine, may have little or no effect on a pharmaceutical and/or the off-taste of KCl, or,
2. For example, L-aspartyl-L-phenylalanine methyl ester (Aspartame®) may have little or no effect on the off-taste of another high intensity sweetener such as saccharin.

Some specific examples of these effects are:
A. L-Aspartyl-L-phenylalanine will have a substantial effect on the off-taste associated with L-aspartyl-L-phenylalanine methyl ester (Aspartame®), while it has less effect on the off-taste associated with saccharin,
B. Taurine has a substantial effect on the off-taste of saccharin while it has little or no effect on the off-taste associated with L-aspartyl-L-phenylalanine methyl ester (Aspartame®).

C. The burning after-taste associated with some liquors can be substantially eliminated with the use of potassium 2,4-dihydroxybenzoate while L-aspartyl-L-phenylalanine and taurine have considerably less of an effect.

More specific examples of this effect are set forth in the following table. The concentrations necessary to obtain these effects are dependent upon the specific tastand and material and vary widely from example to example in the table. The effects summarized in the table provide a further indication of the existence of different bitter tastes. Thus as illustrated, L-aspartyl-L-phenylalanine blocks the bitter taste of KCl but has little effect on the bitterness associated with caffeine. In contrast, N-(p-cyanophenylcarbamoyl)-aminomethanesulfonic acid reduces the bitter taste of caffeine but is not effective against the bitter taste of KCl. A plausible conclusion is that separate receptors and/or independent sites on one or more receptor are involved in the bitter taste sensation.

| SPECIFIC MATERIAL | REDUCTION OF THE TASTE ASSOCIATED WITH | | |
|---|---|---|---|
| | KCl | SUCROSE | CAFFEINE |
| AP* | YES | NO | NO |
| TAURINE | YES | NO | NO |
| K-2,4-DHB** | YES | NO | NO |
| N-CN-$-ASP-PHE*** | YES | NO | YES |
| N-NO$_2$-$-ASP-PHE**** | YES | NO | YES |
| LACTISOLE***** | YES | YES | YES |
| N-CN-$-U-SO$_3$ ****** | NO | YES | YES | where:
  *L-aspartyl-L-phenylalanine
  **potassium 2,4-dihydroxybenzoate
  ***N-(p-cyanophenylcarbamoyl)-L-aspartyl-L-phenylalanine
  ****N-(p-nitrophenylcarbamoyl)-L-aspartyl-L-phenylalanine
  *****2-(4-methoxyphenoxy)propionic acid
  ******N-(p-cyanophenylcarbamoyl)-aminomethanesulfonic acid.

It will be clear to anyone skilled in the art that the above table is not all inclusive as to tastands and/or tastes.

As used herein and in the appended claims, a "taste" shall mean any taste which is salty, bitter, sweet, sour, alkaline, umami, astringent, tangy, dry, sharp, cool, hot, burning, acidic, spicy, pungent and/or metallic. Such taste shall include any and all taste(s) as well as any and all aftertaste(s). Once again this list is not all inclusive as one skilled in the art would recognize.

As used herein an "eatable(s)" shall mean any material ingested. Eatables shall include, but not be limited to, materials ingested by humans, other mammals, fish, birds, and other animals.

By the term "substantially tasteless" as used herein and the appended claims is meant a compound that has substantially no taste upon initial ingestion at the levels that are appropriate to be a tastand. The aftertaste, if any, is not included in this definition.

By the term "sweetener" as used herein and the appended claims is meant any material which gives a sweet perception, including but not limited to:
  A. monosaccharides, including but not limited to aldoses and ketoses beginning with trioses, including but not limited to glucose, galactose, and fructose,
  B. compounds generically known as sugars, which include but are not limited to mono-, di- and oligosaccharides including but not limited to sucrose, maltose, lactose, etc,
  C. sugar alcohols which include but are not limited to sorbitol, mannitol, glycerol,
  D. carbohydrates and polysaccharides which include but are not limited to polydextrose and maltodextrin,
  E. high intensity sweeteners.

As used herein and the appended claims "high intensity sweeteners" shall include but are not limited to:

L-aspartyl-L-phenylalanine methyl ester (Aspartame®) and other related dipeptide sweeteners, saccharin, L-aspartyl-D-alanine-N-(2,2,4,4-tetramethyl thiatan-3-yl) amide (Alitame®), 1,6-dichloro-1, 6-dideoxy-β-D-fructofuranoysl-4-chloro-4-deoxy-α-D-galactopyranoside (Sucralose®), 6-methyl-1,2,3-oxathiazin-4(3H)-one 2,2-dioxide (Acesulfame®), 6-methyl-1,2,3-oxathiazin-4(3H)-one 2,2-dioxide potassium salt (Acesulfame-K®), cyclohexylsulfamic acid (Cyclamatee), N-(L-aspartyl)-N'(2,2,5,5, tetramethylcyclopentanoyl)1,1-diaminoethane and its related compounds, guanidinium class sweeteners, dihydrochalcone class sweeteners, stevioside, miraculin and thaumatin, and their physiologically acceptable salts. Many more sweeteners are described in the following publications, which are hereby incorporated by reference:

1. Walters, D. E., Orthoefer, F. T., and DuBois, G. E., (Ed.), "Sweeteners Discovery, and Molecular Design, and Chemoreception," ACS Symposium Series 450, American Chemical Society, Washington, D.C., 1991, and
2. Grenby, T. H., "Progress in Sweeteners," Elsevier Applied Science Series, Elsevier Science Publishing, London and New York, 1989.

The authors recognize that this list, or any other list, is not and cannot be all inclusive.

By the term "low intensity sweetener" as used herein and the appended claims is meant any sweetener except a high intensity sweeteners.

By the term "masker" as used herein and the appended claims is meant any flavorful eatable which is used to cover and/or disguise and/or obscure an undesirable taste. Two examples of eatables which are commonly used as maskers are sweeteners and spices such as onion, garlic, paprika, red pepper, chili powder, etc.

By the term "low calorie eatable" or "low calorie formulation" as used herein and the appended claims is meant any eatable in which the eatable has been purposely formulated for the reduced calorie market. Typically this has resulted in greater than twenty-five percent (>25%) of the calories having been removed from said eatable that would have been present in the regular non-low calorie formulation.

The term "tastand" as used herein and the appended claims means an eatable, except for:

1. the class of compounds shown in the following figure:

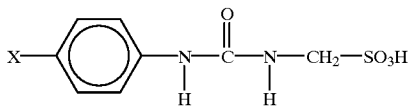

Wherein X represents H, CHO, CN, $CO_2C_1$–$C_3$alkyl, $COC_1$–$C_3$alkyl, $CONH_2$, Br, Cl, F, I, or $NO_2$ or physiologically acceptable salts thereof.

and then as applied only to the case of organic bitter, and,

2. L-glutamyl-L-glutamic acid (or salts thereof) which when mixed with or when ingested along with another eatable said eatable having an undesirable taste(s), will eliminate or substantially reduce said undesirable taste(s) without introducing a taste of its own at said level of usage.

Tastands can also be salt tastands. Tastands have the property that they will block one undesirable taste for example, bitter, and/or in some cases at the same time another undesirable taste. A specific tastand may have its own particular taste but its ability to block an undesirable taste occurs at a concentration below that at which its own particular taste is perceptible. Tastands may uncover tastes and/or off-tastes that were present in the eatable before the addition of the tastand. A tastand will not introduce any substantial taste and/or off-taste of its own. This property differentiates tastands from masking materials. For example to determine if a tastand is a bitter blocker it could be added to a solution of a bitter material such as KCl. If the material is a tastand it will block or substantially reduce the undesirable taste of KCl before it imparts any significant taste of its own. It is understood that a tastand may have the ability to block one undesirable taste more effectively than another undesirable taste. Some tastands may block only one undesirable taste effectively. A given tastand may, for example, block the perception of bitter at a level of 10–20 ppm but require 1000–10,000 ppm in order to effectively block another undesirable taste and/or tastes or it may not block the perception of another undesirable taste or tastes at any concentration. This relative effectiveness or inability to block certain tastes at all will vary from tastand to tastand and/or with concentration of the same tastand. Some specific tastands may block tastes that are not undesirable in certain specific applications such as sweet. Some tastands when added to an eatable may increase the perception of another taste for example the level of saltiness of the eatable. The blocking of an undesirable taste may allow in some cases an increased sensation of another taste. In this particular instance the increased salt sensation that is perceived by the addition of a tastand is allowing the tastand to act as if it were a salt enhancer.

A "salt tastand" as used herein and in the appended claims means a tastand which, is itself salty or is combined with another salty eatable, and when mixed with or when ingested along with an eatable possessing an undesirable taste will reduce or eliminate the perceived undesirable taste(s) of said eatable. Examples of such salty eatables that could be used with a tastand to make a salt tastand would be NaCl, KCl, or $NH_4Cl$.

As used herein and the appended claims many of the tastands and eatables are molecules named variously as salts and/or acids. It is obvious to one skilled in the art that these terms are arbitrary and virtually any acid can be a salt and vice versa depending upon the macroenvironment and/or microenvironment that the molecule is in. This environment can, in some instances, change the efficacy of a particular tastand. For example, 2,4-dihydroxybenzoic acid is not nearly as potent a tastand of the off-taste of KCl as is potassium 2,4-dihydroxybenzoate. (In some specific acid environments the potassium 2,4-dihydroxybenzoate may lose some of its effectiveness.) Consequently, throughout the body of this patent and the appended claims, it should be understood the recitation of acid and/or base refers also to the physiologically acceptable salts and the recitation of a salt refers to its corresponding acid and/or base.

The solubility of the tastand in water may not be sufficient to demonstrate the blocking ability. In this case the tastand's solubility could be increased by the use of other substances to help this lack of solubility. Ethyl alcohol is one example of a material which can be used to increase the solubility of potential tastands to be used in the above referenced tastand test.

Surfactants can affect the tastand by either increasing or decreasing the effectiveness of the tastand. As used herein and in the appended claims, a "surfactant" shall mean an amphipathic molecule. Such surface active agents shall include but not be limited to soaps, and/or detergents, whether ionic or non-ionic, and/or membrane lipids. Some surfactants can increase the effectiveness of some tastands while the same surfactant may lessen the effectiveness of other tastands or not affect that particular tastand at all. Surfactants may affect each tastand differently. The surfactant that affects one particular tastand in a positive, negative or neutral sense may affect another tastand differently (i.e. a positive, negative or neutral sense and not necessarily in the same way).

Different transformations, as such term is used hereinbelow, of a material may also have a profound effect on its tastand character.

Many of the above tastand principles can be demonstrated with potassium 2,4-dihydroxybenzoate (potassium β-resorcylate). This material in about one to two percent (1–2%) w/v solution is sweet. When potassium 2,4-dihydroxybenzoate is combined with KCl at, for example, 0.25% to 0.50% by weight relative to the KCl (depending upon the individual's sensitivity to bitter) it will virtually eliminate the bitterness associated with the potassium chloride. (This means that in an eatable containing one percent (1%) KCl the amount of potassium 2,4-dihydroxybenzoate that would be needed would be only 25 to 50 ppm.) Potassium 2,4-dihydroxybenzoate is also a tastand for the metallic taste associated with saccharin. If 25 to 50 milligrams of potassium 2,4-dihydroxybenzoate is added to a can of soda sweetened with saccharin (69 to 138 ppm of potassium 2,4-dihydroxybenzoate relative to the soda) the metallic taste is substantially reduced or eliminated allowing other flavors in the soda to come through. In the above examples (25–138 ppm) potassium 2,4-dihydroxybenzoate is a tastand because of its ability to block bitter taste at concentrations where it by itself is substantially tasteless. Potassium 2,4-dihydroxybenzoate is sweet only at significantly higher concentrations. In contrast, sucrose is not a tastand in that a 2% solution is sweet but even at this level the bitterness of KCl is not substantially diminished. Sucrose would be a masking material under the current definitions.

The use of additives to debitter eatables has been attempted by others. Recently, a fairly comprehensive approach to this goal was reported in "Practical Debittering Using Model Peptides and Related Compounds" by Tamura M, Mori N, Miyoshi T, Koyama, et al in Agric. Biol. Chem. 54, (1) 41–51 (1990). The authors examined the following classes of compounds and strategies to debitter solutions of amino acids, amino acyl sugars and peptides:

A. Chemical modification.
B. Masking agents such as cyclodextrins and starch.
C. Proteins and peptides such as skim milk, soybean casein, whey protein concentrate or casein hydrolysates.
D. Fatty substances.
E. Acidic amino acids.

Chemical modification of bitter tasting materials led to reduced bitterness but the materials were not tastands because the chemical modifications generally led to derivatives with their own characteristic undesirable taste. Case studies 2–4 were based on a strategy of the direct interaction of the additive with the undesirable taste component of an eatable in order to prevent said undesirable taste component from reaching the bitter taste receptor. In case study 5, the authors used molar equivalents of "acidic amino acids" or taurine (the authors state that, "taurine, of course, is not an acidic amino acid although it has a sulfonyl group and shifts to the acidic region") to reduce bitterness.

The paper reports that under the conditions tested, the acidic amino acids removed some of the bitter taste but conferred their own sour taste to the test solution. Taurine, according to FIGS. 4 and 5 of the paper was ineffective at debittering solutions of Arg, Phe, methyl,2,3-di-O-(1-phenylalanyl)-α-D-glycopyranoside, Phe-Phe, or Arg-Pro-Phe-Phe at from 0.33 to 1.5 molar equivalents. The results from FIGS. 4 and 5 are internally inconsistent with respect to valine tested in a solution at the 300 mM level. While FIG. 4 shows a less than fifty percent (<50%) reduction of bitterness when 0.333 equivalents of taurine was added to the test solution, FIG. 5 shows >60% reduction when 0.22 equivalents of taurine (67 mM) was added to the solution. The inconsistent result of the taste tests indicate that Tamura did not contemplate an important teaching of the present invention and led us to repeat the taste test. It is also clear that Tamura did not understand or contemplate the effect that a tastand can have on a taste test. This application teaches this effect hereinbelow.

As stated above, we have repeated the taste test for valine. This was done in a 300 mM solution of valine (conditions of Tamura et al.) at various levels of taurine reported in the Tamura paper. The results we obtained were confirmed by an independent testing laboratory. The independent test laboratory's results are summarized in the following table:

| CONCENTRATION OF TAURINE | MEAN VALUE OF THE BITTERNESS OF A 300 mM SOLUTION OF VALINE |
|---|---|
| CONTROL (0 TAURINE) | 9.6 |
| 66 mM | 9.5 |
| 200 mM | 13.3 |
| 300 mM | 11.4 |

The data show that taurine has virtually no effect on the bitterness of valine. When the tasting was repeated with taurine on an equal molar basis with the valine (three times the amount shown in FIG. 4 of Tamura and sixteen times that amount shown in FIG. 5), there was still >50% of the bitterness remaining in the valine test solution. We did not repeat the aspartic acid and glutamic acid taste tests as they, under the conditions of Tamura, et al., are not tastands. Even at 300 mM level the paper shows that taurine was ineffective at "masking of the bitterness" of almost all solutions tested. The high concentrations used in these investigations suggest that the authors intended to mask the bitter taste. The authors did not understand or even contemplate the concept of tastands.

The underlying assumption of any experiment that has a control built into the methodology, is that the controls are accurate and repeatable. If blockers are used randomly, the controls are neither accurate nor repeatable. If a so called control is ingested followed by a food with a blocker, the subsequent tasting of the previously ingested control will be different. If the authors of the Tamura study had realized this they probably could have designed the protocols to avoid these problems and the reported results would have been accurate and repeatable.

In contrast to the above it is the teaching of the present application that a tastand, as defined hereinabove, can prevent bitter components from interacting with the taste receptor at concentrations where the tastand is tasteless or substantially tasteless. Prevention is by a direct interaction with the receptor site, as such term is used herein, to prevent or substantially eliminate:

A. the interaction of the undesirable tasting molecule(s) with the taste receptor and/or
B. the recognition of the undesirable taste.

Glenn Roy, Chris Culberson, George Muller and Srinivasan Nagarjan in U.S. Pat. No. 4,944,990 dated Feb. 19, 1991, described the use of N-(sulfomethyl)-N'-arylureas to inhibit or suppress sweet taste and organic bitter when mixed with sweet and/or organic bitter. (The authors specifically state that their material does not affect the off-taste of inorganic bitter.) The example that these authors used to show that there was a perceived bitterness reduction was a 0.11% (1.1 mg/mL) caffeine solution to which 4 mg/mL of N-(sulfomethyl)-N'-arylurea was added. Even while adding a four hundred percent (400%) excess of the bitter reducing material compared to the bitter eatable, the Roy et al resulted in only fifty percent (50%) reduction of perceived bitterness.

We have demonstrated that low concentrations (0.05%) of potassium 2,4-dihydroxybenzoate can eliminate the bitter aftertaste of KCl and the bitter aftertaste of saccharin. Only at much higher concentrations is potassium 2,4-dihydroxybenzoate sweet tasting. Similarly, according to our thesis, taurine should be a tastand and we have found, in contrast to the teaching of Tamura, et al., that taurine at five percent (5%) (3% on a molar basis) relative to KCl will eliminate or substantially reduce the off-taste of KCl. This would mean that in a one percent (1%) solution of KCl (10 mg/mL) only 0.5 mg/mL of taurine would be needed and if the blocker were potassium 2,4-dihydroxybenzoate only 0.05 mg/mL of blocker would be needed.

Similarly if ten (10) mg of taurine is added to a can of soda (354 mL of soda per can; 28 ppm taurine) sweetened only with saccharin the off-taste of the saccharin is substantially reduced or eliminated, while the sweet taste is relatively unaltered.

The present teaching is analogous to a competitive inhibition with a binding site of the receptor(s) and/or a noncompetitive inhibition with the site(s) that influences the receptor. As such, one of our teachings is that the tastand can be effective at a low tastand concentration when compared to the eatable with the undesirable taste. This distinction is not a minor teaching as in practical terms it would be impossible to add more of the debittering material than the bitter materials. If the Tamura paper's lower level of proposed use for taurine (0.5 equivalents of taurine) is added to a one percent (1%) KCl solution, the resultant solution has a pronounced off-taste which was not present when only 0.03 equivalents (0.5% by weight relative to the KCl) was used. (If even the lowest level of taurine which was proposed in the Tamura paper is added to water, the water has an off-taste.) The off-taste of the taurine when added to the KCl solution is even more pronounced at the 1.0 and 1.5 equivalent levels reported in the paper. Taurine is not a tastand at the usage levels proposed in the Tamura article. The Tamura article gives no indication that reducing the levels to ⅕ to ¹⁄₁₀₀ of their proposed levels will give better and more desirable taste test results.

According to the authors of the above referenced Tamura article the "debittering of peptides did not seem to work." The authors there concluded "However, even 1.5 equivalent of acidic amino acids did not work. Probably, we have to discuss elsewhere the order of attachment of taste functional groups to taste receptors sites."

The teachings in this application clearly show that the debittering of peptides does work. If five (5) to seven and one half (7½) mg of L-aspartyl-L-phenylalanine is added to a soda sweetened only with L-aspartyl-L-phenylalanine methyl ester (Aspartame®) (354 mL of soda per can (14 to 21 ppm)) the off-taste of the L-aspartyl-L-phenylalanine methyl ester (Aspartame®) is reduced or substantially eliminated. The L-aspartyl-L-phenylalanine that is added as a tastand to the material sweetened with the L-aspartyl-L-phenylalanine methyl ester (Aspartamee) is in addition to the amount of L-aspartyl-L-phenylalanine that may or may not be present from the breakdown product of the L-aspartyl-L-phenylalanine methyl ester (Aspartame®) or as a manufacturing impurity. The use of L-aspartyl-L-phenylalanine as a tastand is an unanticipated result that was not previously known or contemplated. In fact while L-aspartyl-L-phenylalanine is one of the breakdown products of L-aspartyl-L-phenylalanine methyl ester (Aspartame®), the breakdown of the L-aspartyl-L-phenylalanine methyl ester (Aspartame®) has not been considered a desirable occurrence. Both the manufacturers and users of the L-aspartyl-L-phenylalanine methyl ester (Aspartame®) go to great lengths to prevent this degradation. They attempt to do this by adjusting the formulations of the products in which the material is used. In addition, in the case of the manufacturer the undesirable breakdown of the product can be slowed down by selling the material in a dry state, as well as by the purification of the material. (When L-aspartyl-L-phenylalanine is present as a manufacturing impurity it is typically present in an amount less than one percent (<1%) of the L-aspartyl-L-phenylalanine methyl ester.) The above example of the addition of five (5) to seven and one half (7½) mg of L-aspartyl-L-phenylalanine would be about four percent (4%) of the L-aspartyl-L-phenylalanine methyl ester that has been used to sweeten the soda. Examples of the products that could be found from the breakdown of the L-aspartyl-L-phenylalanine methyl ester in the soda are α-L-aspartyl-L-phenylalanine, β-L- aspartyl-L-phenylalanine, methanol, L-aspartyl-L-phenylalanine diketopiperazine, L-phenylalanine, L-aspartic acid, L-phenylalanine methyl ester and P-L-aspartyl-L-phenylalanine methyl ester. The ratio of these and other possible breakdown products will vary according to the conditions of storage (time and temperature) as well as the soda's specific composition its pH, etc.) The present invention teaches the use of the breakdown products, whether such breakdown occurs deliberately or accidently, of the L-aspartyl-L-phenylalanine methyl ester (Aspartame®) into one or more tastand(s). Another example of a breakdown product of the L-aspartyl-L-phenylalanine methyl ester (Aspartame®) that is a tastand is β-L-aspartyl-L-phenylalanine.

If the soda is sweetened with both L-aspartyl-L-phenylalanine methyl ester (Aspartame®) and saccharin then two tastands may be needed to reduce or substantially eliminate the off-taste of the two high intensity sweeteners. For example both taurine and L-aspartyl-L-phenylalanine could be used. The levels of the tastands that would be needed would depend on the relative levels of the high intensity sweeteners that were used in the soda.

Combination of tastands are sometimes preferred. On potato chips, a salt consisting of a ratio of eighty percent (80%) KCl and twenty percent (20%) NaCl with taurine at five percent (5%) relative to the KCl and three percent (3%) L-aspartyl-L-phenylalanine is sometimes preferred to a single tastand. Such single tastand could be for example taurine, L-aspartyl-L-phenylalanine or potassium 2,4-dihydroxybenzoate.

The results of our tastings have confirmed that any methodology that employs a random presentation of eatables both with and without blockers is flawed because the random presentation of eatables with and without blockers causes the "controls" to move. The taste evaluation of the controls will be altered by the use of the blockers in the same randomized tasting. This "moving" of the controls will occur because the blockers are consumed before the eatables that do not contain the blockers. (If an eatable that was found to be bitter in a previously conducted taste test were presented to the panelist at or near the end of the tasting that contained a tastand, the typical result would be that the previously bitter food is no longer nearly as bitter.) In some tests conducted in a randomized manner, pure KCl foods, for example, which were earlier determined to be very bad, bitter and metallic, during the first round of testing, were then determined to be almost as good tasting as NaCl foods when tasted at or near the end of the tasting.

The qualities of tastands described throughout this document are in sharp contrast to those of gymnemic acid as reported in *The Merck Index* (Eleventh Edition, 1989) (hereinafter "Index") where it is stated that gymnemic acid "Completely obtunds taste for several hours for bitter or sweet, . . . " (This description of the properties of gymnemic acid is not entirely consistent with the articles that were quoted for this information in the Index, one of which states, "After chewing one or two leaves one is unable to detect the sweet taste, and the bitter taste is also suppressed to some extent.") (emphasis added) The Index also states that gymnemic acid is a bitter tasting compound. More recent publications that have used purified gymnemic acid $A_1$ and $A_2$ have shown that there is a profound effect on the sweet response that is still present after more than fifteen minutes. These reports state that there is no effect on the bitter response. The reports do not comment on the taste of gymnemic acid $A_1$ and $A_2$, nevertheless gymnemic acid is not a tastand under the definition contained herein.

An abundance of literature exists on the study of the perception of taste, particularly in the area of sweet taste. Over the past two decades, numerous researchers have attempted to develop new non-caloric sweeteners. This work began in earnest following the introduction of Aspartame® (L-aspartyl-L-phenylalanine methyl ester) several years ago. As a result of this work, a large variety of sweet molecules are now known.

There has been a substantial amount of work on the perception of sweet taste, as well as on the interaction of molecules with the receptor for sweet taste. All of this work points to the fact that the sweet receptor and the bitter receptor as well as the other taste receptors may be in close proximity and/or related to one another and/or possibly one and the same. It is now known, for example, that if sweet molecules are altered slightly, particularly in their spatial arrangements and/or orientation and/or configuration of their chiral centers and/or their stereochemistry and/or by the addition or substitution and/or elimination in the molecule of various groups, that such molecules may become bitter or tasteless. Throughout this document the alteration of a molecule in its spatial arrangements and/or orientation and/or configuration of its chiral centers and/or its stereochemistry and/or by the addition or substitution and/or elimination in the molecule of various groups, will hereinafter be referred to as "transformation(s)". Sometimes the transformation of a molecule that:

A. is a tastand will change said molecule into a molecule that is a more active tastand or less active tastand or not a tastand at all, or B. is not a tastand will change it to a tastand.

Such transformations in a molecule may change the molecule from any one of these (sweet, bitter or tasteless) to any of the following: sweet, bitter or tasteless.

Consequently, it occurred to us that:

A. the perception of sweet and the perception of bitter may be associated with the same receptor, part of the same receptor, very closely spatially related receptors or separate receptors which act together to give the associated sweet or bitter taste response, and B. that the perception of undesirable tastes may be associated with this same receptor, part of this same receptor or very closely spatially related receptors or separate receptors which act together to give the associated undesirable taste.

(all concepts relating to the receptors) are herein referred to as "receptor site(s)" or "receptor(s)").

This transformation feature is well illustrated in the case of the dipeptide-like sweeteners. For instance, L-aspartyl-L-phenylalanine methyl ester (Aspartame®) is intensely sweet. Whereas, L-aspartyl-L-phenylalanine methylamide is intensely bitter and L-aspartyl-L-phenylalanine free acid is tasteless.

These transformations extend to almost all of the known dipeptide classes of sweeteners, including the aspartyl-D-alanine amides where many of the aspartyl-D-alanine alkylamides are sweet and many of the corresponding L-amides are bitter. A similar set of examples exist for the amino malonic acid derivatives, the aspartyl alanine esters and most other classes of peptide-like sweetener compounds. Transformations also extend to many other classes of compounds. For example, in the saccharin type molecules the presence or absence of nitration or alkylation can lead to a molecule that is tasteless or sweet or bitter. This is illustrated in the following example:

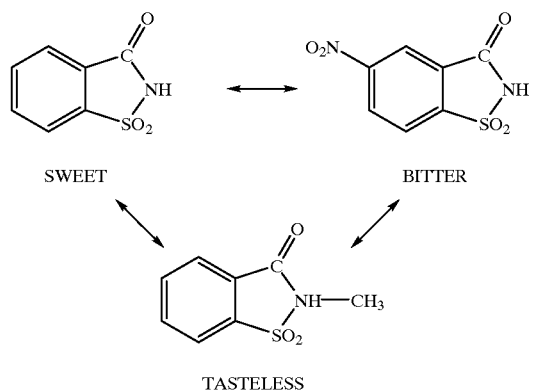

Another example of a transformation can be seen in the substituted propoxybenzenes where the position, the location and the number of the $NH_2$ and the $NO_2$ substituents determine if the molecule is tasteless or sweet and/or bitter. This is illustrated in the following example:

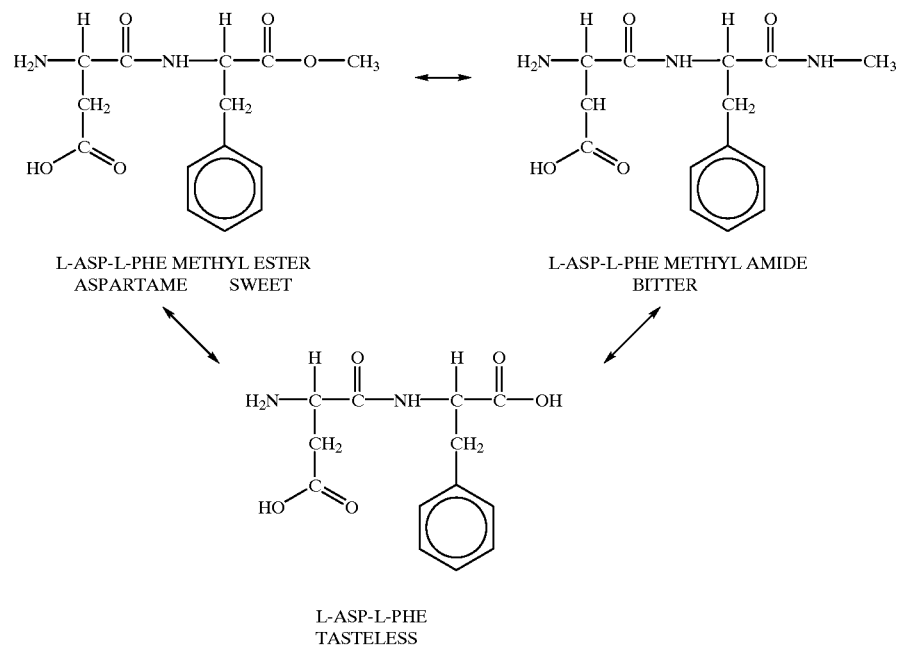

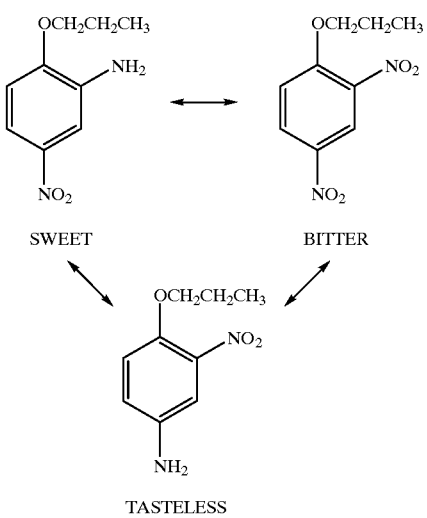

Another example of a transformation can be seen in the substituted ethoxybenzenes.

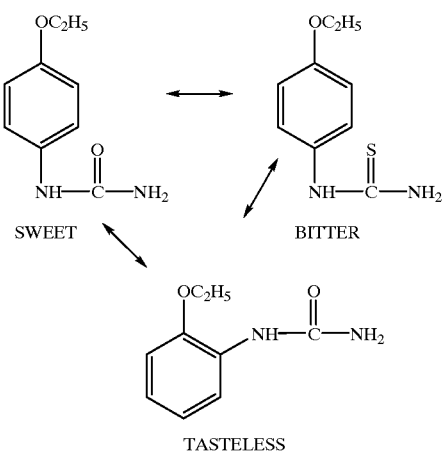

Another example of a transformation can be seen in the following:

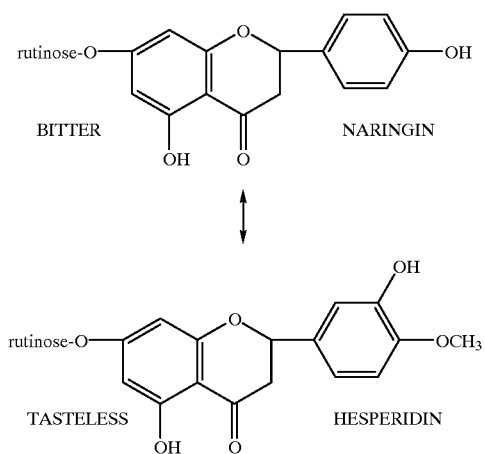

Such transformations can be extended to most classes of sweet or bitter tasting substances. Consequently it is likely that a non-sweet analogue of thaumatin (a large peptide) exists which would be a tastand. In general most sweet or bitter eatables should be able to be transformed into a tastand regardless of the size or chemical structure. In addition, polymeric substances, as well as di-, oligo-, and polypeptide substances would also be anticipated by the present disclosure. These facts lead us to the conclusion:

A. 1. if a molecule possessed similar spatial arrangements to known sweeteners; and
2. with slight alterations the molecule could be made substantially tasteless B. 1. if a molecule possessed similar spatial arrangements to a known bitter substance; and
2. with slight alterations the molecule could be made substantially tasteless that such molecules should interact with the receptor in the same way a sweet or bitter tasting molecule would interact but without the associated taste. If this occurs, then this substantially tasteless molecule should inhibit the entrance of other molecules into the receptor. Consequently, we concluded and discovered the following:

A. If the molecule is a tastand, it may inhibit or reduce the sweetness of substances, and in some instances it will also inhibit or reduce undesirable tastes; and/or B. If the molecule is a tastand, it may inhibit or reduce the bitterness of substances, and in some instances it will also inhibit or reduce other undesirable tastes; and/or C. If a sweet molecule can be spatially altered to become substantially tasteless, this molecule will likely be a tastand; and/or D. If a bitter molecule can be spatially altered to become substantially tasteless, this molecule will likely be a tastand.

In addition, it has been found that when an eatable possesses desirable characteristics, for example, a salty taste, these desirable characteristics may not be inhibited or adversely affected by the tastand inhibitors of the invention.

In addition, in order to achieve a desired degree of reduction and/or elimination of undesirable taste(s), it has been found that more than one tastand might be needed in some cases. If more than one tastand is necessary, then it would be obvious to one skilled in the art to either have each one of the tastands ingested in a temporally appropriate manner and/or to chemically link the tastands. In the case of chemically linked tastands the basic molecule could be linked with one or more similar or dissimilar tastand molecule(s).

In addition, synergism of molecules in some cases may allow two or more molecules, that in and of themselves do not appear to be tastands, to act as a tastand when said molecules are used in a temporally appropriate manner.

It has further been found that many of the tastands will block or inhibit the undesirable taste(s) of, to mention a few examples, potassium chloride, potassium glutamate, potassium benzoate, potassium nitrate, potassium nitrite, potassium sulfate, potassium sulfite, potassium baking powder and potassium baking soda (which probably become potassium chloride or other potassium salts after baking), aspirin, acetaminophen, antibiotics, codeine, caffeine, unsweetened chocolate, other medicaments or other undesirable taste(s) of the eatable.

Some tastands have also been found to enhance salt taste. Thus tastands can be used in conjunction with mixtures of substances with undesirable tastes such as, for example, potassium chloride and/or sodium chloride and/or ammonium chloride to both reduce the undesirable taste(s) and to enhance the salt taste of the sodium and/or potassium and/or ammonium chloride.

Eatables which are not generally considered to have an undesirable taste could also benefit from the addition of an appropriate tastand as a taste modifier. For example:

A. Sodium chloride, which is normally not considered bitter, is substantially smoothed in its aftertaste with the addition of the appropriate tastand.

B. A smoothing effect can be achieved when a tastand is added to plain unflavored, unsweetened yogurt which is normally considered tangy or acidic tasting.

C. The bitter taste of coffee can be substantially reduced or eliminated with the addition of the appropriate tastand.

D. The burning sensation of hard liquors can be reduced or eliminated with the addition of the appropriate tastand.

In the case of sour materials such as lemon juice when the appropriate tastand and/or salt tastand is added there is a substantial change in the undesirable taste. This is especially true if a salt, such as potassium or sodium chloride, is added to the tastand. If a salt tastand is added, the undesirable taste can be reduced or even eliminated.

As used herein and the appended claims the singular and the plural of a defined term shall be one and the same. As used herein and the appended claims defined terms with and without initial capitalization shall mean one and the same.

DETAILED DESCRIPTION OF THE INVENTION

Tastands Molecules as Taste Modifiers

Figure 2C:
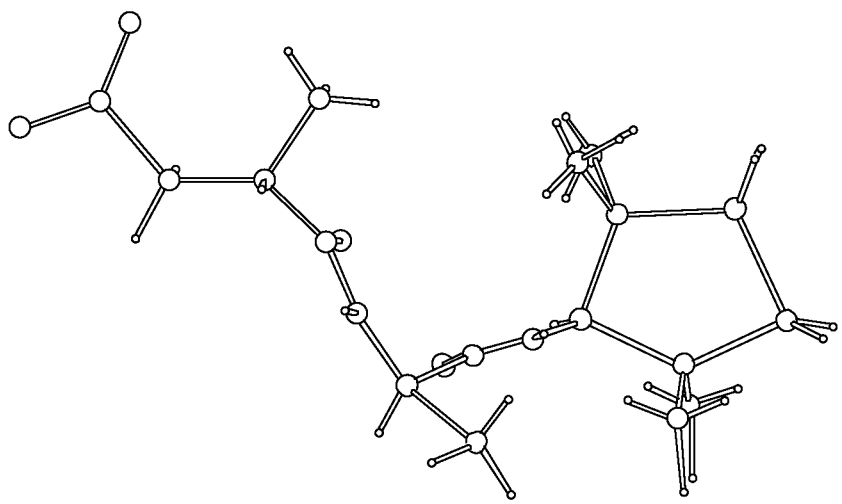

The tastands useful in the present invention are those compounds of the prior art which are tastands that are substantially tasteless. In many instances, substances of the prior art which could be tastands which are not tasteless can be rendered substantially tasteless by transformation(s).

As used herein and the appended claims, "Group 1" substituents may be represented by:

H, alkyl, substituted alkyl, alkoxy, substituted alkoxy, aryl, substituted aryl, alkylene, substituted alkylene, aminoacyl, substituted aminoacyl, aryloxy, substituted aryloxy, hydroxy, nitro, amino, substituted amino, cyano, halogen, aralkoxy, substituted aralkoxy, acyl, substituted acyl, arylacyl, substituted arylacyl, trifluoroacetyl, benzoyl, substituted benzoyl, alkylamino, substituted alkylamino, dialkylamino, substituted dialkylamino, trialkylamino, substituted trialkylamino, carbonates, substituted carbonates, alkylcarbonates, substituted alkylcarbonates, arylcarbonates, substituted arylcarbonates, acylamino, substituted acylamino, guanidino, substituted guanidino, alkylguanidino, substituted alkylguanidino, acylguanidino, substituted acylguanidino, arylguanidino, substituted arylguanidino, alkyurethanes, substituted alkyurethanes, arylurethanes, substituted arylurethanes, ureas, substituted ureas, mono- or di- or tri- substituted ureas, alkylureas, substituted alkylureas, an O, S or N glycoside, or a phosphorylated glycoside (where the glycoside is a monosaccharide, a disaccharide, a trisaccharide, an oligosaccharide, a substituted mono-, di-, tri-, or oligosaccharide), CHO, substituted CHO, COCH$_3$, substituted COCH$_3$, CH$_2$CHO, substituted CH$_2$CHO, COOH, CH$_2$COOH, substituted CH$_2$COOH, COOCH$_3$, substituted COOCH$_3$, OCOCH$_3$, substituted OCOCH$_3$, CONH$_2$, substituted CONH$_2$, NHCHO, substituted NHCHO, SCH$_3$, substituted SCH$_3$, SCH$_2$CH$_3$, substituted SCH$_2$CH$_3$, CH$_2$SCH$_3$, substituted CH$_2$SCH$_3$, SO$_3$H, SO$_2$NH2, substituted SO$_2$NH$_2$, SO$_2$CH$_3$, substituted SO$_2$CH$_3$, CH$_2$SO$_3$H, substituted CH$_2$SO$_3$H, cycloalkyl, substituted cycloalkyl, heterocyclic, substituted heterocyclic, polycyclic, substituted polycyclic,and CH$_2$SO$_2$NH$_2$, arylureas, substituted arylureas, multiple substituted arylureas, an acid group of the structure ZO$_q$H$_r$, wherein Z is an element selected from the group consisting of carbon, sulfur, boron or phosphorus, q is an integer from 2 to 3 and r is an integer from 1 to 3; carboxylic acid ester, substituted carboxylic acid ester, carboxamide, substituted carboxamide, N-alkyl carboxamide, substituted N-alkyl carboxamide, di-alkyl carboxamides, substituted di-alkyl carboxamides, and/or two substituents together represent an aliphatic chain linked to a phenyl ring at two positions, either directly or via a an oxygen, nitrogen or sulfur group, any H on N, S, or O, may be substituted with one of the substituents of Group 2, and combinations of any and/or all of the foregoing, and physiologically acceptable salts of any and/or all of the foregoing.

As used herein and the appended claims "Group 2" substituents may be represented by:

H, alkyl, substituted alkyl, dialkyl, substituted dialkyl, aralkyl, substituted aralkyl, aryl, substituted aryl, diaryl, substituted diaryl, acyl, substituted acyl, cycloalkyl, substituted cycloalkyl, benzoyl, substituted benzoyl, trifluoroacetyl, alkyloxycarbonyl, substituted alkyloxycarbonyl, aryloxycarbonyl, substituted aryloxycarbonyl, alkylaminocarbonyl, substituted alkylaminocarbonyl, arylaminocarbonyl, substituted arylaminocarbonyl, amidines, substituted amidines, alkylamidines, substituted alkylamidines, arylamidines, substituted arylamidines, a monosaccharide, substituted a monosaccharide, a disaccharide, substituted disaccharide, a trisaccharide, substituted trisaccharide, an oligosaccharide, substituted oligosaccharide, phosphorylated saccharides, substituted phosphorylated saccharides, arylacyl, substituted arylacyl, alkylene, substituted alkylene, heterocyclic, substituted heterocyclic, polycyclic, substituted polycyclic, cyano, nitro, any H on N, S, or O, may be substituted with one of the above substituents, and combinations of any and/or all of the foregoing and physiologically acceptable salts of any and/or all of the foregoing.

As used herein and the appended claims "Group 3" substituents may be represented by:

H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, substituted polycyclic, hydroxy, amino, substituted amino, sulfydryl, substituted sulfydryl, an O, S or N glycoside, or a phosphorylated glycoside (where the glycoside is a monosaccharide, a disaccharide, a trisaccharide, an oligosaccharide, a substituted mono- , di-, tri-, or oligosaccharide), and combinations of any and/or all of the foregoing.

As used herein and the appended claims "substituted" indicates that the molecule may have any hydrogen atom replaced or "substituted" by any of the substituents of Groups 1, 2 or 3, in any combination.

As used herein and the appended claims specific tastands containing acidic or basic groups shall include all physiologically acceptable salts thereof as well as the free acid and/or base as is appropriate.

As used herein and the appended claims specific tastands containing carbon-carbon mono, double or triple bonds may be reduced or oxidized to give carbon-carbon mono, double or triple bonds.

As used herein and the appended claims any aromatic molecule in Groups 1, 2 or 3 above may be substituted with one of the substituents of Group 1.

It would be understood by one skilled in the art that any substituent not specifically defined is H.

It is understood by those skilled in the art that only the substitutions, replacements, oxidations, reductions and descriptions above, allowed by the laws of chemistry, physics and nature are contemplated for use as tastands as described in the classes of compounds below.

Illustrative of suitable classes of molecules contemplated for use as tastands are the following:

A. As used herein and the appended claims the following molecule shall be referred to as A-1 and said molecule represents the general class of compounds having the structure:

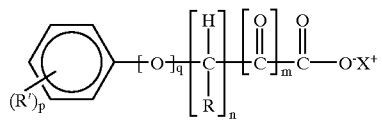

A-1 wherein m represents 0 or 1, n represents 0, 1, 2 or 3, p represents 1, 2, 3, 4 or 5, q represents 0 or 1; any R is represented independently by one of the substituents of Group 3; the substituents R', which may be the same or different, are each represented by one of the substituents of Group 1, in any combination; and in addition where CH—CH or $CH_2$—$CH_2$ bonds exist the level of unsaturation may be increased. $X^+$ represents $H^+$ or a physiologically acceptable cation, and physiologically acceptable salts of any and/or all of the foregoing.

Some specific compounds within this class of tastands and their preparation are described in U.S. Pat. No. 4,567,053 and are hereby incorporated by reference.

Examples of compounds of particular interest within this class are:

1. (−)-2-(4-methoxyphenoxy)propionic acid,
2. (±)-2-(4-methoxyphenoxy)propionic acid,
3. (+)-2-(4-methoxyphenoxy)propionic acid,
4. 4-methoxyphenoxyacetic acid,
5. 2-(4-methoxyphenyl)propionic acid,
6. 2-(4-ethoxyphenoxy)propionic acid,
7. 3-(3,4-dimethoxyphenoxy)propionic acid,
8. 3-(3,4-dimethoxyphenyl)propionic acid,
9. 3-(2,3,4-trimethoxyphenoxy)propionic acid,
10. 3-(2-methoxyphenyl)propionic acid,
11. 1,4-benzodioxan-6-acetic acid,
12. 3-(2,3,4-trimethoxyphenyl)propionic acid,
13. 3-(3,4,5-trimethoxyphenyl)propionic acid,
14. 3-(4-methoxyphenyl)propionic acid,
15. 4-(4-methoxyphenyl)butyric acid,
16. 2-methoxyphenylacetic acid,
17. 3-methoxyphenylacetic acid,
18. 4-methylphenylacetic acid,
19. 4-trifluoromethylphenylacetic acid,
20. phenylpyruvic acid,
21. 2,3-dihydroxybenzoic acid,
22. 2-hydroxy-4-aminobenzoic acid,
23. 3-hydroxy-4-aminobenzoic acid,
24. phenoxyacetic acid,
25. gallic acid,
26. 2,4-dihydroxybenzoic acid,
27. 2,4-dihydroxyphenylacetic acid,
28. 2-(2,4-dihydroxyphenyl)propionic acid,
29. 2-(2,4-dihydroxyphenoxy)propionic acid,
30. 2-(2,4-dihydroxyphenoxy)acetic acid, and the physiologically acceptable salts of any and/or all of the foregoing.

B. As used herein and the appended claims the following molecule shall be referred to as B-1 and said molecule represents the general class of compounds having the structure:

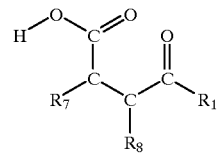

B-1 wherein $R_7$ and $R_8$ may be independently selected from the one of the substituent of Group 3 in any combination; and in addition where CH—CH or $CH_2$—$CH_2$ bonds exist the level of unsaturation may be increased and wherein $R_1$, is the group, (as used herein and the appended claims the structure shall be referred to as B-2):

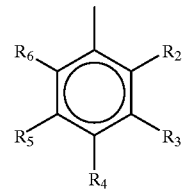

B-2 wherein $R_2$, $R_3$, $R_4$, $R_5$ and $R_6$ are independently selected from the substituents of Group 1, in any combination, and physiologically acceptable salts of any and/or all of the foregoing.

Some specific compounds within this class of tastands are described in U.S. Pat. No. 4,544,565 and are hereby incorporated by reference.

Illustrative members of particular interest in this class include:

1. 3-(3'-4'dimethylbenzoyl)propionic acid,
2. 3-(2',4'-dimethylbenzoyl)propionic acid,
3. 3-(2'-methyl-4'-ethylbenzoyl)propionic acid,
4. 3-(2',4',6'-trimethylbenzoyl)propionic acid, 5. 3-(4'-carboxybenzoyl)propionic acid,
6. 3-(4'-hydroxybenzoyl)propionic acid,
7. 3-(3'-methyl-4'-hydroxybenzoyl)propionic acid,
8. 3-(2',4'-dihydroxybenozoyl)propionic acid,
9. 3-(2',4'-dihydroxy-6'-methylbenzoyl)propionic acid,
10. 3-(3'-methyl-4'-ethoxybenzoyl)propionic acid,
11. 3-(3'-ethyl-4'-ethoxybenzoyl)propionic acid,
12. 3-(4'-methoxybenzoyl)propionic acid,
13. 3'-(4'-ethoxybenzoyl)propionic acid,
14. 3-(3',4'-dimethoxybenzoyl)propionic acid
15. 3-(4'-methoxybenzoyl)propionic acid
16. 3-(4'-methoxybenzoyl)-2-methylpropionic acid
17. 3-(4'-methoxybenzoyl)-3-methylpropionic acid,
18. 3',4'-dimethoxybenzoyl-2,3-dimethylpropionic acid, and physiologically acceptable salts of any and/or all of the foregoing.

C. As used herein and the appended claims the following molecule shall be referred to as C-1 and said molecule represents the general class of compounds having the structure:

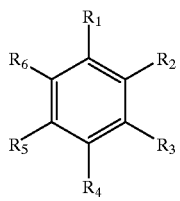

C-1 wherein $R^1$, $R^2$, $R^3$, $R^4$, $R^5$ and $R^6$ are individually represented by one of the substituents of Group 1, in any combination, and physiologically accepted salts of any and/or all of the foregoing.

Some specific members of this class of tastands are partially described in U.S. Pat. No. 4,871,570 and are hereby incorporated by reference.

Illustrative members of particular interest in this class include:

1. $R^2=R^3=R^5=R^6=H$, $R^1=OC_2H_5$, $R^4=NH-CO-NH_2$,
2. $R^1=OCH_2CH_2CH_3$, $R^2=NO_2$, $R^4=NH_2$, $R^3=R^5=R^6=H$,
3. $R^1=CH_3$, $R^2=NH_2$, $R^6=NO_2$, $R^3=R^4=R^5=H$,
4. $R^1=CH_3$, $R^2=NO_2$, $R^4=NH_2$, $R^3=R^5=R^6=H$,
5. 3,4-dihydroxybenzoic acid (protocatechuic acid),
6. 2,4-dihydroxybenzoic acid,
7. 3-hydroxy-4-methoxybenzoic acid,
8. 3,5-dihydroxybenzoic acid,
9. 2,3-dihydroxybenzoic acid,
10. 2-hydroxy-4-aminobenzoic acid,
11. 3-hydroxy-4-aminobenzoic acid,
12. 2,4,6-trihydroxybenzoic acid,
13. 2,6-dihydroxybenzoic acid,
14. 2-amino tere-phthalic acid and physiologically acceptable salts of any and/or all of the foregoing.

D. As used herein and the appended claims the following molecule shall be referred to as D-1 and said molecule represents the general class of compounds having the structure:

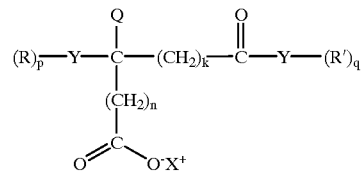

D-1 wherein n and k independently may be 0, 1 or 2; Y (which may be the same or different) may be N (nitrogen), O (oxygen), or S (sulfur); Q may be represented by one of the substituents of Group 3; p and q are 1 when Y is O and p and q may be independently 1 or 2 when Y is S and p and q may be independently 2 or 3 when Y is N; R (which may be the same or different when p>1) and $R^1$ (which may be the same or different when q>1) are represented by one of the substituents of Group 2 or one of the following three structures (as used herein and the appended claims the structures shall be referred to as D-2) in any combination and the appropriate stereochemistry:

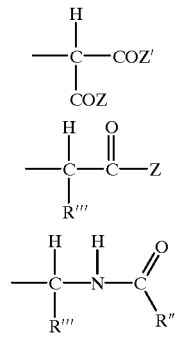

D-2 wherein Z and Z' are the same or different and are represented by OH, $-O^-X^+$, OR'', $NH_2$, NHR'', $N(R'')_2$; R'' may be alkyl, branched alkyl, aryl, aralkyl, alkaryl, cycloalkyl, substituted alkyl, substituted cycloalkyl substituted aryl, substituted aralkyl, substituted alkaryl, and R''' may be alkyl, branched alkyl, aryl, aralkyl, alkaryl, cycloalkyl, substituted alkyl, substituted cycloalkyl, substituted aryl, substituted aralkyl, substituted alkaryl, or an amino acid side chain (e.g. one of the 20 common amino acids); and in addition where CH—CH or $CH_2$—$CH_2$ bonds exist the level of unsaturation may be increased. $X^+$ may be $H^+$ or a physiologically acceptable cation, preferably an alkali metal, alkaline earth metal or ammonium cation, and physiologically acceptable salts of any and/or all of the foregoing.

Illustrative of compounds of particular interest in this class are:

1. L-aspartyl-L-phenylalanine,
2. aminomalonyl-L-phenylalanine,
3. L-aspartyl-D-alanine,
4. L-aspartyl-D-serine,
5. L-glutamyl-L-phenylalanine,
6. N-(L-aspartyl)-p-aminobenzoic acid,
7. N-(L-aspartyl)-o-aminobenzoic acid,
8. L-aspartyl-L-tyrosine,
9. N-(p-cyanophenylcarbamoyl)-L-aspartyl-L-phenylalanine, 10. N-(p-nitrophenylcarbamoyl)-L-aspartyl-L-phenylalanine,
11. L-β-aspartyl-L-phenylalanine methyl ester,
12. L-aspartyl-p-hydroxyanilide,
13. L-β-aspartyl-L-phenylalanine
14. L-aspartyl-L-serine methyl ester
15. L-aspartyl-D-tyrosine methyl ester
16. L-aspartyl-L-threonine methyl ester
17. L-aspartyl-L-aspartic acid and physiologically acceptable salts of any and/or all of the foregoing.

E. As used herein and the appended claims the following molecule shall be referred to as E-1 and said molecule represents the general class of compounds having the structure:

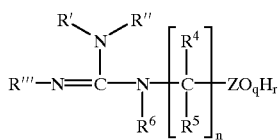

E-1 wherein R', R", R''', $R^6$ are each independently represented by one of the substituents of Group 2, in any combination; $R^4$'s and $R^5$'s which may be the same or different are each independently represented by one of the substituents of Group 3; n may be 0, 1, 2, 3, 4, 5, 6, 7, 8, 9 or 10; Z may be C, S, P or B, q is an integer from 2 to 3 and r is an integer from 1 to 3, when Z is C, q is 2; when Z is S, P or B, q may be 2 or 3; when Z is C or S, r is 1; when Z is P or B, r is 2; and in addition where CH—CH or $CH_2$—$CH_2$ bonds exist the level of unsaturation may be increased, and physiologically acceptable salts of any and/or all of the foregoing.

Illustrative of compounds of particular interest in this class are:

1. R"=$CH_3$, R'''=4-cyanophenyl, R'=$R^4$=$R^5$=H, n=1, Z=C, q=2, r=1,
2. R"=$CH_3$, R'''=4-nitrophenyl, R'=$R^4$=$R^5$=H, n=1, Z=C, q=2, r=1,
3. R"=$CH_3$, R'''=4-methoxyphenyl, R'=$R^4$=$R^5$=H, n=1, Z=C, q=2, r=1,
4. R"=$CH_3$, R'''=phenyl, R'=$R^4$=$R^5$=H, n=1, Z=C, q=2, r=1,
5. R"=H, R'''=4-cyanophenyl, R'=$R^4$=$R^5$=H, n=1, Z=C, q=2, r=1,
6. R"=H, R'''=4-nitrophenyl, R'=$R^4$=$R^5$=H, n=1, Z=C, q=2, r=1,
7. R"=H, R'''=4-methoxyphenyl, R'=$R^4$=$R^5$=H, n=1, Z=C, q=2, r=1,
8. R"=H, R'''=phenyl, R'=$R^4$=$R^5$=H, n=1, Z=C, q=2, r=1,
9. R"=$CH_3$, R'''=4-cyanophenyl, R'=$R^4$=$R^5$=H, n=1, Z=S, q=3, r=1,
10. R"=$CH_3$, R'''=4-nitrophenyl, R'=$R^4$=$R^5$=H, n=1, Z=S, q=3, r=1,
11. R"=$CH_3$, R'''=4-methoxyphenyl, R'=$R^4$=$R^5$=H, n=1, Z=S, q=3, r=1,
12. R"=$CH_3$, R'''=phenyl, R'=$R^4$=$R^5$=H, n=1, Z=S, q=3, r=1,
13. R"=H, R'''=4-cyanophenyl, R'=$R^4$=$R^5$=H, n=1, Z=S, q=3, r=1,
14. R"=H, R'''=4-nitrophenyl, R'=$R^4$=$R^5$=H, n=1, Z=S, q=3, r=1,
15. R"=H, R'''=4-methoxyphenyl, R'=$R^4$=$R^5$=H, n=1, Z=S, q=3, r=1,
16. R"=H, R'''=phenyl, R'=$R^4$=$R^5$=H, n=1, Z=S, q=3, r=1, and physiologically acceptable salts of any and/or all of the foregoing.

F. As used herein and the appended claims the following molecule shall be referred to as F-1 and said molecule represents the general class of compounds having the structure:

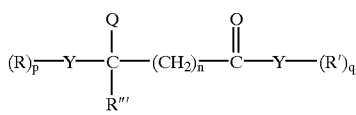

F-1 wherein n may be 0, 1 or 2; Y (which may be the same or different) may be N (nitrogen), O (oxygen), or S (sulfur); Q may be represented by one of the substituents of Group 3; p and q are 1 when Y is O and p and q may be independently 1 or 2 when Y is S and p and q may be independently 2 or 3 when Y is N; R (which may be the same or different when p>1) and R' (which may be the same or different when q>1) are represented by one of the substituents of Group 2 or one of the following three structures (as used herein and the appended claims the structures shall be referred to as F-2) in any combination and the appropriate stereochemistry:

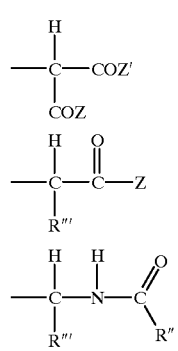

F-2 wherein Z and Z' are the same or different and are represented by OH, —$O^-X^+$, OR", $NH_2$, NHR", $N(R")_2$; R" is alkyl, branched alkyl, aryl, aralkyl, alkaryl, cycloalkyl, substituted alkyl, substituted cycloalkyl substituted aryl, substituted aralkyl, substituted alkaryl, and R''' is alkyl, branched alkyl, aryl, aralkyl, alkaryl, cycloalkyl, substituted alkyl, substituted cycloalkyl, substituted aryl, substituted aralkyl, substituted alkaryl, or an amino acid side chain (e.g. one of the 20 common amino acids); and in addition where CH—CH or $CH_2$—$CH_2$ bonds exist the level of unsaturation may be increased. $X^+$ may be $H^+$ or a physiologically acceptable cation, preferably an alkali metal, alkaline earth metal or ammonium cation and physiologically acceptable salts of any and/or all of the foregoing.

Illustrative of compounds of particular interest in this class are:

1. L-methionyl-L-phenylalanine methyl ester,
2. L-leucyl-L-phenylalanine methyl ester,
3. L-seryl-L-phenylalanine methyl ester,
4. L-methionyl-D-alanyl-tetramethylcyclopentylamide,
5. L-seryl-D-alanyl-tetramethylcyclopentylamide,
6. L-leucyl-D-alanyl-tetramethylcyclopentylamide,
7. L-ornithyl-β-alanine
8. L-diaminobutyryl-β-alanine
9. L-diaminopropionyl-β-alanine
10. L-lysyl-β-alanine and physiologically acceptable salts of any and/or all of the foregoing.

G. As used herein and the appended claims the following molecule shall be referred to as G-1 and said molecule represents the general class of compounds having the structure:

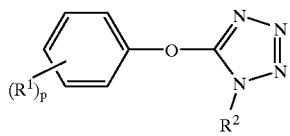

G-1 wherein p may be 1, 2, 3, 4, or 5; the substituents $R^1$ may each be represented by one of the substituents of Group 1, in any combination, and $R^2$ may be represented by one of the substituents of Group 2, and physiologically acceptable salts of any and/or all of the foregoing.

Illustrative of compounds of particular interest in this class are compounds where $R^2$=H and $R^1$ is:

1. 3-COOH,
2. 3-COOCH$_3$,
3. 3-COOC$_2$H$_5$,
4. 3-CH$_3$O,
5. 4-CH$_3$O,
6. 2-Cl,
7. 3-Cl,
8. 4-Cl,
9. 4-COOC$_2$H$_5$,
10. 3-C$_6$H$_5$CH$_2$O,
11. 4-C$_6$H$_5$CH$_2$O,
12. 2-t-butyl,
13. 4-t-butyl,
14. 2-CH$_3$,
15. 3-CH$_3$,
16. 4-CH$_3$,
17. 3-C$_2$H$_5$,
18. 4-C$_2$H$_5$,
19. 3,5-di CH$_3$, and physiologically acceptable salts of any and/or all of the foregoing.

H. As used herein and the appended claims the following molecule shall be referred to as H-1 and said molecule represents the general class of compounds having the structure:

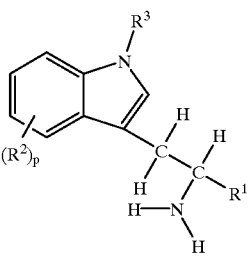

H-1 wherein $R^1$ is 5-tetrazol or one of the substituents of Group 3, p may be 1, 2, 3, or 4; and the substituents $R^2$, which may be the same or different, may each be represented by one of the substituents of Group 1, in any combination; and $R^3$ is represented by one of the substituents of Group 2; and in addition where CH—CH or CH$_2$—CH$_2$ bonds exist the level of unsaturation may be increased, and where C=C bonds exist, the level of saturation may be decreased, and physiologically acceptable salts of any and/or all of the foregoing.

Illustrative of compounds of particular interest in this class are:

1. 1-α-5-tetrazolyl-6-chlorotryptamine,
2. 1-α-5-tetrazolyl-6-fluorotryptamine,
3. 1-α-5-tetrazolyl-6-methoxytryptamine, and physiologically acceptable salts of any and/or all of the foregoing.

I. As used herein and the appended claims the following molecule shall be referred to as I-1 and said molecule represents the general class of compounds having the structure:

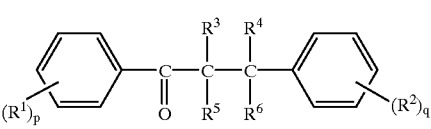

I-1 wherein p and q may be independently 1, 2, 3, 4, or 5; and the substituent $R^1$ and $R^2$, which may be the same or different, each may be represented by one of the substituents of Group 1, in any combination, and the substituent $R^3$, $R^4$, $R^5$ and $R^6$, which may be the same or different, each may be represented by one of the substituents of Group 3, in any combination; and in addition where CH—CH or CH$_2$—CH$_2$ bonds exist the level of unsaturation may be increased, and physiologically acceptable salts of any and/or all of the foregoing.

An illustrative of compound of particular interest in this class is, which hereinafter shall be referred to as:

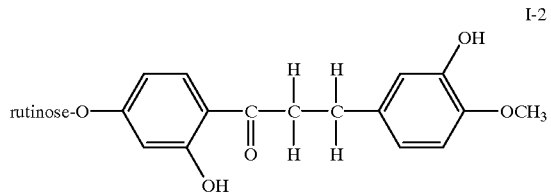

I-2

J. As used herein and the appended claims the following molecule shall be referred to as J-1 and said molecule represents the general class of compounds having the structure:

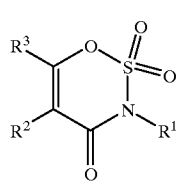

J-1 wherein, $R^1$ is represented by one of the substituents of Group 2, and $R^2$ and $R^3$, which may be the same or different, may be represented by one of the substituents of Group 3, in any combination; and in addition where C=C bonds exist the level of saturation may be increased or decreased, and where CH—CH bonds exist the level of unsaturation my be increased,
and physiologically acceptable salts of any and/or all of the foregoing.

Illustrative of compounds of particular interest in this class are:

1. $R^3$=$CH_3$, $R^2$=H, $R^1$=isopropyl,
2. $R^3$=benzyl, $R^2$=H, $R^1$=H,
3. $R^1$=$R^3$=H, $R^2$=COOH,
4. $R^2$=$R^3$=H, $R^2$=p-cyanophenylcarbamoyl and physiologically acceptable salts of any and/or all of the foregoing.

K. As used herein and the appended claims the following molecule shall be referred to as K-1 and said molecule represents the general class of compounds having the structure:

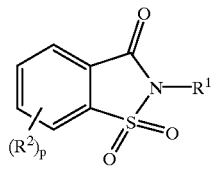

K-1 wherein p may be 1, 2, 3 or 4; the substituents $R^2$, which may be the same or different, are each represented by one of the substituents of Group 1, in any combination, and $R^1$ is represented by one of the substituents of Group 2, wherein $R^1$ and $R^2$ may be present, in any combination,
and physiologically acceptable salts of any and/or all of the foregoing.

An illustrative of compound of particular interest in this class is:

1. $R^1$=H, $R^2$=benzyl, p=1,
2. $R^1$=H, $R^2$=$NO_2$, p=1,
3. $R^1$=H, $R^2$=CN, p=1,
4. $R^2$=H, $R^1$=cyanophenylcarbamoyl and physiologically acceptable salts of any and/or all of the foregoing.

L. As used herein and the appended claims the following molecule shall be referred to as L-1 and said molecule represents the general class of compounds having the structure:

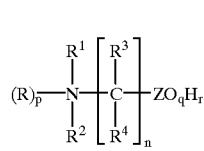

L-1 wherein R, $R^1$ and $R^2$, which may be the same or different, may each be represented by one of the substituents of Group 2; p may be 0 or 1; each $R^3$ and $R^4$ may be independently represented by one of the substituents of Group 3; n may be 0, 1, 2, 3, 4, 5, 6, 7, 8, 9, 10, 11, 12, 13, 14, 15, 16, 17, 18, 19, or 20; Z is an element selected from the group consisting of carbon, sulfur, boron, or phosphorus; q is an integer from 2 to 3 and r is an integer from 1 to 3, when Z is C, q is 2; when Z is S, P or B, q may be 2 or 3; when Z is C or S, r is 1; when Z is P or B, r is 2; $R^1$ or $R^2$ can be eliminated with OH to give a cyclic amide; and in addition where CH—CH or $CH_2$—$CH_2$ bonds exist the level of unsaturation may be increased, and physiologically acceptable salts of any and/or all of the foregoing.

Illustrative of compounds of particular interest in this class are:

1. $R^1$=H, $R^2$=t-butyl, Z=S, q=3, r=1, n=0, p=0,
2. $R^1$=H, n=0, $R^2$=1,2,3-trimethylcyclohexyl, Z=S, q=3, r=1,
3. $R^1$=$R^2$=$R^3$=$R^4$=H, n=2, Z=S, q=3, r=1 (This compound is also referred to as taurine.)
4. $R^1$=$R^2$=$R^3$=$R^4$=H, n=2, Z=C, q=2, r=1, p=0 (This compound is also referred to as β-alanine.)
5. $R^1$=p-cyanophenylcarbamoyl, $R^2$=$R^3$=$R^4$=H, Z=C, q=2, r=1, n=1, p=0
6. $R^3$=$R^4$=$R^2$=$R^1$=H, n=2, Z=P, q=3, r=2, p=0 and physiologically acceptable salts of any and/or all of the foregoing.

M. As used herein and the appended claims the following molecule shall be referred to as M-1 and said molecule represents the general class of compounds having the structure:

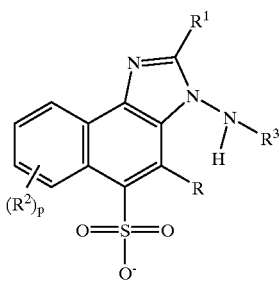

M-1 wherein p may be 1, 2, 3 or 4, substituents R, $R^1$ and $R^2$, which may be the same or different, are each independently represented by one of the substituents of Group 1, in any combination and $R^3$ is represented by one of the substituents of Group 2, wherein R, $R^1$, $R^2$ and $R^3$ may be present in any combination, and where C=C or C=N bonds exist, the level of saturation may be decreased, and physiologically acceptable salts of any and/or all of the foregoing.

An illustrative of compound of particular interest in this class is:

1. $R^1$=$R^3$=phenyl, $R_2$=H, and physiologically acceptable salts of any and/or all of the foregoing.

N. As used herein and the appended claims the following molecule shall be referred to as N-1 and said molecule represents the general class of compounds having the structure:

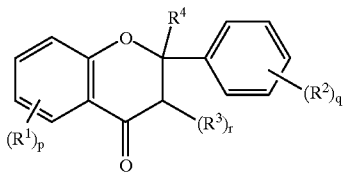

N-1 wherein p may be 1, 2, 3, or 4; q may be 1, 2, 3, 4, or 5; the substituents $R^1$ and $R^2$, which may be the same or different are each independently represented by one of the substituents of Group 1, in any combination, the substituents $R^3$ and $R^4$, which may be the same or different are each represented by one of the substituents of Group 3, in any combination, r is 1 or 2; and in addition where CH—CH or $CH_2$—$CH_2$ bonds exist the level of unsaturation may be increased, and physiologically acceptable salts of any and/or all of the foregoing.

Illustrative of compounds of particular interest in this class is the following molecules which as used herein and the appended claims shall be referred to as N-2:

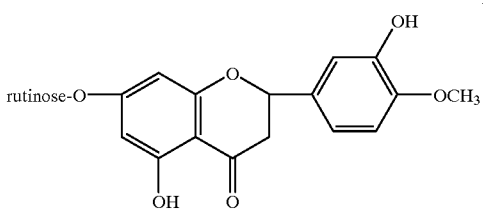

N-2 and 5-hydroxyflavone (CAS 491-78-1).

O. The general class of compounds comprising amino acids and poly amino acids.

This class includes but is not limited to:

1. naturally occurring α, β, γ, δ and/or
2. in general ω amino acids and/or
3. unnatural amino acids and/or
4. peptides and poly amino acids The nitrogen atoms of these compounds may be substituted with one, two or three substituents of Group 2, as appropriate. If oxygen (O) or sulfur (S) atoms exist in these molecules they may be substituted with an appropriate number of substituents from Group 2. Any aromatic groups in these compounds may be substituted with one or more of the substituents of Group 1 in any combination, and physiologically acceptable salts of any and/or all of the foregoing.

Illustrative of compounds of particular interest in this class are:

1. D-glutamic acid,
2. D-aspartic acid,
3. aminomalonic acid,
4. β-aminoethanesulfonic acid,
5. β-alanine,
6. 3,4-dihydroxyphenylalanine,
7. L-aspartyl-L-aspartic acid and physiologically acceptable salts of any and/or all of the foregoing.

P. As used herein and the appended claims the following molecule shall be referred to as P-1 and said molecule represents the general class of compounds having the generalized structure:

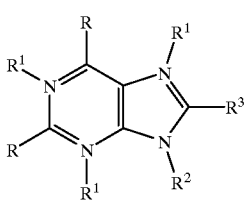

P-1

One skilled in the art will recognize that this general structure (which would not likely exist) is a representation of several tautomers several of which are represented by the following:

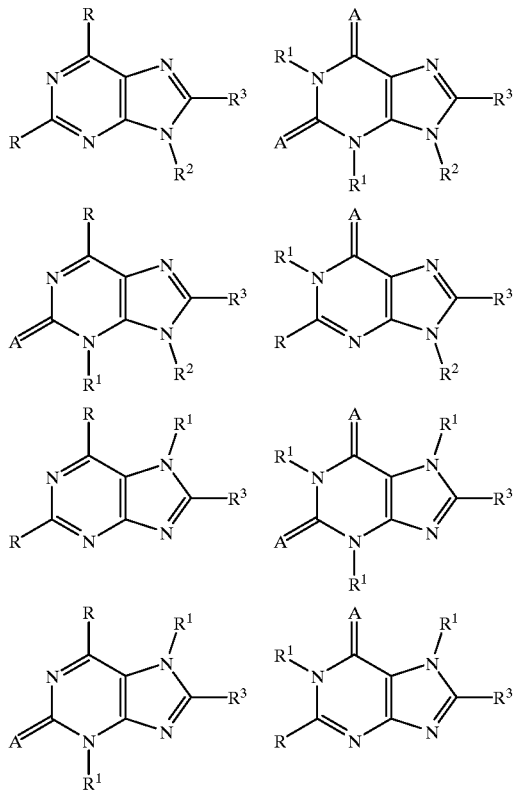

wherein the substituents R and R³, which may be the same or different, are each represented by one of the substituents of Group 1, in any combination; R¹ and R², which may be the same or different, may each be represented by one of the substituents of Group 2, in any combination, and A may be C, S, N, or O and when A is C, substitution on this carbon may be made with one or more of the substituents of Group 1, in any combination, when A is S or N substitution on this S or N may be made with one of the substituents of Group 2, and where C=C or C=N bonds exist, the level of saturation may be decreased, and physiologically acceptable salts of any and/or all of the foregoing.

Illustrative of compounds of particular interest in this class are:

1. Xanthosine-5'-monophosphate
2. Inosine
3. Guanosine and physiologically acceptable salts of any and/or all of the foregoing.

Q. As used herein and the appended claims the following molecule shall be referred to as Q-1 and said molecule represents the general class of compounds having the generalized structure:

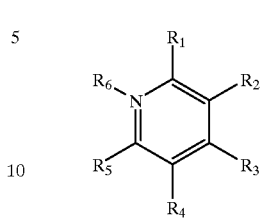

Q-1

One skilled in the art will recognize that this general structure (which would not likely exist) is a representation of several tautomers several of which are represented by the following:

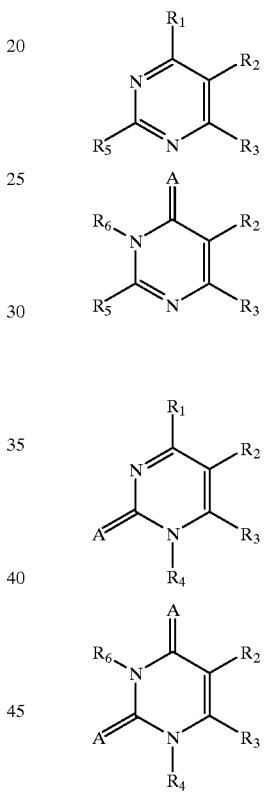

wherein $R_1$, $R_2$, $R_3$, and $R_5$, which may be the same or different, are each represented by one of the substituents of Group 1, in any combination; $R_4$ and $R_6$, which may be the same or different, are represented by one of the substituents of Group 2, in any combination, and A may be C, S, N, or O and when A is C, substitution on this carbon may be made with one or more of the substituents of Group 1, in any combination, when A is S or N substitution on this S or N may be made with one of the substituents of Group 2, and where C=C or C=N bonds exist, the level of saturation may be decreased, and physiologically acceptable salts of any and/or all of the foregoing.

It will be recognized by one skilled in the art that this class is intended to include any oxidation state of the ring system, as for example, hydrogenation of one or more of the double bonds.

Illustrative of compounds of particular interest in this class are:

1. Orotic Acid
2. Dihydroorotic acid and physiologically acceptable salts of any and/or all of the foregoing.

R. The class of compounds commonly known as natural products. This class includes but is not limited to:

alkaloids, terpines, monoterpines, diterpines, triterpines, sesqueterpines, flavanoides, chalcones, dihydrochalcones, humulones, lemonoids, saponiins, coumarins, isocoumarins, sinapines, steroids, flavinones, and physiologically acceptable salts of any and/or all of the foregoing.

As used herein and the appended claims the following molecule shall be referred to as R-1, and said molecule exemplifies the general class of compounds having, but not limited to the following structure:

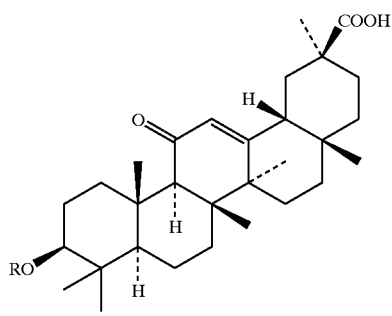

and physiologically acceptable salts of any and/or all of the foregoing.

As used herein and the appended claims the following molecule shall be referred to as R-2 and said molecule represents the general class of compounds having, but not limited to the following structure:

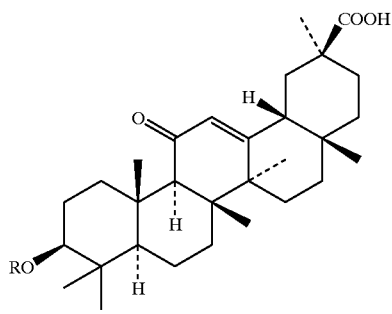

and physiologically acceptable salts of any and/or all of the foregoing.

As used herein and the appended claims the following molecule shall be referred to as R-3 and said molecule represents the general class of compounds having, but not limited to the following structure:

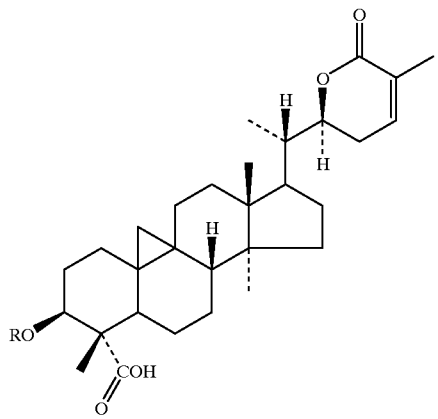

and physiologically acceptable salts of any and/or all of the foregoing.

As used herein and the appended claims the following molecule shall be referred to as R-4 and said molecule represents the general class of compounds having, but not limited to the following structure:

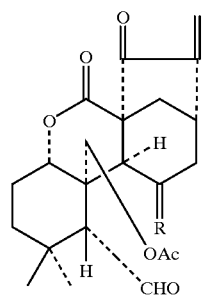

and physiologically acceptable salts of any and/or all of the foregoing.

As used herein and the appended claims the following molecule shall be referred to as R-5 and said molecule represents the general class of compounds having; but not limited to the following structure:

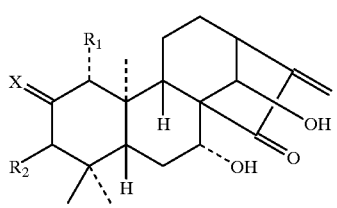

and physiologically acceptable salts of any and/or all of the foregoing.

As used herein and the appended claims the following molecule shall be referred to as R-6 and said molecule represents the general class of compounds having, but not limited to the following structure:

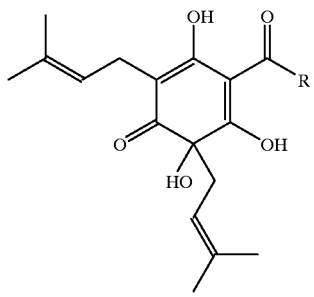

and physiologically acceptable salts of any and/or all of the foregoing.

As used herein and the appended claims the following molecule shall be referred to as R-7 and said molecule represents the general class of compounds having, but not limited to the following structure:

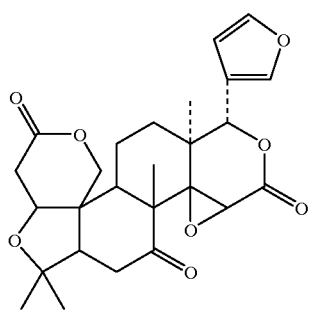

and physiologically acceptable salts of any and/or all of the foregoing.

As used herein and the appended claims the following molecule shall be referred to as R-8 and said molecule represents the general class of compounds having, but not limited to the following structure:

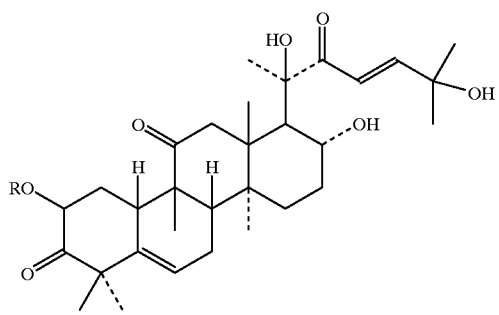

and physiologically acceptable salts of any and/or all of the foregoing.

As used herein and the appended claims the following molecule shall be referred to as R-9 and said molecule represents the general class of compounds having, but not limited to the following structure:

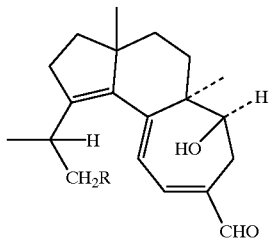

and physiologically acceptable salts of any and/or all of the foregoing.

As used herein and the appended claims the following molecule shall be referred to as R-10 and said molecule represents the general class of compounds having, but not limited to the following structure:

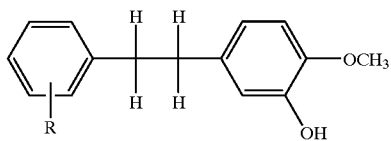

and physiologically acceptable salts of any and/or all of the foregoing.

As used herein and the appended claims the following molecule shall be referred to as R-11 and said molecule represents the general class of compounds having, but not limited to the following structure:

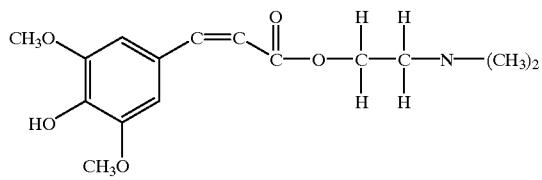

and physiologically acceptable salts of any and/or all of the foregoing.

As used herein and the appended claims the following molecule shall be referred to as R-12 and said molecule represents the general class of compounds having, but not limited to the following structure:

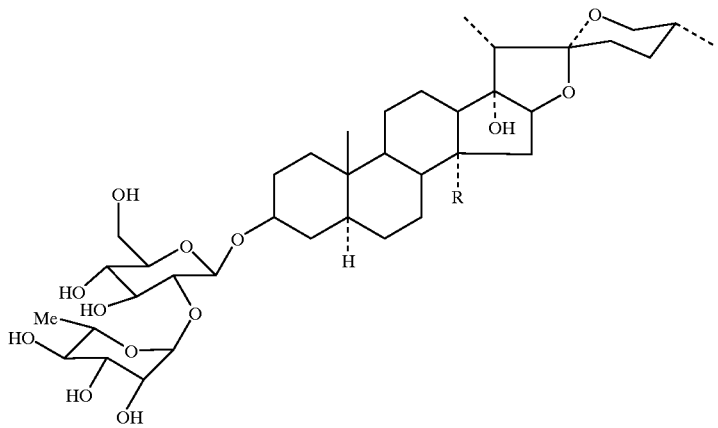

and physiologically acceptable salts of any and/or all of the foregoing.

As used herein and the appended claims the following molecule shall be referred to as R-13 and said molecule represents the general class of compounds having, but not limited to the following structure:

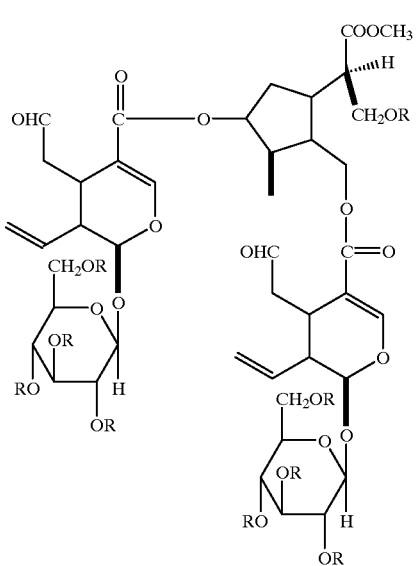

and physiologically acceptable salts of any and/or all of the foregoing.

As used herein and the appended claims the following molecule shall be referred to as R-14 and said molecule represents the general class of compounds having, but not limited to the following structure:

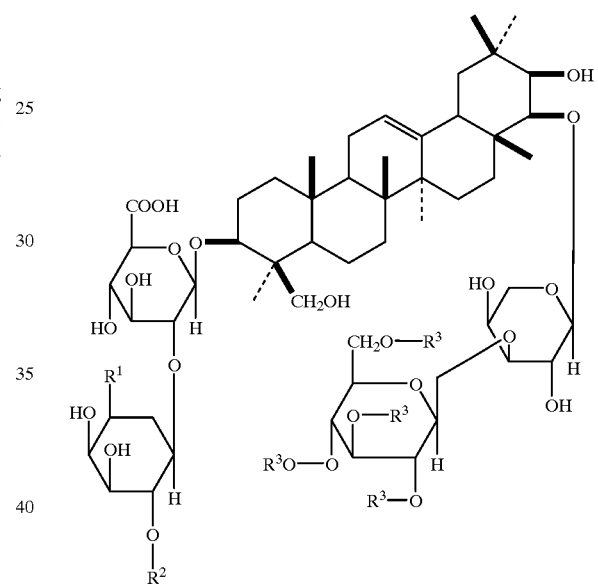

and physiologically acceptable salts of any and/or all of the foregoing.

As used herein and the appended claims the following molecule shall be referred to as R-15 and said molecule represents the general class of compounds having, but not limited to the following structure:

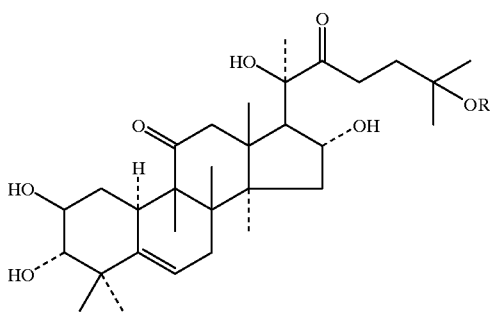

and physiologically acceptable salts of any and/or all of the foregoing.

As used herein and the appended claims the following molecule shall be referred to as R-16 and said molecule represents the general class of compounds having, but not limited to the following structure:

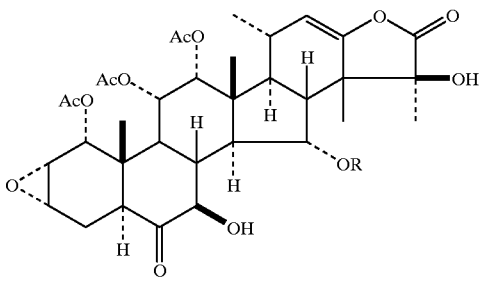

and physiologically acceptable salts of any and/or all of the foregoing.

As used herein and the appended claims the following molecule shall be referred to as R-17 and said molecule represents the general class of compounds having, but not limited to the following structure:

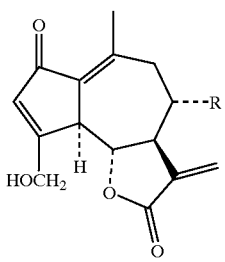

and physiologically acceptable salts of any and/or all of the foregoing.

As used herein and the appended claims the following molecule shall be referred to as R-18 and said molecule represents the general class of compounds having, but not limited to the following structure:

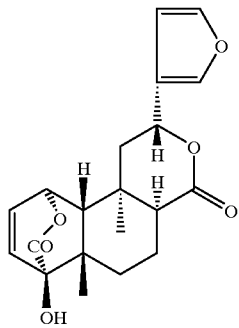

and physiologically acceptable salts of any and/or all of the foregoing.

As used herein and the appended claims the following molecule shall be referred to as R-19 and said molecule represents the general class of compounds having, but not limited to the following structure:

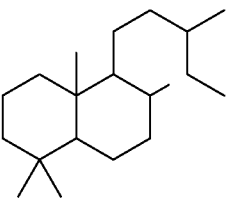

and physiologically acceptable salts of any and/or all of the foregoing.

As used herein and the appended claims the following molecule shall be referred to as R-20 and said molecule represents the general class of compounds having, but not limited to the following a structure:

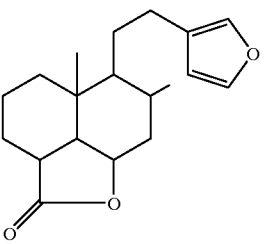

and physiologically acceptable salts of any and/or all of the foregoing.

As used herein and the appended claims the following molecule shall be referred to as R-21 and said molecule represents the general class of compounds having, but not limited to the following structure:

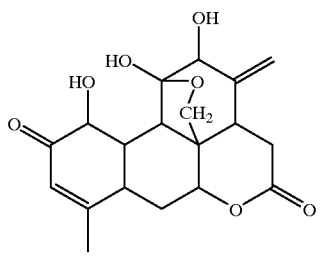

and physiologically acceptable salts of any and/or all of the foregoing.

As used herein and the appended claims the following molecule shall be referred to as R-22 and said molecule represents the general class of compounds having, but not limited to the following structure:

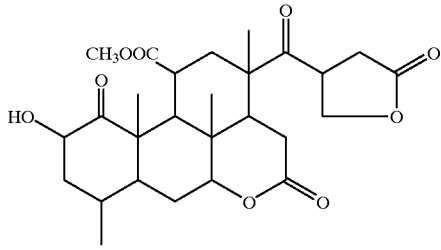

and physiologically acceptable salts of any and/or all of the foregoing.

As used herein and the appended claims the following molecule shall be referred to as R-23 and said molecule represents the general class of compounds having, but not limited to the following structure:

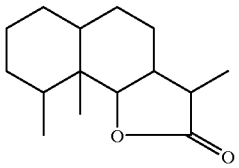

and physiologically acceptable salts of any and/or all of the foregoing.

As used herein and the appended claims the following molecule shall be referred to as R-24 and said molecule represents the general class of compounds having, but not limited to the following structure:

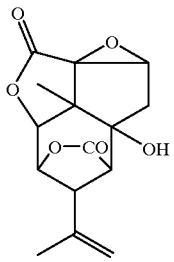

and physiologically acceptable salts of any and/or all of the foregoing.

As used herein and the appended claims the following molecule shall be referred to as R-25 and said molecule represents the general class of compounds having, but not limited to the following structure:

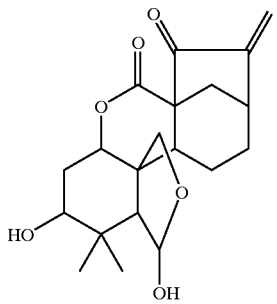

and physiologically acceptable salts of any and/or all of the foregoing.

As used herein and the appended claims the following molecule shall be referred to as R-26 and said molecule represents the general class of compounds having, but not limited to the following structure:

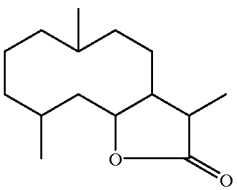

and physiologically acceptable salts of any and/or all of the foregoing.

As used herein and the appended claims the following molecule shall be referred to as R-27 and said molecule represents the general class of compounds having, but not limited to the following structure:

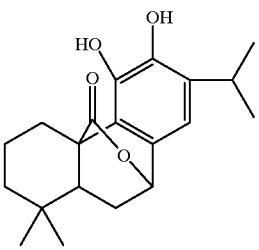

and physiologically acceptable salts of any and/or all of the foregoing.

As used herein and the appended claims the following molecule shall be referred to as R-28 and said molecule represents the general class of compounds having, but not limited to the following structure:

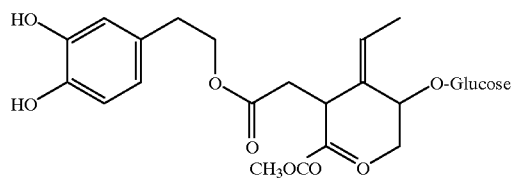

and physiologically acceptable salts of any and/or all of the foregoing.

As used herein and the appended claims the following molecule shall be referred to as R-29 and said molecule represents the general class of compounds having, but not limited to the following structure:

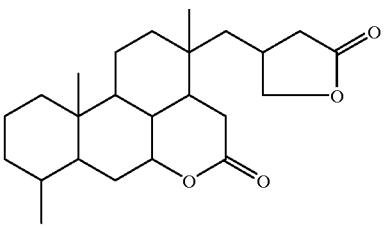

and physiologically acceptable salts of any and/or all of the foregoing.

As used herein and the appended claims the following molecule shall be referred to as R-30 and said molecule represents the general class of compounds having, but not limited to the following structure:

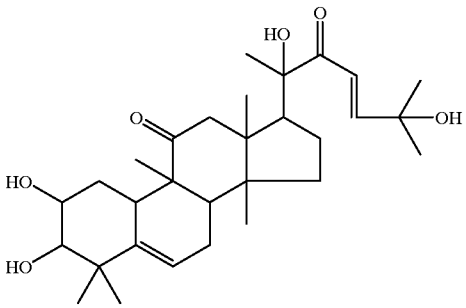

and physiologically acceptable salts of any and/or all of the foregoing.

As used herein and the appended claims the following molecule shall be referred to as R-31 and said molecule represents the general class of compounds having, but not limited to the following structure:

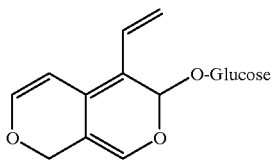

and physiologically acceptable salts of any and/or all of the foregoing.

As used herein and the appended claims the following molecule shall be referred to as R-32 and said molecule represents the general class of compounds having, but not limited to the following structure:

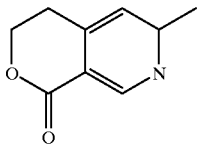

and physiologically acceptable salts of any and/or all of the foregoing.

As used herein and the appended claims the following molecule shall be referred to as R-33 and said molecule represents the general class of compounds having, but not limited to the following structure:

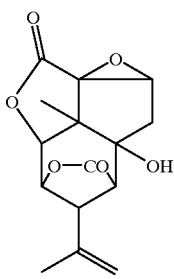

and physiologically acceptable salts of any and/or all of the foregoing.

As used herein and the appended claims the following molecule shall be referred to as R-34 and said molecule represents the general class of compounds having, but not limited to the following structure:

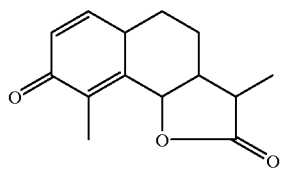

and physiologically acceptable salts of any and/or all of the foregoing.

As used herein and the appended claims the following molecule shall be referred to as R-35 and said molecule represents the general class of compounds having, but not limited to the following structure:

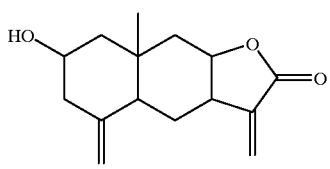

and physiologically acceptable salts of any and/or all of the foregoing.

As used herein and the appended claims the following molecule shall be referred to as R-36 and said molecule represents the general class of compounds having, but not limited to the following structure:

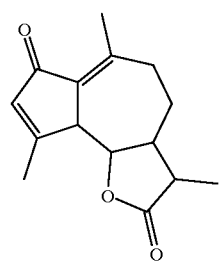

and physiologically acceptable salts of any and/or all of the foregoing.

The above examples and other natural products of this class may be transformed (as per the usage of this term defined above) to additional tastands by a variety of chemical modifications. Thus, we envisage additional tastands in which the above examples can be modified by variation of the valency or oxidation state of any carbon atom, in which epoxides may be opened by oxidation or nucleophilic substitution or may be reduced to alcohols, in which lactones may be converted to hydroxy acids or hydroxy acids may be cyclized to lactones, or in which enol tautomers are converted to the appropriate keto tautomer. Furthermore, the ring systems depicted in the above examples may be substituted with a variety of aliphatic, alicyclic, aromatic groups, hydroxy, amino, or other substituents of group 1 or 3, as defined above, and hydroxyl, amino or thio groups may be substituted with one of the substituents of group 2, as defined above. The stereochemical relationships of the substituents may be cis or trans, and chiral centers may be of R or S configuration. In all examples nitrogen or oxygen atoms may be substituted with group 2, substituents or mono or polysaccharides including but not restricted to those indicated in the above examples.

Illustrative of compounds of particular interest in this class are the following:

As used herein and the appended claims the following molecules shall be referred to as R-37:

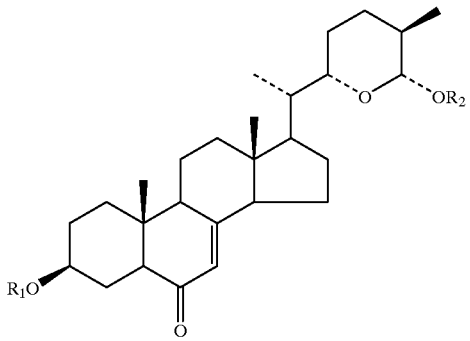

where:
1. $R_1=\beta$-D-glc, $R_2=\alpha$-L-rha-3-Me,
2. $R_1=\beta$-D-glc$^2$-$\alpha$-L-rha, $R_2$=H and physiologically acceptable salts of any and/or all of the foregoing.

As used herein and the appended claims the following molecule shall be referred to as R-38:

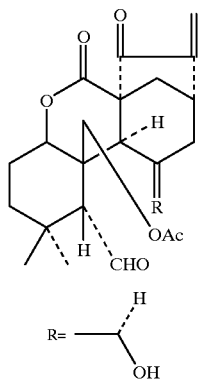

and physiologically acceptable salts of any and/or all of the foregoing.

As used herein and the appended claims the following molecules shall be referred to as R-39:

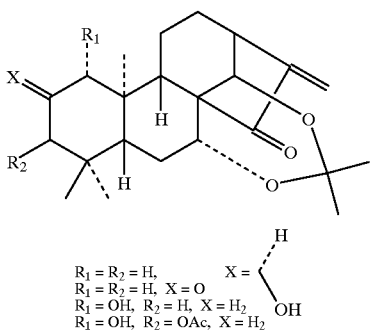

$R_1 = R_2 = H$, $X = $
$R_1 = R_2 = H$, $X = O$
$R_1 = OH$, $R_2 = H$, $X = H_2$
$R_1 = OH$, $R_2 = OAc$, $X = H_2$ and physiologically acceptable salts of any and/or all of the foregoing.

As used herein and the appended claims the following molecules shall be referred to as R-40:

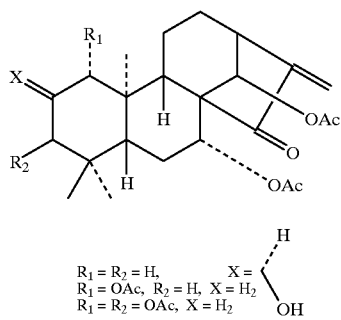

$R_1 = R_2 = H$, $X = $
$R_1 = OAc$, $R_2 = H$, $X = H_2$
$R_1 = R_2 = OAc$, $X = H_2$ and physiologically acceptable salts of any and/or all of the foregoing.

As used herein and the appended claims the following molecules shall be referred to as R-41:

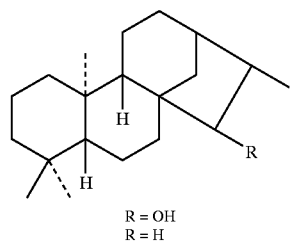

$R = OH$
$R = H$ and physiologically acceptable salts of any and/or all of the foregoing.

As used herein and the appended claims the following molecule shall be referred to as R-42:

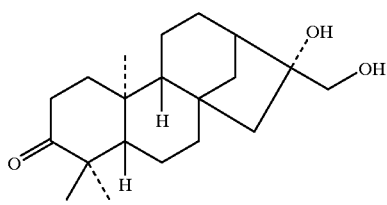

and physiologically acceptable salts of any and/or all of the foregoing.

As used herein and the appended claims the following molecule shall be referred to as R-43:

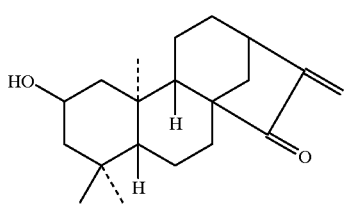

and physiologically acceptable salts of any and/or all of the foregoing.

As used herein and the appended claims the following molecule shall be referred to as R-44:

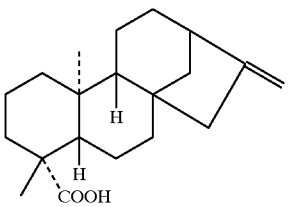

and physiologically acceptable salts of any and/or all of the foregoing.

As used herein and the appended claims the following molecule shall be referred to as R-45:

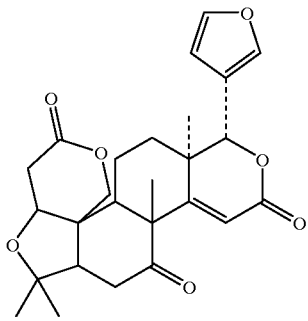

and physiologically acceptable salts of any and/or all of the foregoing.

As used herein and the appended claims the following molecule shall be referred to as R-46:

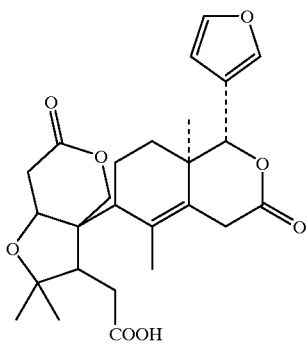

and physiologically acceptable salts of any and/or all of the foregoing.

As used herein and the appended claims the following molecules shall be referred to as R-47:

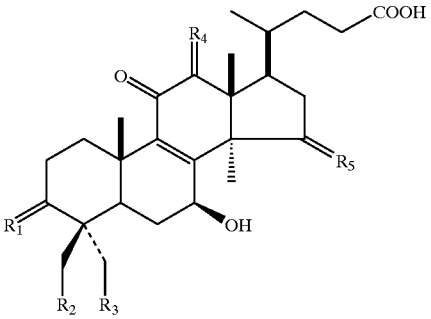

$R_1 = R_5 = O, \ R_2 = R_3 = H, \ R_4 = \beta\text{-OH}$
$R_1 = R_4 = \beta\text{-OH}, \ R_2 = R_3 = H, \ R_5 = O$
$R_1 = R_5 = O, \ R_2 = R_3 = H, \ R_4 = \alpha\text{-OH}$
$R_1 = O, \ R_2 = OH, \ R_3 = R_4 = H, \ R_5 = \alpha\text{-OH}$
$R_1 = \alpha\text{-OH}, \ R_2 = R_4 = H, \ R_3 = OH, \ R_5 = O$ and physiologically acceptable salts of any and/or all of the foregoing.

As used herein and the appended claims the following molecule shall be referred to as R-48:

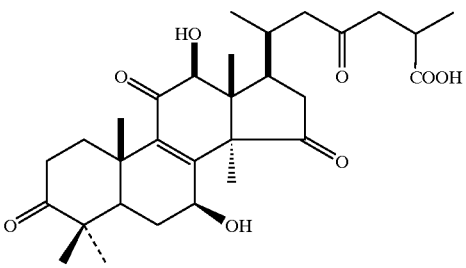

and physiologically acceptable salts of any and/or all of the foregoing.

As used herein and the appended claims the following molecule shall be referred to as R-49:

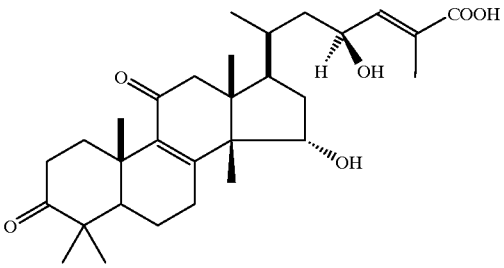

and physiologically acceptable salts of any and/or all of the foregoing.

As used herein and the appended claims the following molecule shall be referred to as R-50:

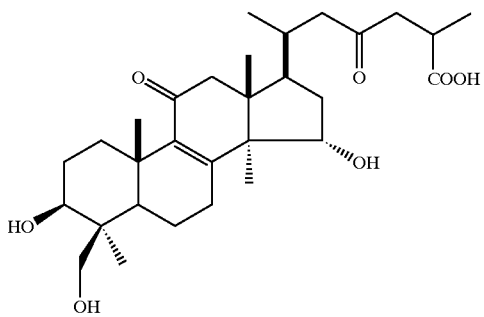

and physiologically acceptable salts of any and/or all of the foregoing.

As used herein and the appended claims the following molecule shall be referred to as R-51:

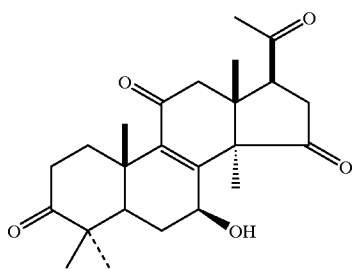

and physiologically acceptable salts of any and/or all of the foregoing.

As used herein and the appended claims the following molecules shall be referred to as R-52:

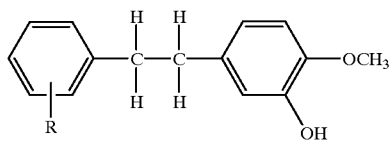

R = 3-OH
R = 3-OCH$_3$
R = 4-OCH$_3$
R = 3,4-dl-OCH$_3$
R = 3-COOC$_2$H$_5$
R = 4-COOC$_2$H$_5$
R = 3-CH$_3$OH
R = 4-CH$_2$OH
R = 4-Cl and physiologically acceptable salts of any and/or all of the foregoing.

As used herein and the appended claims the following molecule shall be referred to as R-53:

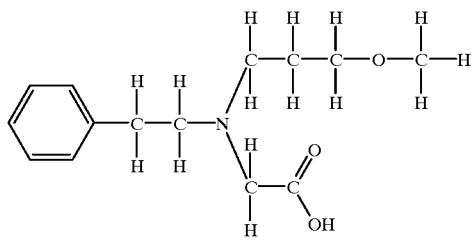

and physiologically acceptable salts of any and/or all of the foregoing.

As used herein and the appended claims the following molecule shall be referred to a R-54:

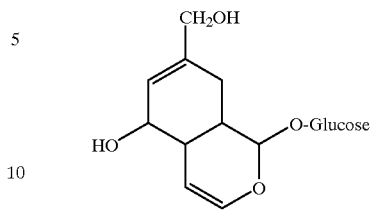

and physiologically acceptable salts of any and/or all of the foregoing.

As used herein and the appended claims the following molecules shall be referred to as R-55:

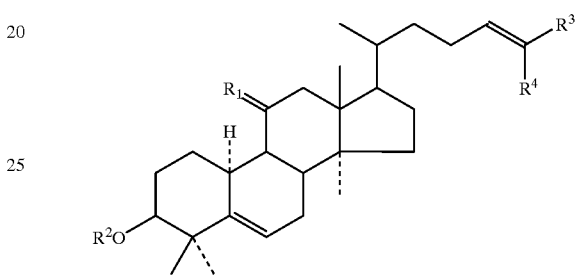

$R_1 = \alpha$-OH, $R_2$ = H, $R_3$ = CH$_2$OH, $R_4$ = CH$_3$
$R_1 = \alpha$-OH, $R_2$ = H, $R_3$ = CH$_2$O-Glc-Glc, $R_4$ = CH$_3$
$R_1 = \alpha$-OH, $R_2$ = H, $R_3$ = CH$_2$O-Glc, $R_4$ = CH$_3$
$R_1$ = O, $R_2$ = H, $R_3$ = OH, $R_4$ = CH$_3$
$R_1$ = O, $R_2$ = H, $R_3$ = CH$_2$O-Glc-Glc, $R_4$ = CH$_3$
$R_1$ = O, $R_2$ = Glc, $R_3$ = CH$_2$O-Glc, $R_4$ = CH$_3$
$R_1 = \beta$-OH, $R_2$ = H, $R_3$ = CH$_3$, $R_4$ = CH$_2$OH
$R_1$ = O, $R_2$ = Glc, $R_3$ = CH$_3$, $R_4$ = CH$_2$—O-Glc
$R_1$ = O, $R_2$ = H, $R_3$ = CH$_3$, $R_4$ = CH$_2$—O-Glc-Glc
Glc-$\beta$-D-glucopyranosyl and physiologically acceptable salts of any and/or all of the foregoing.

The class of compounds having the structure, or structures closely related to the following molecule which as used herein and the appended claims shall be referred to as S-1:

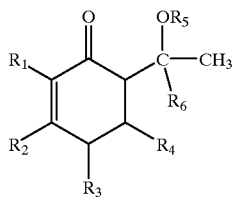

wherein $R_1$, $R_2$, $R_3$, and $R_4$ which may be the same or different are each designated by one of the substituents of Group 1. $R_5$ is represented by one of the substituents of Group 2, and $R_6$ is represented by one of the substituents of Group 3, wherein $R_1$, $R_2$, $R_3$, $R_4$, $R_5$, and $R_6$, may be present in any combination; and in addition where C=C bonds exist the level of saturation may be decreased, and where CH—CH bonds exist the level of unsaturation my be increased, and physiologically acceptable salts of any and/or all of the foregoing.

Of particular interest is the compound having the structure (commonly known as epihernandulcin):

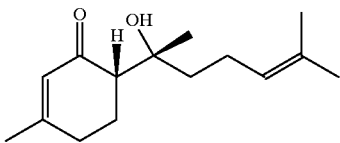

T. The class of compounds having the structure (or structures closely related to) which as used herein and the appended claims shall be referred to as T-1:

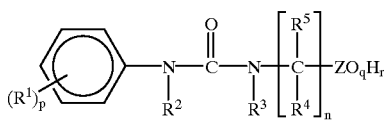

wherein p may be 1, 2, 3, 4 or 5; $R^1$, which may be the same or different, are each represented by one of the substituents of Group 1 in any combination; $R^2$ and $R^3$, which may be the same or different, are each represented by one of the substituents of Group 2; each $R^4$ and $R^5$ may be independently represented by one of the substituents of Group 3 and wherein $R^1$, $R^2$ $R^3$ $R^4$, and $R^5$ may be present in any combination; n may be 0, 1, 2, 3, 4, 5, 6, 7, 8, 9, 10, 11, 12, 13, 14, 15, 16, 17, 18, 19, or 20; Z may be an element selected from the group consisting of carbon, sulfur, boron, or phosphorus; q is an integer from 2 to 3 and r is an integer from 1 to 3, when Z is C, q is 2; when Z is S, P or B, q may be 2 or 3; when Z is C or S, r is 1; when Z is P or B, r is 2; and in addition where CH—CH or $CH_2$—$CH_2$ bonds exist the level of unsaturation nay be increased, and physiologically acceptable salts of any and/or all of the foregoing.

Illustrative of compounds of particular interest in this class are:

1. $R^2$=$R^3$=$R^4$=$R^5$=H, n=2, $R^1$=p-cyano, Z=C, q=2 r=1, p=1
2. $R^2$=$R^3$=$R^4$=$R^5$=H, n=2, $R^1$=p-nitro, Z=C, q=2, r=1, p=1
3. $R^1$=p-cyano; $R^2$=$R^3$=$R^4$=$R^5$=H, n=1, Z=P, q=3, r=2, p=1
4. $R^1$=p-nitro; $R^2$=$R^3$=$R^4$=$R^5$=H, n=1, Z=P, q=3, r=2, p=1
5. $R^1$=p-cyano; $R^2$=$R^3$=$R^4$=$R^5$=H, n=1, Z=S, q=3, r=1, p=1
6. $R^1$=p-nitro; $R^2$=$R^3$=$R^4$=$R^5$=H, n=1, Z=S, q=3, r=1, p=1 and physiologically acceptable salts of any and/or all of the foregoing.

U. The class of compounds having the structure (or structures closely related to) which as used herein and the appended claims shall be referred to as U-1:

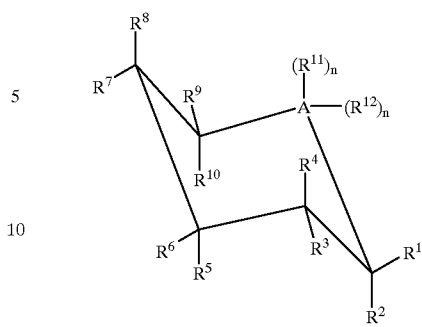

wherein A may be O(oxygen), S(sulfur), or C(carbon), and when A is C, n is 1 and when A may be O or S, n is zero; $R^1$, $R^2$, $R^3$, $R^4$, $R^5$, $R^6$, $R^7$, $R^8$, $R^9$, $R^{10}$, $R^{11}$ and $R^{12}$, which may be the same or different, and which may be present in any combination, may each be represented by one of the following: one of the substituents of "Group 1", O—$R^{13}$, NH—$R^{13}$, N—($R^{13}$)$_2$, or S—$R^{13}$, where $R^{13}$ is represented by one of the substituents of "Group 2"; or two R substituents may be dehydrated to form an anhydride linkage; or two R substituents may form a cyclic structure; and in addition where CH—CH or $CH_2$—$CH_2$ bonds exist-the level of unsaturation may be increased, and physiologically acceptable salts of any and/or all of the foregoing.

One skilled in the art would recognize the six membered (pyranose) rings of this class may isomerize to five membered (furanose) rings as is well known for many sugars.

Illustrative of compounds of particular interest in this class are:

1. 6-chloro-6-deoxytrehalose,
2. 6',6-dichloro-6',6-dideoxytrehalose,
3. 6-chloro-6-deoxy-D-galactose,
4. 6-chloro-6-deoxy-D-mannose,
5. 6-chloro-6-deoxy-D-mannitol,
6. methyl-2,3-di-(glycyl-glycyl)-α-D-glucopyanoside,
7. methyl-2-O-methyl-α-D-glucopyranoside,
8. methyl-3-O-methyl-α-D-glucopyranoside,
9. methyl-4-O-methyl-α-D-glucopyranoside,
10. methyl-6-O-methyl-α-D-glucopyranoside,
11. 2,2'-di-O-methyl-α,α-trehalose,
12. 3,3'-di-O-methyl-α,α-trehalose,
13. 4,4'-di-O-methyl-α,α-trehalose,
14. 6,6'-di-O-methyl-α,α-trehalose,
15. 6'-O-methylsucrose,
16. 4'-O-methylsucrose,
17. 6,6'-di-O-methylsucrose,
18. 4,6'-di-O-methylsucrose,
19. 1,6'-di-O-methylsucrose,
20. cyclohexane 1,2/4,5 tetrol,
21. (+)-cyclohexane 1,3,4/2,5 pentol[(+)-proto quercitol],
22. (−)-cyclohexane 1,3,4/3,5 pentol[(−)-vibo quercitol],
23. cyclohexane 1,2,3/4,5,6 hexol [neo Inositol],
24. cyclohexane 1,2,3,5/4,6 hexol [myo Inositol],
25. cyclohexane 1,2,4,5/3,6 hexol [muco Inositol],
26. methyl-β-D-arabinopyranoside,
27. methyl-3-deoxy-α-D-arabinohexopyranoside,
28. 3-deoxy-α-D-arabinohexopyranosyl-3-deoxy-α-D-arabinohexopyranose, 29. 2-deoxy-α-D-ribo-hexopyranosyl-2-deoxy-α-D-ribohexopyranose, 30. 3-deoxy-α-D-ribo-hexopyranosyl-3-deoxy-α-D-ribohexopyranose, 31. 1,6-anhydro-3-dimethylamino-3-deoxy-β-D-glucopyranose, 32. 1,6-anhydro-3-dimethylamino-3-deoxy-β-D-altropyranose, 33. 1,6-anhydro-3-acetamido-3-deoxy-β-D-glucopyranose, 34. 1,6-anhydro-3-acetamido-3-deoxy-β-D-gulopyranose, 35. 1,6-anhydro-3-amino-3-deoxy-β-D-gulopyranose, 36. methyl-3,6-anhydro-α-D-glucopyranoside, 37. 3,6-anhydro-α-D-glucopyransyl-3,6-anhydro-α-D-glucopyranoside, 38. 3,6-anhydro-α-D-glucopyransyl-3,6-anhydro-β-D-fructofuranoside, 39. 3,6-anhydro-α-D-glucopyransyl-1,4:3,6-dianhydro-β-D-fructofuranoside, and physiologically acceptable salts of any and/or all of the foregoing.

V. The class of compounds having the structure (or structures closely related to) which as used herein and the appended claims shall be referred to as V-1:

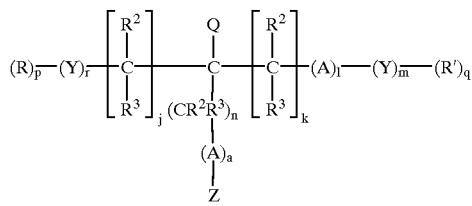

wherein a, r, l, and m may be 0 or 1; n, j, and k are 0, 1, 2, or 3; each $R^2$ and $R^3$ which may be the same or different independently may each be represented by one of the substituents of group 3; Y (which may be the same or different) may be N (nitrogen), O (oxygen), or S (sulfur); when r or m is 1 and Y is N, p or q may be 2 or 3, when r or m is 1 and Y is O, p or q is 1; when r or m is 1 and Y is S, p may be 1 or 2; A may be H, C=O, O=S=O, S=O, O=P(H)OH, O=P(OH)$_2$, or O=B(H)OH; Q is represented by one of the substituents of Group 3; R (which may be the same or different when p>1) and R' (which may be the same or different when q>1) are represented by one of the substituents of Group 2 or one of the following three structures (as used herein and the appended claims the structures shall be referred to as V-2) in any combination and the appropriate stereochemistry:

V-2

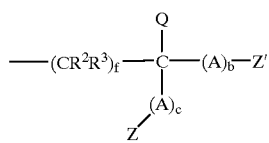

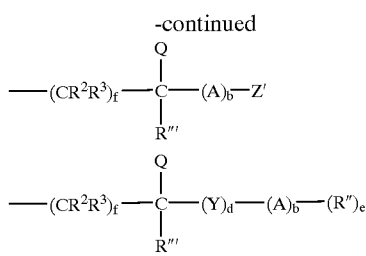

wherein Y (which may be the same or different) may be N (nitrogen), O (oxygen), or S (sulfur); when d is 1 and b is 0 and Y is N, e may be 2 or 3, when d is 1 and b is 0 and Y is O, e is 1; f may be 0, 1, 2, 3, 4, 5, 6, 7, 8, 9, 10; when d is 1 and b is 0 and Y is S, e may be 1 or 2; A may be H, C=O, O=S=O, S=O, O=P(H)OH or O=P(OH)$_2$, O=B(H)OH; Q is represented by one of the substituents of Group 3; R''' and Q together may form a cyclic structure; any of the $R^3$'s and Q together may form a cyclic structure; any of the $R^3$'s and R''''s together may form a cyclic structure; b may be 0, 1, or 2 and c may be 0 or 1; Z and Z' are the same or different and are represented by OH, —O$^-$X$^+$, OR'', NH$_2$, NHR'', N(R'')$_2$; R'' may be alkyl, branched alkyl, aryl, aralkyl, alkaryl, cycloalkyl, substituted alkyl, substituted cycloalkyl substituted aryl, substituted aralkyl, substituted alkaryl, and R''' may be alkyl, branched alkyl, aryl, aralkyl, alkaryl, cycloalkyl, substituted alkyl, substituted cycloalkyl, substituted aryl, substituted aralkyl, substituted alkaryl, or an amino acid side chain (e.g. one of the 20 common amino acids); and in addition where CH—CH or CH$_2$—CH$_2$ bonds exist the level of unsaturation may be increased. X$^+$ may be H$^+$ or a physiologically acceptable cation, preferably an alkali metal, alkaline earth metal or ammonium cation, and physiologically acceptable salts of any and/or all of the foregoing.

Illustrative of compounds of particular interest in this class are:

1. N-(L-aspartyl)-p-aminobenzenesulfonic acid,

2. N-(aminomalonyl)-p-aminobenzenesulfonic acid, 3. amino ethane phosphoric acid, 4. N-[N-(p-cyanophenylcarbamoyl)-L-aspartyl]-p-aminobenzenesulfonic acid, 5. N(-L-aspartyl)-1-aminocyclopentane-1-carboxylic acid, 6. N(-L-aspartyl)-1-aminocyclopropane-1-carboxylic acid, 7. N(-L-aspartyl)-1-aminocyclooctane-1-carboxylic acid, 8. N(-L-aspartyl)-1-aminocyclohexane-1-carboxylic acid, 9. N(-L-aspartyl)-2-aminocyclopentane-1-carboxylic acid, and physiologically acceptable salts of any and/or all of the foregoing.

W. The class of compounds having the structure (or structures closely related to) which as used herein and the appended claims shall be referred to as W-1:

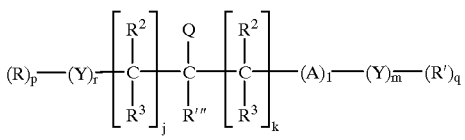

wherein r, 1, and m may be 0 or 1; j, and k may be 0, 1, 2, or 3; each $R^2$ and $R^3$ which may be the same or different independently may each be represented by one of the substituents of group 3; Y (which may be the same or different) may be N (nitrogen), O (oxygen), or S (sulfur); when r or m is 1 and Y is N, p or q may be 2 or 3, when r or m is 1 and Y is O, p or q is 1; when r or m is 1 and Y is S, p may be 1 or 2; A may be H, C=O, O=S=O, S=O, O=P(H)OH, O=P(OH)$_2$, or O=B(H)OH; Q is represented by one of the substituents of Group 3; R'" and Q together may form a cyclic structure; any of the $R^3$'s and Q together may form a cyclic structure; any of the $R^3$'s and R'" together may form a cyclic structure; R (which may be the same or different when p>1) and R' (which may be the same or different when q>1) are represented by one of the substituents of Group 2 or one of the following three structures (as used herein and the appended claims the structures shall be referred to as W-2) in any combination and the appropriate stereochemistry:

V-2

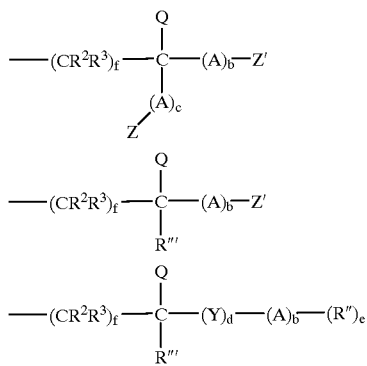

wherein Y (which may be the same or different) may be N (nitrogen), O (oxygen), or S (sulfur); when d is 1 and b is 0 and Y is N, e may be 2 or 3, when d is 1 and b is 0 and Y is O, e is 1; f may be 0, 1, 2, 3, 4, 5, 6, 7, 8, 9, 10; when d is 1 and b is 0 and Y is S, e may be 1 or 2; A may be H, C=O, O=S=O, S=O, O=P(H)OH or O=P(OH)$_2$, O=B(H)OH; Q is represented by one of the substituents of Group 3; b may be 0, 1, or 2 and c may be 0 or 1; Z and Z' are the same or different and are represented by OH, —O$^-$X$^+$, OR", NH$_2$, NHR", N(R")$_2$; R" may be alkyl, branched alkyl, aryl, aralkyl, alkaryl, cycloalkyl, substituted alkyl, substituted cycloalkyl substituted aryl, substituted aralkyl, substituted alkaryl, and R'" may be alkyl, branched alkyl, aryl, aralkyl, alkaryl, cycloalkyl, substituted alkyl, substituted cycloalkyl, substituted aryl, substituted aralkyl, substituted alkaryl, or an amino acid side chain (e.g. one of the 20 common amino acids); and in addition where CH—CH or CH$_2$—CH$_2$ bonds exist the level of unsaturation may be increased. X$^+$ may be H$^+$ or a physiologically acceptable cation, preferably an alkali metal, alkaline earth metal or ammonium cation, and physiologically acceptable salts of any and/or all of the foregoing.

Illustrative of compounds of particular interest in this class are:

1. L-ornithyl-taurine
2. L-ornithyl-β-alanine
3. L-lysyl-taurine
4. L-diaminobutyryl-taurine
5. L-diaminobutyryl-β-alanine
6. L-diaminopropionyl-β-alanine
7. L-diaminopropionyl-taurine
8. L-lysyl-β-alanine
9. L-methionyl-taurine
10. L-methionyl-β-alanine
11. N-(L-ornithyl-)-p-aminobenzenesulfonic acid and physiologically acceptable salts of any and/or all of the foregoing.

X. The general class of compounds commonly referred to as chelators. These are molecules capable of chelating with, binding with, complexing with or coordinating with metal ions. Included in this class are the physiologically acceptable salts of any and/or all of the foregoing.

Illustrative of compounds of particular interest in this class are:

1. Ethylenediaminetetraacetic acid (EDTA) and physiologically acceptable salts thereof.
2. Tartaric acid and physiologically acceptable salts thereof.
3. Lactic acid and physiologically acceptable salts thereof.
4. Ascorbic acid and physiologically acceptable salts thereof.

It should be understood that the present invention contemplates the use of chelating agents that have varying degrees of affinity for metal ions relative to the above listed compounds. Many of these more or less effective compounds are listed in A through W hereinabove. A few illustrative examples are:

1. 2,4-Dihydroxybenzoic acid,
2. 3,4-Dihydroxybenzoic acid,
3. α-Amino acids,
4. α-Hydroxy acids,
5. peptides,
6. sulfonamides,
7. β-Amino acids, and physiologically acceptable salts thereof.

Y. Tastand Enhancers: The effectiveness of any individual tastand as described in Classes A–X may be enhanced by one surfactant while the same surfactant may lessen the effectiveness of other tastands or not affect that particular tastand at all.

Illustrative examples of surfactants:

1. tergitols
2. pluronics
3. poloxamars
4. quaternary ammonium salts
5. sorbitans
6. tritons
7. polyoxyethene ethers
8. sulfonic acid salts Surfactants can increase the effectiveness of some tastands while the same surfactant may lessen the effectiveness of other tastands or not affect that particular tastand at all. Surfactants may affect each tastand differently. The surfactant that affects one particular tastand in a positive, negative or neutral sense may affect another tastand differently (i.e. a positive, negative or neutral sense and not necessarily in the same way).

Z. Tastand Model: In 1967, Shallenberger and Acree (Nature (London) 1967, 216, 480–482; which is hereby incorporated by reference) proposed that all compounds that elicit a sweet taste response possess an AH, B system (AH being a hydrogen bond donor and B being a hydrogen bond acceptor) separated by about 0.28 to 0.40 nm. In this theory, AH was OH or NH and B an oxygen atom in groups such as $CO_2H$, $SO_2H$, $SO_2$, $CO$, $NO_2$, the nitrogen atom of CN, or even a halogen. For instance, in L-aspartyl-L-phenylalanine methyl ester the $NH_3^+$ is the AH and the $COO^-$ is the B. They suggested that such compounds interacted with a sweet receptor by a pair of reciprocal hydrogen bonds (a complementary AH, B system). This theory was widely accepted by most of the researchers in the field.

In 1972, Kier (J. Pharm. Sci. 1972, 61, 1394; which is hereby incorporated by reference) expanded on the model of Shallenberger and Acree and proposed the existence of a third binding site which involved a hydrophobic interaction, which he designated as X. A molecule which would interact with all three (AH, B, and X) would be a higher potency sweetener than one which only interacted with the AH, B site. Ariyoshi (Bull. Chem. soc. Japan, 1974, 47, 326–330; which is hereby incorporated by reference) and van der Heijden (Feed Chem. 1978, 3, 207; which is hereby incorporated by reference) added configurational restraints for the X group, that resulted in assigning a 5.5 nm spacing for the B and X sites and a 3.5 nm separation for the AH and X sites. This model has become widely accepted and has been studied extensively by a number of researchers including Goodman and co-workers, Temussi and co-workers, Tinti and Nofre and co-workers, and Belitz who has also studied the requirements for bitter response in his modeling systems.

Goodman (Sweeteners, ACS Symposium Series 450, Chapt. 10, 128–142; which is hereby incorporated by reference) has further refined the requirements necessary for a molecule to elicit a sweet response by developing three dimensional requirements for the AH, B, X system. Tinti and Nofre (Sweeteners, ACS Symposium Series 450, Chapter 7 and 15; which are hereby incorporated by reference) have identified a fourth primary binding site which they call "D" (they refer to the "X" site as "G") and four secondary binding sites (FIG. 1). The D site in a sweetener is a hydrogen bond accepter group and appears to be particularly effective when this group is a —CN or a —$NO_2$ group. Using this 8 centered model, they have developed extremely potent sweeteners which interact with all four primary sites and several secondary sites.

Goodman (J. Am. Chem. Soc. 1987, 101, 4712–4714; which is hereby incorporated by reference) reports that the four stereoisomeric tetramethylcyclopentane compounds; L-aspartyl-L-alanyl-2,2,5,5-tetramethylcyclopentyl amide, L-aspartyl-D-alanyl-2,2,5,5-tetramethylcyclopentyl amide, N-(L-aspartyl)-N'-(tetramethylcyclopentanoyl)-(S)-1,1-diaminoethane and N-(L-aspartyl)-N'-(2,2,5,5-tetramethylcyclopentanoyl)-(R)-1,1-diaminoethane, present a unique opportunity to study structure-taste relationships. Small changes in the overall topology affect the taste of these analogs (the L,L amide is bitter while the L,D amide and the retro-inverso analogs are intensely sweet). In addition, the bulky tetramethylcyclopentane group greatly decreases the conformational mobility of the peptide, allowing for a more complete analysis by NMR. With the assumption of a trans peptide bond and a nearly planar zwitterionic ring for the aspartyl moiety, the structure of the compounds can be determined from an extensive conformational analysis by NMR. The coupling constants, NOE values, and temperature coefficients used in defining the conformations of the four molecules were reported. The preferred minimum energy conformations are shown in FIG. 2. Based on the results of this conformational study, Goodman proposed a model for sweet tasting analogs which contains elements of the models proposed by Kier, Temussi, van der Heijden, Tinti and Nofre, and Shallenberger and Acree. The conformation of a sweet molecule can be described as possessing an "L shape", with the A–H and B zwitterionic ring of the aspartyl moiety forming the stem, and the hydrophobic X (G in the Tinti-Nofre model) group forming the base of the L (FIG. 3). Planarity of the molecule in the x and y dimensions is critical for sweet taste, substantial deviation from this plane into the z dimension is correlated with tasteless (+z) or bitter (−z) molecules. The existence of the aspartyl zwitterionic ring cannot be proven conclusively but can be assumed a priori on the basis of evidence obtained from NMR experiments. The Cα—Cβ bond of the aspartyl residue possesses a staggered conformation with the carboxyl moiety and the amino group in the gauche position and the $sp^2$ plane of the terminal aspartyl carboxylate carbon atom and the Cα—Cβ bond coplanar. These conditions are conformationally favorable for the formation of the zwitterionic aspartyl ring.

The X-ray structure of L-aspartyl-L-phenylalanine methyl ester has been solved by Kim (J. Am. Chem. Soc. 1985, 107, 4279; which is hereby incorporated by reference). Crystallization was achieved in the tetragonal space group $P4_1$ with four L-aspartyl-L-phenylalanine methyl ester molecules and one water molecule per unit cell. The molecule shows an extended conformation with trans peptide bonds. However, the phenyl ring is perpendicular to the peptide backbone and not coplanar with the zwitterionic ring of aspartic acid as would be predicted for a sweet dipeptide. This twisting of the phenyl ring is due to packing forces within the crystal structure which result in stacking of adjacent L-aspartyl-L-phenylalanine methyl ester molecules into stable columnar structures. The isolated molecule from the crystal structure can be rotated 40° about the $\phi_{(Phe)}$ bond, to achieve an isoenergetic conformation in which the rings are coplanar. This conformation correlates closely to our proposed model for the structure of sweet dipeptides in solution (FIG. 3). Of course, in solution the L-aspartyl-L-phenylalanine methyl ester molecule is solvated and devoid of packing forces. Thus, the inherent flexibility of this linear peptide will easily accommodate the "L-shape" conformation required by the model. FIG. 4 depicts L-aspartyl-L-phenylalanine methyl ester in the L "shape" required for sweet taste in the Goodman model superimposed in the 8-centered Tinti and Nofre model. In this configuration the $NH_3^+$, $COO^-$, and phenyl ring fit well into the AH, B and G sites required for a sweet taste in the Tinti and Nofre model as well as the AH, B and X sites of the Goodman model.

Belitz (ACS, Food Taste Chemistry, 1979, 93–131; which is hereby incorporated by reference) describes minimum requirements for bitter taste perception as a molecule possessing an AH group and a hydrophobic moiety. Using the model ascribed to Goodman above the hydrophobic moiety of Belitz would be in the −z (or bitter taste) region described by Goodman.

It is a plausible consequence of the above models that molecules capable of binding to one or more of the taste receptor "sites" as described by these researchers, and their models, and which do not allow a hydrophobic group into the "X" (or G, sweet taste) region or into the (−z) (bitter taste) area, is likely to be tasteless (or nearly tasteless). Such a molecule (a tastand as described herein above) would be predicted to competitively bind to the receptor and cause inhibition of one or more of the tastes (sweet, bitter, organic bitter) produced by such a receptor.

What we have found is that if a molecule is bitter or sweet and interacts with the receptor site as described by the above models and such a molecule can be transformed in such a manner as to displace the hydrophobic portion of the molecule from the X (G, sweet taste) zone, and in such a manner that the hydrophobic portion does not interact with the bitter taste (−z) zone, that such a molecule will tend to be tasteless. Furthermore, the transformation of the hydrophobic zone substituent to a hydrophilic substituent, and/or the increasing or decreasing of the size of the hydrophobic substituent, and/or the increasing or decreasing of the distance between the various hydrogen bonding and hydrophobic interaction sites, may result in a change in binding conformation and/or structure in a manner which prevents substantial interaction with the sweet taste (G or X) zone or substantial interaction with the bitter taste (−z) zone, thus, generating a substantially tasteless molecule.

We have found that an inhibitor of sweet taste or bitter taste may interact in various ways with the receptor site. Consequently, depending on the nature of the interaction of a tastand with the receptor, said tastand may be capable of competing favorably against one class of compounds, say for instance sweeteners, and unfavorably against other classes of compounds such as bitter compounds.

Another consequence of our finding is that a model explaining both sweet and bitter taste might include the possibility that there are separate receptors or receptor sites for sweet and bitter taste perception. Thus, if a tastand were to interact with only one of these receptors or receptor sites it could completely eliminate one sensation without affecting the other.

It has also been reported and we have found that there are at least two types of bitter taste. One is organic bitter taste which is elicited by compounds such as caffeine and the other is the bitter taste elicited by inorganic molecules like potassium ion. Consequently, a tastand may compete favorable against organic bitter taste, perhaps even favorably against sweet taste as well, and unfavorably against potassium ion, depending on the sites of interaction. Conversely the tastand may compete favorably against potassium ion and unfavorably against organic bitter or sweet tastes.

As an example of the transformations which are capable of eliciting the responses just described, L-aspartyl-L-phenylalanine methyl ester is approximately 200 times sweeter than sucrose. L-Aspartyl-L-phenylalanine methyl ester can be transformed to a bitter compound by changing the L-phenylalanine methyl ester to D-phenylalanine methyl ester (which places the phenyl ring in the −z (bitter taste) zone. L-Aspartyl-L-phenylalanine methyl ester can also be transformed to a tasteless compound by changing the methyl ester to a carboxylic acid. L-Aspartyl-L-phenylalanine (L-aspartyl-L-phenylalanine methyl ester minus the methyl ester) is tasteless and has been shown to effectively block the bitter taste of potassium ion. L-Aspartyl-L-phenylalanine has minimal effect on the sweet taste of L-aspartyl-L-phenylalanine methyl ester but does block the sweet taste of sucrose at very high concentrations (relative to the sucrose). L-Aspartyl-L-phenylalanine has very little effect on the bitter taste of caffeine but does block the off-taste associated with L-aspartyl-L-phenylalanine methyl ester. N-(p-Cyanophenylcarbamoyl)-L-aspartyl-L-phenylalanine methyl ester as described by Tinti and Nofre is 14,000 times sweeter than sucrose. When this compound is transformed into N-(p-cyanophenylcarbamoyl)-L-aspartyl-L-phenylalanine, i.e. the super sweetener minus the methyl ester, the compound becomes essentially tasteless. This compound can now interact with the AH, B and D, but not with the X(G), portions of the receptor site and we have found that this compound effectively blocks the bitter taste of potassium ion and the bitter taste of caffeine while having only a very small effect on the sweet taste of sucrose. N-(p-cyanophenylcarbamoyl)-aminomethanesulfonate which possesses a D and B site, and is essentially tasteless inhibits organic bitter taste (caffeine) and sweet taste, but not the bitter taste associated with potassium chloride. Taurine and β-alanine which both possess an AH, B array are both example of tastands.

Consequently, it is possible to tailor compounds by transforming known sweeteners or known bitter compounds into essentially tasteless molecules capable of either blocking the sweet taste response, the organic bitter taste response, the inorganic bitter taste response or various combinations of each. Thus, a new and previously unanticipated teaching of this invention is that the models of Goodman and coworkers and others can be used to predict tasteless compounds which can be used as tastands as described herein. Such tastands are predicted to be tasteless or nearly tasteless compounds which can be generated by transformation of a sweet or bitter compound in a manner that eliminates hydrophobic interactions in the −z or X(G) areas (as defined by Goodman or Tinti and Nofre) of the taste receptor(s). Such tastands are capable of blocking or inhibiting any one or any combination of the three tastes; sweet, organic bitter or inorganic bitter.

A molecule need only interact with one of the hydrogen bonding sites described above and have little or no hydrophobic interaction in the X(G) zone or −z zone to be a tastand. Frequently molecules capable of interacting with only one hydrogen bonding site and having a hydrophobic moiety will possess sufficient flexibility (depending on size) to enter the −z zone and will consequently be bitter tasting. Molecules with the ability to hydrogen bond with more than one complementary site on a receptor will have a better chance of keeping hydrophobic groups out of the X(G) and −z zone, and consequently should have a high probability of being a tastand.

According to the above logic, molecules which can interact with the reciprocal AH and/or B hydrogen bonding sites on a receptor as described by Goodman (FIG. 3) and whose conformation and/or structure prevents any hydrophobic interactions in the X (sweet taste) region and which also do not allow hydrophobic interactions in the −z (bitter taste) zone are tastands as defined herein.

Also, according to the above logic, molecules which can interact with the reciprocal AH and/or B and/or D (or secondary sites) hydrogen bonding sites on a receptor as described by Tinti and Nofre (FIG. 1) and whose conformation and/or structure prevents any hydrophobic interactions with the G (sweet taste) region and which also do not allow hydrophobic interactions in the −z (bitter taste) zone which is developed when the AH, B, D, G system of Tinti and Nofre is superimposed into the AH, B, X system of Goodman (FIG. 4), are tastands.

As used herein and the appended claims AH, B, D, $E_1$, $E_2$, XH, Y, X, G, "L shape", and the coordinates of x, y, z are defined hereinabove.

Figure 2D:
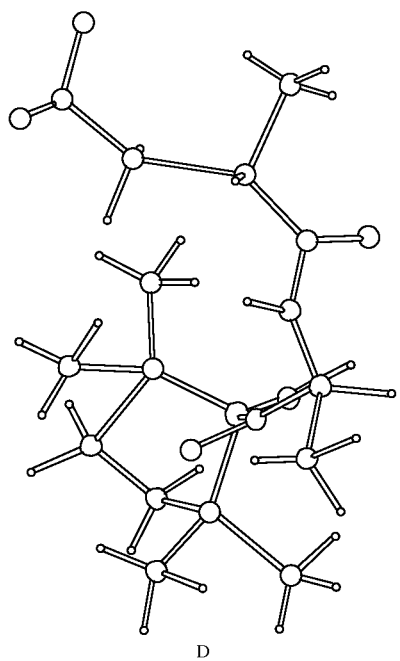

FIG. 1.
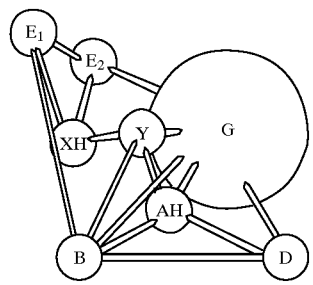
AH—Hydrogen Bond Donor Group
B—Hydrogen Bond Acceptor Group
G—Hydrophobic Group
D—Hydrogen Bond Acceptor Group
XH—Weak Hydrogen Bond Donor Group
Y—Weak Hydrogen Bond Acceptor Group
$E_1$—Weak Hydrogen Bond Acceptor Group
$E_2$—Weak Hydrogen Bond Acceptor Group
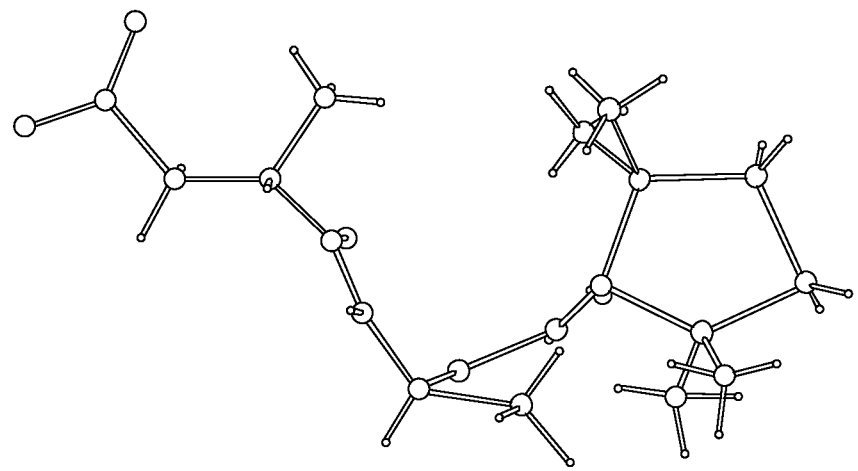
Figure 2a
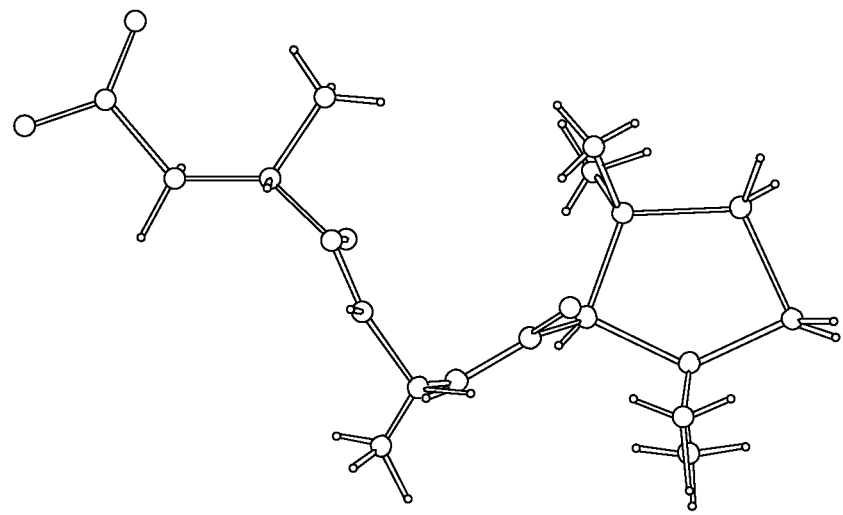
Figure 2b -continued FIG. 2a–d. Preferred minimum energy conformations of (A) N-(L-aspartyl)-N'-(tetramethylcyclopentanoyl)-(R)-1,1-diaminoethane, (B) N-(L-aspartyl)-N'-(tetramethylcyclopentanoyl) (S)-1,1-diaminoethane, (C) L-aspartyl-D-alanyl-tetramethylcyclopentylamide and (D) L-aspartyl-L-alanyl-tetramethylcyclopentylamide.

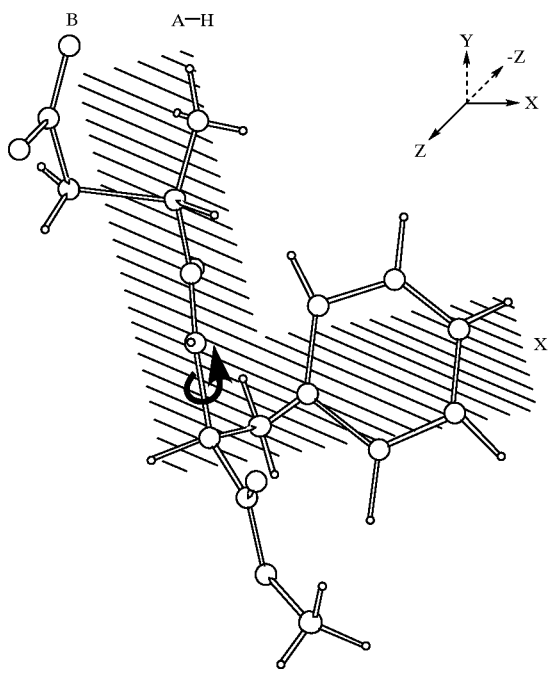

FIG. 3. The Goodman model for the sweet taste with L-aspartyl-L-phenylalanine methyl ester superimposed. The φ bond, shown by the arrow, has been rotated 40° from the X-ray diffraction structure. In addition, the hydrogen atoms have been added, with the standard bond lengths and angles. The AH-B and X groups of the molecule are illustrated according to the Shallenberger-Kier suggestions.

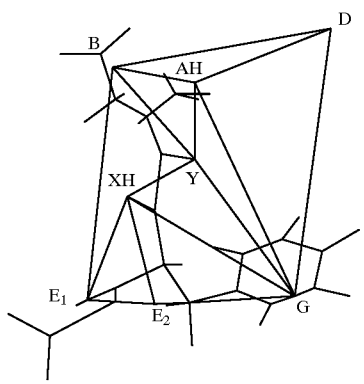

FIG. 4. L-aspartyl-L-phenylalanine methyl ester in the "L-shape" proposed by Goodman for the sweet taste receptor superimposed into the 8-centered model proposed by Tinti and Nofre.

Many of the above tastands exist as racemic mixtures(±), minus (−), plus (+), or diastereomeric optical isomers. It should be understood that the present invention contemplates use of the tastands in either the racemate or as the individual optical isomers. It is likely that one or the other of the optical isomers of the racemic tastands possess the greater, if not all, of the blocking or tastand activity. For example, it has been found that the (−) isomer of 2-(4-methoxyphenoxy)propionic acid possesses the majority of the activity that reduces undesirable tastes. The use of the most active isomer alone is advantageous in that far less tastand is needed to gain the desired reduction in undesirable taste(s).

It has further been found that tastands described above and in particular (−)-2-(4-methoxyphenoxy)propionic acid, in addition to inhibiting bitter taste also enhances the salty taste of sodium containing compounds, if employed in sufficient concentrations. Thus, the present invention contemplates the preparation of eatables containing, for example, low sodium chloride and the tastands in an amount sufficient to enhance the salty taste of sodium chloride.

Moreover, the present invention contemplates the preparation of eatables comprised of a mixture of substances having an undesirable taste such as potassium chloride, magnesium chloride with sodium chloride and/or ammonium chloride in conjunction with the tastands referred to herein in an amount that both reduces the undesirable taste(s) and enhances the salty taste of the sodium chloride. Preferred eatable admixture products of the invention comprise from slightly more than 0 up to about 300% by weight of substances with undesirable tastes such as, for example, potassium chloride and magnesium chloride and 0 to 50% by weight sodium chloride in combination with effective concentrations of a tastand(s), typically 0.001% to about 50% preferable 0.1% to about 5%.

Moreover, the present invention contemplates the preparation of eatables such as breads, biscuits, pancakes, cakes, pretzels, snack foods, baked goods etc. prepared using for example potassium bicarbonate or potassium carbonate in place of the sodium salts as leavening agents in conjunction with a tastand in an amount sufficient to eliminate the undesirable taste associated with potassium ion or other tastes. The tastand is typically present in an amount ranging from about 0.001% to about 50% by weight, preferably about 0.1% to about 10% by weight, of the material with the undesirable taste. The present invention also contemplates the preparation of preservatives for eatables comprised of the potassium salts of benzoate, nitrate, nitrite, sulfate and sulfite and so on, in conjunction with an appropriate concentration of a tastand(s) to eliminate undesirable tastes in foodstuffs. Ideally the tastand is usually about 0.001% to about 10%, preferably about 0.1% to about 5%, by weight of the material with the undesirable taste.

The present invention also contemplates the use of potassium salts of flavoring agents (such as for example glutamate) in place of sodium salts. Consequently monopotassium glutamate and/or guanalate and/or inosinate in conjunction with an appropriate amount of tastand to eliminate most if not all of the undesirable tastes, thus rendering monopotassium glutamate essentially equivalent to monosodium glutamate. The tastand can be present from about 0.0000001% to about 300%, preferably from about 0.1% to about 5%, by weight of the material with the undesirable taste.

The present invention also contemplates the preparation of medicaments such as aspirin, acetaminophen, ibuprofen, codeine, antibiotics, etc. in conjunction with a tastand(s) in sufficient concentration to remove or reduce the undesirable taste(s) of these materials. The tastand is usually 0.001% to about 50% by weight, preferably from about 0.5% to about 5% by weight of the material with the undesirable taste. The present invention also contemplates the preparation of eatables which have inherently undesirable tastes, such as unsweetened chocolate, in conjunction with a tastand in sufficient concentration to eliminate or reduce the bitterness of these products. The tastand is usually about 0.001% to about 50% by weight, preferably about 0.2% to about 5%, by weight of the material with the undesirable taste.

As one skilled in the art would recognize, this reduction in the undesirable taste(s) could result in a reformulation of the product now that the undesirable taste(s) is reduced. A few specific examples of this would be:

1. The preparation of lower calorie chocolate products,
2. The preparation of lower calorie beverages,
3. The preparation of an eatable with a reduced quantity of high intensity sweeteners, or
4. The preparation of an eatable with a reduced quantity of low intensity sweeteners.
5. The preparation of an eatable with a reduced quantity of high intensity sweeteners.

By the use of at least one tastand in an eatable with an undesirable taste; a reformulation could be made which would result a reduction in calories and/or masking agents such as low intensity sweeteners, high intensity sweeteners, spices, and/or other flavorings.

The concentration of tastand employed to reduce the undesirable taste(s) in any given instance will vary depending principally on the particular tastand selected, the particular substance or substances with the undesirable taste(s), the extent of the reduction of the undesirable taste(s) desired as well as the other tastes and flavors present in the mixture. In most instances, concentrations of about 0.001 to 300% by weight, preferably about 0.05 to 5% of tastand to the material with the undesirable taste are satisfactory.

As an illustrative specific example, when the tastand is selected for use with an admixture of sodium chloride and an undesirable tasting substance such as potassium chloride and/or magnesium chloride, it will generally be necessary to employ at least 0.2% by weight up to 10% by weight of the tastand based on the weight of the salt(s) to obtain both the reduction of the undesirable taste(s) and salty taste enhancement.

The eatables to which the tastands of the invention can be added are without limitation and include both foodstuff and eatables having essentially no food value such as pharmaceuticals, medicaments and other eatables. Therefore, the tastands of the present invention are effective for use with all substances which have an undesirable taste(s). Illustrative of substances with undesirable taste(s) with which the taste modifiers of the invention can be used are potassium chloride, ammonium chloride, sodium chloride, magnesium chloride, halide salts, naringin, caffeine, urea, magnesium sulfate, saccharin, acetosulfames, aspirin, potassium benzoate, potassium bicarbonate, potassium carbonate, potassium nitrate, potassium nitrite, potassium sulfate, potassium sulfite, potassium glutamate, food preservatives in their physiologically acceptable salts, ibuprofen, acetaminophen, antibiotics, codeine, cognac, unsweetened chocolate, cocoa beans, yogurt, preservatives, flavor enhancers, dietary supplements, gelling agents, Ph control agents, nutrients, processing aids, bodying agents, dispersing agents, stabilizers, colorings, coloring diluents, anticaking agents, antimicrobial agents, formulation aids, leavening agents, surface active agents, anticaking agents, nutrient supplements, alkali, acids, sequestrants, denuding agents, general purpose buffers, thickeners, cooked out juice retention agents, color fixatives in meat and meat products, color fixatives in poultry and poultry products, dough conditioners, maturing agents, yeast foods, mold retardants, emulsifiers, texturizers, binders, water correctives, miscellaneous and general purpose food additives, tableting aids, lye peeling agents, washing water agents, oxidizers, antioxidants, enzymes, extenders, fungicides, cake mixes, coffee, tea, dry mixes, non-dairy creamers, salts, animal glue adjuvant, cheese, nuts, meat and meat products, poultry and poultry product, pork and pork products, fish and fish products, vegetable and vegetable products, fruit and fruit products, smoked products such as meat, cheese fish, poultry, and vegetables, whipping agents, masticatory substances in chewing gums, dough strengtheners, animal feed, poultry feed, fish feed, pork feed, defoaming agents, juices, liquors, substances or drinks containing alcohol, beverages including but not limited to alcoholic beverages and non-alcoholic carbonated and/or non-carbonated soft drinks, whipped toppings, bulking agents used in eatables including but not limited to starches, corn solids, polysaccharides and other polymeric carbohydrates, icings, as well as potassium-containing or metal-containing substances with undesirable tastes and the like.

While the above listing is extensive it is by no means all inclusive. Clearly one skilled in the art would recognize that many if not all of the:

A. sodium based salts or compounds, and/or,
B. sodium based salts or compounds made into their non-sodium based counterparts, and/or,
C. potassium based salts or compounds, and/or,
D. acids or acids made into their corresponding salts (sodium and/or non sodium based compounds), and/or,
E. alkalis or alkalis made into their corresponding salts, and/or, substances that are approved, at any time, as eatables by the Food and Drug Administration and/or that are GRAS as defined by the Flavor Extract Manufacturers' Association could then be made more palatable by the use of the tastands taught herein (hereinafter and in the appended claims referred to as "material(s)"). These materials would or could be made more palatable by the reduction or elimination of any undesirable taste(s) associated with them. (Generally, sodium based salts are better tasting than the corresponding non-sodium salts.) The use of tastands with all of these materials as well as all of their anticipated uses is hereby anticipated by the teachings set forth herein.

Despite the breadth of this disclosure, one skilled in the art and the teaching taught herein shall be able to envision other examples.

EXAMPLE 1

An aqueous solution (1 L) containing 20 grams of a mixture comprised of 95% potassium chloride and 5% sodium chloride, and 0.05 grams (−)-2-(4-methoxyphenoxy) propionic acid sodium salt, gave a sodium chloride-like taste with virtually none of the bitterness normally associated with potassium chloride.

EXAMPLE 2

An aqueous solution (100 mL) containing 2 grams of potassium chloride and 0.06 grams of L-aspartyl-L-phenylalanine monopotassium salt, gave a clean, salty taste virtually free of the bitter taste normally associated with potassium chloride.

EXAMPLE 3

An aqueous solution (1 L) containing 10 grams of sodium chloride and 1 gram of (−)-2-(4-methoxyphenoxy)propionic acid sodium salt had a substantially saltier taste than a 1% solution of sodium chloride alone.

EXAMPLE 4

An aqueous solution (1 L) containing 22.5 grams of potassium chloride and 0.79 grams of 3-methoxyphenyl acetic acid sodium salt gave a substantially bitter-free salty taste.

EXAMPLE 5

An aqueous solution (1 L) containing 20 grams of potassium chloride and 0.2 grams of 2,6-dihydroxybenzoic acid potassium salt was nearly devoid of the characteristic potassium chloride bitter taste.

EXAMPLE 6

A solid preparation containing a mixture of potassium chloride (90 grams), sodium chloride (10 grams) and (−)-2-(4-methoxyphenoxy)propionic acid sodium salt (0.25 grams) gave a clean salty sodium chloride-like taste.

EXAMPLE 7

A solid preparation containing potassium chloride (80 grams), sodium chloride (10 grams), magnesium chloride (10 grams) and (−)-2-(4-methoxyphenoxy)-propionic acid sodium salt (0.25 gram) gave a well-rounded, salty taste with virtually no bitterness.

EXAMPLE 8

The taste of lithium chloride was greatly improved by the addition of 1% by weight (−)-2-(4-methoxyphenoxy) propionic acid sodium salt. The saltiness was substantially increased.

EXAMPLE 9

Addition of 0.5% by weight of (−)-2-(4-methoxyphenoxy)propionic acid sodium salt to monopotassium glutamate produced a flavor almost identical to monosodium glutamate. Virtually no bitter taste was detectable.

EXAMPLE 10

Addition of 6% by weight of (−)-2-(4-methoxyphenoxy) propionic acid sodium salt to aspirin gave a formulation that was slightly sour, with almost no bitter taste or characteristic "aspirin"-like bitter aftertaste.

EXAMPLE 11

Addition of 3% by weight of (−)-2-(4-methoxyphenoxy) propionic acid sodium salt to aspirin gave a formulation substantially lacking the bitter taste of aspirin.

EXAMPLE 12

A solution containing 100 ppm caffeine and 10 ppm by weight (relative to caffeine) of (−)-2-(4-methoxyphenoxy) propionic acid sodium salt was almost tasteless, and virtually all of the bitterness was removed.

EXAMPLE 13

The strong bitter taste of unsweetened chocolate was nearly eliminated by the addition of 0.25% by weight of (−)-2-(4-methoxyphenoxy)propionic acid sodium salt.

EXAMPLE 14

Potassium benzoate containing 0.5% by weight (−)-2-(4-methoxyphenoxy)propionic acid sodium salt was added to foodstuffs in place of sodium benzoate. There was no detectable difference in the taste of the foodstuffs.

EXAMPLE 15

Potassium nitrate and potassium nitrite containing 0.5% (−)-2-(4-methoxyphenoxy)propionic acid sodium salt were added to foodstuffs in place of the sodium salts. There was no detectable difference in the taste.

EXAMPLE 16

Potassium bicarbonate containing 0.5% by weight (−)-2-(4-methoxyphenoxy)propionic acid sodium salt was used in place of baking soda for the baking of biscuits. There was essentially no bitterness detected.

EXAMPLE 17

Potassium bicarbonate/carbonate mixture containing 0.5% by weight (−)-2-(4-methoxyphenoxy)propionic acid sodium salt was used in place of baking powder for the preparation of pancakes. Essentially no bitterness was detected.

EXAMPLE 18

When 10–20 ppm of (−)-2-(4-methoxyphenoxy)propionic acid sodium salt was added to black coffee, the strong bitter taste of the coffee was almost completely eliminated.

EXAMPLE 19

An aqueous solution (1 L) containing 20 grams of potassium chloride and 0.6 grams of monosodium D-glutamate had substantially less bitterness than a 2% solution of potassium chloride.

EXAMPLE 20

An aqueous solution (1 L) containing 20 grams of potassium chloride and 1.2 grams of monopotassium D-glutamate had virtually none of the bitterness normally associated with potassium chloride.

EXAMPLE 21

When 0.25% by weight of hesperidin methyl chalcone (relative to KCl) was added to a 2% solution of KCl the bitterness of the KCl was reduced.

EXAMPLE 22

When 0.25% by weight (relative to the sodium nitrite) of (−)-2-(4-methoxyphenoxy)propionic acid sodium salt was added to 1% solution of sodium nitrite, the saltiness of the sodium nitrite was enhanced.

EXAMPLE 23

When 5% by weight of hesperidin (relative to potassium chloride) was added to a 2% solution of potassium chloride and the mixture heated to 40° C. the bitterness of the KCl was almost completely eliminated.

EXAMPLE 24

When 6.6% by weight of sodium D-aspartate (relative to potassium chloride) was added to a 2% solution of potassium chloride the bitter taste of the potassium chloride was reduced and there was virtually no aftertaste.

EXAMPLE 25

When 0.06 grams of phenoxyacetic acid sodium salt was added to an aqueous solution containing 18 grams of potassium chloride and two grams of sodium chloride, the bitter taste of the potassium chloride was substantially eliminated.

EXAMPLE 26

When 5% by weight (relative to potassium chloride) of 2-methyl-3-nitroaniline was added to a 2% solution of potassium chloride the bitter taste was virtually eliminated.

EXAMPLE 27

The bitter component of a 1% by weight aqueous calcium chloride solution (100 mL) was substantially eliminated by the addition of 0.2 grams of (−)-2-(4-methoxyphenoxy) propionic acid sodium salt.

EXAMPLE 28

The bitter component of a 1% by weight aqueous magnesium chloride solution (100 mL) was reduced by the addition of 0.2 grams of (−)-2-(4-methoxyphenoxy) propionic acid sodium salt.

EXAMPLE 29

The bitter component of a 2% aqueous magnesium sulfate solution (100 mL) was greatly reduced by the addition of 0.04 grams of (−)-2-(4-methoxyphenoxy)propionic acid sodium salt.

EXAMPLE 30

When 100 ppm of (−)-2-(4-methoxyphenoxy)propionic acid sodium salt was added to whiskey, the strong burning sensation of the whiskey was substantially reduced.

EXAMPLE 31

When 100 ppm of (−)-2-(4-methoxyphenoxy)propionic acid sodium salt was added to cognac, the strong burning sensation of the cognac was substantially reduced.

EXAMPLE 32

When 100 ppm of (−)-2-(4-methoxyphenoxy)propionic acid sodium salt was mixed with commercially prepared salsa sauce there was a substantial reduction in the hotness of the sauce.

EXAMPLE 33

When 10% (w/w relative to the saccharin) of racemic 2-(4-methoxyphenoxy)propionic acid sodium salt was added to a 0.1% solution of sodium saccharin, virtually all of the bitterness was removed. There was no aftertaste noted.

EXAMPLE 34

When 1% (w/w, relative to the potassium nitrate) of (−)-2-(4-methoxyphenoxy)propionic acid sodium salt was added to a 3% aqueous potassium nitrate solution there was almost a complete elimination of the bitterness of the potassium nitrate.

EXAMPLE 35

When 0.25% (−)-2-(4-methoxyphenoxy)propionic acid sodium salt w/w was added to 10 grams La Victoria Hot Salsa the salsa sauce was significantly less harsh.

EXAMPLE 36

When a solution containing 25 ppm of a mixture having a ratio of 90 parts (+)-2-(4-methoxyphenoxy)propionic acid sodium salt to 10 parts (−)-2-(4-methoxyphenoxy)propionic acid sodium salt and 100 ppm sodium saccharin there was no noticeable diminution of sweetness of the sodium saccharin and at the same time there was significantly less aftertaste.

EXAMPLE 37

When 0.5% by weight of potassium 2,4-dihydroxybenzoate (relative to potassium chloride) was added to 1% solution of potassium chloride virtually all of the bitterness of the potassium chloride was eliminated.

EXAMPLE 38

When 0.5% by weight potassium 2,4-dihydroxybenzoate (relative to the potassium chloride) was added to a 1% potassium chloride solution which also contains 2% sucrose, virtually all of the bitterness of the potassium chloride was eliminated and the sucrose taste was not substantially affected.

EXAMPLE 39

When 25 mg of potassium 2,4-dihydroxybenzoate (69 ppm relative to the total volume of the cola) was added to a cola sweetened with saccharin, virtually all of the metallic aftertaste of the saccharin was eliminated.

EXAMPLE 40

When 25 ppm of potassium 2,4-dihydroxybenzoate was added to a solution containing 100 ppm sodium saccharin there was no noticeable diminution of sweetness of the saccharin and at the same time there was significantly less aftertaste.

EXAMPLE 41

Addition of 5% by weight (relative to the potassium chloride) of disodium ethylenediaminetetraacetic acid (EDTA) to an aqueous solution of 2% potassium chloride greatly reduced the bitterness of potassium chloride.

EXAMPLE 42

The bitterness of a 100 mL solution containing 0.11% caffeine was reduced to the bitterness of a 0.08% solution of caffeine by the addition of 100 mg potassium 2,4-dihydroxybenzoate.

EXAMPLE 43

A taste panel consisting of six tasters unanimously preferred potato chips salted with 1.6% w/w potassium chloride/sodium chloride/L-aspartyl-L-phenylalanine potassium salt (90/10/3) over potato chips salted with 1.6% w/w potassium chloride/sodium chloride (90/10) due to substantially reduced bitterness.

EXAMPLE 44

An aqueous solution containing 1% sodium chloride and 0.005% potassium 2,4-dihydroxybenzoate was saltier than an aqueous solution containing only 1% sodium chloride.

EXAMPLE 45

The bitter taste of 200 mL of freshly brewed Sarks brand Espresso was greatly reduced by the addition of 20 mg of potassium 2,4-dihydroxybenzoate.

EXAMPLE 46

The bitter and sour tastes of sodium acetylsalicylate was essentially absent from an aqueous suspension comprised of sodium acetylsalicylate (0.5 gram), water (2 mL) and potassium 2,4-dihydroxybenzoate (0.375 gram).

EXAMPLE 47

The bitterness of a 2% aqueous potassium chloride solution was nearly eliminated by the addition of 1% by weight (relative to the potassium chloride) of DL-3,4-dihydroxyphenylalanine, (DL-DOPA).

EXAMPLE 48

A sample of refried beans (100 gm) salted with potassium chloride (0.98 gm), sodium chloride (0.42 gm) and sodium tartrate (0.15 gm) gave a clean, salty taste, almost completely devoid of bitterness, when compared with a sample of 100 grams of refried beans salted only with potassium chloride (0.98 gm) and sodium chloride (0.42 gm).

EXAMPLE 49

Addition of 5% by weight of sodium tartrate (relative to the potassium chloride) to a 2% aqueous solution of potassium chloride significantly reduced the bitterness associated with potassium chloride.

EXAMPLE 50

A sample of refried beans (100 gm) salted with potassium chloride (0.98 gm), sodium chloride (0.42 gm) (a 70/30 ratio) and disodium ethylenediaminetetraacetic acid (0.7 gm) gave a clean, salty taste, virtually devoid of bitterness when compared with a sample of 100 gm of refried beans salted only with potassium chloride (0.98 gm) and sodium chloride (0.42 gm).

EXAMPLE 51

The addition of 5 mg of sodium 2,4-dihydroxybenzoate to a cup of Tetley tea (200 mL) which had been sweetened with 40 mg of sodium saccharin almost completely eliminated the bitter, metallic aftertaste of the saccharin.

EXAMPLE 52

A solid, lyophilized salt preparation composed of 70 parts potassium chloride, 30 parts sodium chloride and 0.35 parts potassium 2,4-dihydroxybenzoate had a sharper initial salty taste, but was otherwise virtually indistinguishable from lyophilized sodium chloride.

EXAMPLE 53

Addition of 5% by weight (relative to the potassium chloride) of sodium (+)-lactate to a 2% aqueous solution of potassium chloride significantly reduced the bitterness associated with potassium chloride.

EXAMPLE 54

Addition of 5% by weight (relative to the potassium chloride) of sodium ascorbate to a 2% aqueous solution of potassium chloride significantly reduced the bitterness associated with potassium chloride.

EXAMPLE 55

Addition of 1% by weight (relative to the potassium chloride) of sodium p-anisate to a 2% aqueous solution of potassium chloride reduced the bitterness associated with potassium chloride.

EXAMPLE 56

Addition of 70 mg of sodium 2,4-dihydroxybenzoate to 1 liter of a 0.04% solution of caffeine (400 mg) reduced the bitterness associated with caffeine.

EXAMPLE 57

Addition of 0.5% by weight (relative to the potassium chloride) of DL-methionine-methyl sulfonium chloride to a 2% aqueous solution of potassium chloride reduced the bitterness associated with potassium chloride.

EXAMPLE 58

Addition of 6 grams of maltose to 100 mL of a 2% aqueous solution of potassium chloride reduced the bitterness of the potassium chloride.

EXAMPLE 59

To 50 grams of mashed potatoes was added 1.2 mL of a 100 mL solution containing potassium chloride (17.3 gm), sodium chloride (1.9 gm) and (+)-2-(4-methoxyphenoxy) propionic acid sodium salt (0.8 gm). The mashed potatoes had a clean, salty taste with almost no bitter taste associated with potassium chloride.

EXAMPLE 60

Addition of 8 mg of xanthosine 5' monophosphate to 100 mL of a 2% aqueous solution of potassium chloride reduced the bitterness of potassium chloride and enhanced the saltiness.

EXAMPLE 61

Addition of 5% by weight (relative to the potassium chloride) of sodium 2-hydroxyphenylacetate to a 2% aqueous solution of potassium chloride significantly reduced the bitterness associated with potassium chloride.

EXAMPLE 62

Addition of 0.5% by weight (relative to the potassium chloride) of sodium 1-hydroxy-2-naphthoate to a 2% aqueous solution of potassium chloride significantly reduced the bitterness associated with potassium chloride.

EXAMPLE 63

Addition of 1% by weight (relative to the potassium chloride) of sodium 3-hydroxy-2-naphthoate to a 2% aqueous solution of potassium chloride significantly reduced the bitterness associated with potassium chloride.

EXAMPLE 64

Addition of 5% by weight (relative to the potassium chloride) of sodium 2,4,6-trihydroxybenzoate to a 2% aqueous solution of potassium chloride significantly reduced the bitterness associated with potassium chloride.

EXAMPLE 65

Addition of 0.5% by weight (relative to the potassium chloride) of sodium 4-aminosalicylate to a 2% aqueous solution of potassium chloride reduced the bitterness associated with potassium chloride.

EXAMPLE 66

Addition of 1% by weight (relative to the potassium chloride) of sodium anthranilate to a 2% aqueous solution of potassium chloride reduced the bitterness associated with potassium chloride.

EXAMPLE 67

Addition of 0.5% by weight (relative to the potassium chloride) of sodium aniline-2-sulfonate to a 2% aqueous solution of potassium chloride reduced the bitterness associated with potassium chloride.

EXAMPLE 68

Addition of 3.5% by weight (relative to the potassium chloride) of 3-methoxyphenylacetic acid to a 2.25% aqueous solution of potassium chloride, reduced the bitterness associated with potassium chloride.

EXAMPLE 69

Addition of 0.65% by weight (relative to the potassium chloride) of neodiosmin to a 2% aqueous solution of potassium chloride reduced the bitterness associated with potassium chloride.

EXAMPLE 70

Health Valley Chicken Broth (unsalted, 200 mL) salted with potassium chloride (0.8 gm), sodium chloride (0.2 gm) and sodium (+)-2-(4-methoxyphenoxy)propionate (0.03 gm) (a 80/20/3 ratio), gave a well salted flavor virtually free of any bitter taste.

EXAMPLE 71

Addition of 25 mg sodium 2,4-dihydroxybenzoate to one can of C&C Diet Cola (354 mL) containing 126 mg sodium saccharin reduced the aftertaste associated with sodium saccharin.

EXAMPLE 72

Addition of 6.6% by weight (relative to the potassium chloride) of sodium syringate to a 2% aqueous solution of potassium chloride reduced the bitterness associated with potassium chloride.

EXAMPLE 73

Addition of 0.1 gram of guanosine to a 100 mL aqueous solution containing 0.1 gram of aspirin significantly reduced the bitterness associated with the aspirin.

EXAMPLE 74

Campbell's Chicken Broth (unsalted, 100 mL) was salted with potassium chloride (1.8 gm), sodium chloride (0.2 gm) and potassium 2,4-dihydroxybenzoate (0.01 gm) (a ratio of 90/10/0.5), gave a good, salty tasting broth essentially devoid of bitterness.

EXAMPLE 75

Addition of 5% by weight (relative to the potassium chloride) of 3,4-dihydroxyphenylacetic acid sodium salt to a 2% aqueous solution of potassium chloride reduced the bitterness associated with potassium chloride.

EXAMPLE 76

The bitterness associated with potassium chloride was reduced when a 2% aqueous solution of potassium chloride was saturated with uric acid.

EXAMPLE 77

Addition of 3.7% by weight (relative to the potassium chloride) of guanosine to a 2% aqueous solution of potassium chloride reduced the bitterness associated with potassium chloride.

EXAMPLE 78

The bitterness associated with potassium chloride was reduced when a 2% aqueous solution of potassium chloride was saturated with uracil.

EXAMPLE 79

The bitterness associated with potassium chloride was reduced when a 2% aqueous solution of potassium chloride was saturated with d-biotin.

EXAMPLE 80

The bitterness associated with potassium chloride was reduced when a 2% aqueous solution of potassium chloride was saturated with DL-dihydroorotic acid.

EXAMPLE 81

A sample of 100 gm of unsalted refried beans salted with potassium chloride (0.98 gm), sodium chloride (0.42 gm), potassium 2,4-dihydroxybenzoate (5.0 mg), and disodium ethylenediaminetetraacetic acid (0.7 gram, 5 mL of a 14% solution, adjusted to pH 6.8) gave a clean, salty taste essentially devoid of bitterness.

EXAMPLE 82

The bitter taste of a 2% aqueous solution of potassium chloride was reduced by the addition of 20% by weight (relative to the potassium chloride) of L-threonine.

EXAMPLE 83

The bitter taste of a 2% aqueous solution of potassium chloride was nearly eliminated by the addition of 20% by weight (relative to the potassium chloride) of sodium malate.

EXAMPLE 84

Hains No Salt Vegetable Soup (100 gm) salted with potassium chloride (0.9 gm), sodium chloride (0.1 gi) and potassium 2,4-dihydroxybenzoate (0.005 gm) (a ratio of 90/10/0.5), gave a salty, good tasting soup basically devoid of bitterness.

EXAMPLE 85

Hains No Salt Vegetable Soup (100 gm) salted with potassium chloride (0.9 gm), sodium chloride (0.1 gm) and sodium 2,4,6-trihydroxybenzoate (0.005 gm) (a ratio of 90/10/0.5), gave a salty, good tasting soup practically devoid of bitterness.

EXAMPLE 86

Hains No Salt Vegetable Soup (100 gm) salted with potassium chloride (0.9 gm), sodium chloride (0.1 gm), L-aspartyl-L-phenylalanine potassium salt (0.015 gm) and potassium 2,4-dihydroxybenzoate (0.0025 gm) (a ratio of 90/10/1.5/0.25), gave a taste essentially without bitterness. It was more salty than soup salted with potassium chloride (0.9 gm), sodium chloride (0.1 gm) and L-aspartyl-L-phenylalanine potassium salt (0.03 gm) (a ratio of 90/10/3) or potassium chloride (0.9 gm), sodium chloride (0.1 gm) and potassium 2,4-dihydroxybenzoate (0.005 gm) (a ratio of 90/10/0.5).

EXAMPLE 87

Charles brand unsalted potato chips (100 gm) salted with potassium chloride (1.6 gm) and potassium 2,4-dihydroxybenzoate (0.008 gm) gave a good salty taste that was essentially free of any bitter taste.

EXAMPLE 88

Charles brand unsalted potato chips (100 gm) salted with potassium chloride (0.98 gm), sodium chloride (0.42 gm)

and potassium 2,4-dihydroxybenzoate (0.005 gm) (a ratio of 70/30/0.35) gave a good salty taste devoid of bitterness. These chips were essentially indistinguishable from chips salted with sodium chloride.

EXAMPLE 89

Charles brand unsalted potato chips (100 gm) salted with potassium chloride (0.67 gm), sodium chloride (0.67 gm) and potassium 2,4-dihydroxybenzoate (0.0034 gm) (a ratio of 50/50/0.25) gave a good salty taste as if the chips were prepared with pure sodium chloride.

EXAMPLE 90

A sample of unsalted refried beans (100 gm) salted with potassium chloride (0.98 gm), sodium chloride (0.42 gm) (a ratio of 70/30) and sodium (+)-lactate (0.1 gm) gave a clean, salty taste like that of sodium chloride.

EXAMPLE 91

A sample of unsalted refried beans (100 gm) salted with potassium chloride (1.12 gm), sodium chloride (0.48 gm), potassium 2,4-dihydroxybenzoate (0.0056 gm) (a ratio of 70/30/0.35) and 0.3 gm sodium (+)-lactate gave a taste essentially devoid of bitterness. It was also more salty then refried beans salted with potassium chloride (1.2 gm), sodium-chloride (0.4 gm) (a ratio of 70/30) and sodium (+)-lactate (0.1 gm).

EXAMPLE 92

A sample of unsalted refried beans (100 gm) salted with potassium chloride (1.2 gm), sodium chloride (0.4 gm) (a ratio of 70/30) and sodium (+)-lactate (0.3 gm) gave a sodium chloride like taste. It was also more salty than refried beans salted with potassium chloride (1.2 gm), sodium chloride (0.4 gm) (a ratio of 70/30) and sodium (+)-lactate (0.1 gm).

EXAMPLE 93

The bitter taste of a 1000 ppm solution (100 mL) of caffeine was substantially reduced by the addition of guanosine (20 mg).

EXAMPLE 94

The bitter taste of a 1000 ppm solution (100 mL) of caffeine was almost completely eliminated by the addition of inosine (20 mg).

EXAMPLE 95

An aqueous solution (100 mL) containing potassium chloride (2.0 g) and N-(L-aspartyl)-p-aminobenzoic acid monopotassium salt (0.1 g) gave a salty taste without the bitterness normally associated with potassium chloride.

EXAMPLE 96

An aqueous solution (100 mL) containing potassium chloride (2.0 g) and N-(L-aspartyl)-p-aminobenzoic acid monopotassium salt (0.02 g) gave a salty taste, with a substantially decrease of bitterness from potassium chloride.

EXAMPLE 97

A solid preparation containing a mixture of potassium chloride (1.8 g), sodium chloride (0.2 g) and N-(L-aspartyl)-p-aminobenzoic acid monopotassium salt (0.02 g) gave a clean salty sodium chloride-like taste.

EXAMPLE 98

A solid lyophilized from a aqueous solution containing potassium chloride (1.8 g), sodium chloride (0.2 g) and N-(L-aspartyl)-o-aminobenzoic acid monopotassium salt (0.1 g) gave a clean sodium chloride-like taste with virtually none of the bitterness normally associated with potassium chloride.

EXAMPLE 99

A solid obtained from a aqueous solution containing potassium chloride (1.8 g), sodium chloride (0.02 g) and N-(L-aspartyl)-o-aminobenzoic acid monopotassium salt gave a bitterness-free salty taste.

EXAMPLE 100

When 5% by weight of potassium L-aspartyl-L-tyrosine (relative to potassium chloride) was added to a 2% solution of potassium chloride the bitter taste of potassium chloride was completely eliminated.

EXAMPLE 101

When 1% by weight of potassium L-aspartyl-L-tyrosine (relative to potassium chloride) was added to a 2% solution of potassium chloride the bitter taste of potassium chloride was virtually eliminated.

EXAMPLE 102

Addition of 0.5% by weight of potassium N-(p-cyanophenyl-carbamoyl)-L-aspartyl-L-phenylalanine (relative to potassium chloride) to a 2% of potassium chloride solution gave a salty taste with free of the bitter taste.

EXAMPLE 103

Addition of 0.1% by weight of potassium N-(p-cyanophenyl-carbamoyl)-L-aspartyl-L-phenylalanine (relative to potassium chloride) to an aqueous solution of 2% potassium chloride substantially eliminated the bitter taste of potassium chloride.

EXAMPLE 104

When 0.5% by weight of potassium N-(p-nitrophenyl-carbamoyl)-L-aspartyl-L-phenylalanine (relative to potassium chloride) was added to a 2% potassium chloride solution, the bitter taste of potassium chloride was virtually eliminated.

EXAMPLE 105

When 0.1% by weight of potassium N-(p-nitrophenyl-carbamoyl)-L-aspartyl-L-phenylalanine (relative to potassium chloride) was added to a 2% solution of potassium chloride, no bitterness was essentially detected.

EXAMPLE 106

An aqueous solution (100 mL) containing potassium chloride (2.0 g) and potassium L-β-aspartyl-L-phenylalanine (0.1 g) gave a salty taste with no bitter taste associated with potassium chloride.

EXAMPLE 107

An aqueous solution (100 mL) containing potassium chloride (2.0 g) and potassium L-β-aspartyl-L- phenylalanine (0.02 g) gave a salty taste with a substantial reduction of bitter taste.

EXAMPLE 108

Addition of potassium (−)-2-(4-methoxyphenoxy) propionate (500 mg, 10 times relative to caffeine) to a 0.05% of caffeine (100 mL) completely eliminated the bitter taste, with a lingering sweet after taste only.

EXAMPLE 109

Addition of potassium (−)-2-(4-methoxyphenoxy) propionate (250 mg, 5 times relative to caffeine) to a 0.05% of caffeine (100 mL) significantly reduced the bitter taste of caffeine with a sweet after taste.

EXAMPLE 110

A solid lyophilized from a solution containing potassium chloride (1.8 g), sodium chloride (0.2 g) and potassium N-(p-cyanophenyl-carbamoyl)-L-aspartyl-L-phenylalanine (0.010 g) gave a sodium chloride-like taste with virtually none of the bitterness normally associated with potassium chloride.

EXAMPLE 111

A strong bitter taste was completely eliminated when potassium N-(p-cyanophenyl-carbamoyl)-L-aspartyl-L-phenylalanine (500 mg, 10 times relative to caffeine) was added to a 0.05% solution of caffeine (100 mL).

EXAMPLE 112

A strong bitter taste was nearly eliminated when potassium N-(p-cyanophenyl-carbamoyl)-L-aspartyl-L-phenylalanine (250 mg, 5 times relative to caffeine) was added to a 0.05% caffeine solution (100 mL).

EXAMPLE 113

An aqueous solution (100 mL) containing caffeine (50 mg) and potassium N-(p-nitrophenyl-carbamoyl)-L-aspartyl-L-phenylalanine (500 mg) was slightly sweet and completely devoid of the bitter taste.

EXAMPLE 114

An aqueous solution (100 mL) containing caffeine (50 mg) and potassium N-(p-nitrophenyl-carbamoyl)-L-aspartyl-L-phenylalanine (250 mg) gave almost no bitter taste with a slightly sweet taste.

EXAMPLE 115

When 1% by weight of potassium 2,4,6-trihydroxybenzoate (relative to potassium chloride) was added to a 2% solution of potassium chloride the bitterness of potassium chloride was completed eliminated.

EXAMPLE 116

When 0.5% by weight of potassium 2,4,6-trihydroxybenzoate (relative to potassium chloride) was added to a 2% solution of potassium chloride a salty taste was obtained with no bitterness associated with potassium chloride.

EXAMPLE 117

When 0.25% by weight of potassium 2,4,6-trihydroxybenzoate (relative to potassium chloride) was added a potassium chloride solution (2%), a salty and free of bitterness taste were given.

EXAMPLE 118

A solid lyophilized from a aqueous solution of potassium chloride (1.6 g), sodium chloride (0.4 g) and potassium 2,4,6-trihydroxybenzoate (0.01 g) gave a sodium chloride-like taste with none of the bitterness associated with potassium chloride.

EXAMPLE 119

A solid lyophilized from a solution containing potassium chloride (1.6 g), sodium chloride (0.4 g) and potassium 2,4,6-trihydroxybenzoate (0.005 g) gave a salty taste virtually free of bitter taste associated with potassium chloride.

EXAMPLE 120

When 5% by weight of taurine (relative to potassium chloride) was added to a 2% solution of potassium chloride the bitter taste of potassium chloride was completely eliminated.

EXAMPLE 121

The sweetness of a 4% solution of sugar (100 mL) was significantly reduced by the addition of N-(L-aspartyl)-o-aminobenzoic acid monopotassium salt (40 mg).

EXAMPLE 122

The sweetness was completely eliminated when N-(L-aspartyl)-o-aminobenzoic acid monopotassium salt (200 mg) was added to or 4% solution of sugar (100 mL).

EXAMPLE 123

The sweetness of a 4% solution of sugar (100 mL) was reduced to the sweetness of a 2% solution of sugar by addition of L-aspartyl-L-phenylalanine monopotassium salt (1.2 g, 30% relative to sugar).

EXAMPLE 124

The sweetness of a 0.04% solution of Aspartame® (100 mL) was slightly reduced and the lingering taste of Aspartame® eliminated by addition of L-aspartyl-L-phenylalanine monopotassium salt (400 mg, 10 times relative to Aspartame®).

EXAMPLE 125

An aqueous solution (75 mL) containing glycerol (12 grams) and taurine (0.37 grams) wherein the burning aftertaste of the glycerol is substantially decreased or eliminated.

EXAMPLE 126

An aqueous solution (75 mL) adjusted to a pH=6 containing glycerol (12 grams) and L-aspartyl-L-phenylalanine (0.62 grams) wherein the burning aftertaste of the glycerol is substantially decreased or eliminated and the mixture tasted somewhat sweeter.

EXAMPLE 127

An aqueous solution (75 mL) containing glycerol (12 grams) and potassium 2,4-dihydroxybenzoate (0.12 grams) wherein the burning aftertaste of the glycerol is decreased.

EXAMPLE 128

An aqueous solution (75 mL) containing glycerol (12 grams) and β-alanine (0.60 grams) wherein the burning aftertaste of the glycerol is decreased.

EXAMPLE 129

The aftertaste of L-aspartyl-L-phenylalanine methyl ester (Aspartame®) used to sweetened a Diet Coke® (354 mL can) was substantially eliminated by the addition of 7.5 mg of L-aspartyl-L-phenylalanine.

EXAMPLE 130

The aftertaste of the L-aspartyl-L-phenylalanine methyl ester (Aspartame®) used to sweetened a Diet Pepsi® (354 mL can) was substantially eliminated by the addition of 7.5 mg of L-aspartyl-L-phenylalanine.

EXAMPLE 131

The aftertaste of the saccharin used to sweeten C&C Diet Cola® (354 mL can) was substantially eliminated by the addition of 10 mg of taurine.

EXAMPLE 132

When 5% by weight of β-alanine (relative to potassium chloride) was added to a 2% solution of potassium chloride the bitter taste of potassium chloride was completely eliminated.

EXAMPLE 133

An aqueous solution (100 mL) containing potassium chloride (2.0 g) and N-(L-aspartyl)-α-amino-cyclopentanecarboxylic acid mono-potassium salt (0.1 g) eliminated almost all of the bitterness associated with potassium chloride.

EXAMPLE 134

A solid lyophilized from an aqueous solution containing potassium chloride (1.8 g), sodium chloride (0.2 g) and N-(L-aspartyl)-α-amino-cyclopentanecarboxylic acid mono-potassium salt (0.1 g) gave a salty sodium chloride-like taste which was free of bitterness associated with potassium chloride.

EXAMPLE 135

A solid lyophilized from a solution containing potassium chloride (1.8 g), sodium chloride (0.2 g) and N-(L-aspartyl)-α-amino-cyclopentanecarboxylic acid mono-potassium salt (0.02 g) gave a clean salty taste, virtually free of the bitterness from potassium chloride.

EXAMPLE 136

A solid lyophilized from a solution containing potassium chloride (1.8 g), sodium chloride (0.2 g) and N-(L-aspartyl)-α-amino-cyclooctanecarboxylic acid mono-potassium salt (0.1 g) gave a salty taste. The bitter taste of potassium chloride was essentially eliminated.

EXAMPLE 137

Addition of 5% by weight of β-alanine (relative to potassium chloride) to a 2% solution of potassium chloride eliminated the bitter taste of potassium chloride.

EXAMPLE 138

A powder lyophilized from an aqueous mixture of potassium chloride (1.8 g), sodium chloride (0.2 g) and β-alanine (0.1 g) gave a clean sodium chloride-like taste.

EXAMPLE 139

A powder lyophilized from a mixture of potassium chloride (1.8 g), sodium chloride (0.2 g) and β-alanine (0.02 g) gave a salty taste without the bitterness normally associated with potassium chloride.

EXAMPLE 140

When 5% by weight of potassium N-(phenylcarbamoyl)-L-aspartyl-L-phenylalanine (relative to potassium chloride) was added to a 2% solution of potassium chloride, the bitterness associated with potassium chloride was eliminated.

EXAMPLE 141

An aqueous solution (100 mL) containing L-ornithine-β-alanine dihydrochloride (0.1 g) and potassium chloride (2.0 g) at pH 6.1 gave a salty taste without bitterness.

EXAMPLE 142

A powder lyophilized from an aqueous solution containing potassium chloride (1.8 g), sodium chloride (0.2 g) and L-ornithine-β-alanine dihydrochloride at pH 6.1 gave a salty taste with free of bitterness.

EXAMPLE 143

A powder lyophilized from an aqueous solution containing potassium chloride (1.8 g), sodium chloride (0.2 g) and L-ornithine-β-alanine dihydrochloride (0.02 g) at pH 6.1 virtually eliminated the bitterness associated with potassium chloride and gave a salty taste.

EXAMPLE 144

Addition of 1% by weight of β-aminoethyl phosphonic acid (relative to potassium chloride) to a 2% potassium chloride solution gave a salty taste free of the bitter taste associated with potassium chloride.

EXAMPLE 145

Addition of 5% by weight of β-aminoethyl phosphonic acid (relative to potassium chloride) to a 2% solution of potassium chloride gave a salty taste free of the bitter taste associated with potassium chloride.

EXAMPLE 146

A solid lyophilized from the mixture of potassium chloride (1.8 g), sodium chloride (0.2 g) and β-aminoethyl phosphonic acid (0.02 g) gave a clean salty taste without the bitter taste associated with potassium chloride.

EXAMPLE 147

A solid made from a solution of potassium chloride (1.8 g), sodium chloride (0.2 g) and β-aminoethyl phosphonic acid (0.1 g) was completely free of the bitterness from potassium chloride.

EXAMPLE 148

The bitterness associated with potassium chloride was completely eliminated when 2-amino tere-phthalic acid potassium salt (0.02 g, 1% relative to the potassium chloride) was added to a 2% solution of potassium chloride (100 mL).

EXAMPLE 149

The bitterness associated with potassium chloride was completely eliminated when 2-amino tere-phthalic acid potassium salt (0.1 g, 5% relative to the potassium chloride) was added to a 2% solution of potassium chloride (100 mL).

EXAMPLE 150

When taurine (0.05 g, 50% relative to Acesulfame K) was added to a 0.1% solution of Acesulfame K (100 mL) the aftertaste associated with Acesulfame K was substantially decreased.

EXAMPLE 151

When taurine (0.10 g) was added to an aqueous solution containing Acesulfame K (0.10 g), the sweetness was decreased and the aftertaste was completely eliminated.

EXAMPLE 152

Addition of β-alanine (0.01 g, 10% relative to Acesulfame K) in a 0.1% solution of Acesulfame K (100 mL) fully eliminated the off-taste associated with Acesulfame K and gave a clean sweet taste.

EXAMPLE 153

Addition of β-alanine (0.05 g, 50% relative to Acesulfame K) in a 0.1% solution of Acesulfame K fully eliminated the aftertaste of Acesulfame K and decreased the sweet potency by about 70%.

EXAMPLE 154

When β-alanine (0.025 g) was added to a can of Shasta diet cola (354 mL), the off-taste associated with sodium saccharin and/or Aspartame was substantially decreased.

EXAMPLE 155

When β-alanine (0.02 g) was added to a can of VONS sugar-free cola (355 mL) containing sodium saccharin (0.107 g), the aftertaste associated with saccharin was completely eliminated.

EXAMPLE 156

Addition of β-alanine (0.02 g) to a can of diet Pepsi (355 mL) reduced significantly the aftertaste associated with Aspartame.

EXAMPLE 157

Addition of 50% by weight of potassium L-aspartyl-L-phenylalanine (relative to Acesulfame K) to a 0.1% solution of Acesulfame K reduced both the sweetness and aftertaste associated with Acesulfame K.

EXAMPLE 158

When 5% by weight of L-aspartyl-L-aspartic acid was added (relative to KCl) to a 2% solution of KCl adjusted to a pH=6, the bitterness of the KCl was virtually eliminated.

EXAMPLE 159

When two parts of acetominophen is blended with one part of 5-hydroxyflavone the resultant mixture is substantially reduced in bitterness.

EXAMPLE 160

When one part of chlorpheniramine maleate is blended with one part of 5-hydroxyflavone the resultant mixture is substantially reduced in bitterness.

EXAMPLE 161

When one part of pseudoephedrine hydrochloride is blended with one part of 5-hydroxyflavone the resultant mixture is substantially reduced in bitterness.

EXAMPLE 162

When one part of guaifenesin is blended with one part of 5-hydroxyflavone the resultant mixture is substantially reduces in bitterness.

EXAMPLE 163

When one part of phenylpropanolamine HCl is blended with one part of 5-hydroxyflavone the resultant mixture is reduced in bitterness approximately fifty percent.

EXAMPLE 164

When one part of pseudoephedrine hydrochloride is blended with one part of 5,7-dihydroxyflavone the resultant mixture is reduced in bitterness more than fifty percent.

What is claimed is:

1. An eatable composition comprising a sweetener which imparts an undesirable taste to the eatable, and at least one tastand in a substantially tasteless amount of from about 0.0000001 to about 300% by weight, based on the weight of the eatable, which amount is sufficient to reduce said undesirable taste, said tastand being selected from the group consisting of compounds which are substantially tasteless in the amount used and have the structure V-1:

$$(R)_p\text{—}(Y)_r\text{—}\left[\begin{array}{c}R^2\\|\\C\\|\\R^3\end{array}\right]_j\text{—}\underset{\underset{Z}{|}}{\underset{(A)_a}{|}}{\underset{(CR^2R^3)}{C}}\text{—}\left[\begin{array}{c}R^2\\|\\C\\|\\R^3\end{array}\right]_k\text{—}(A)_l\text{—}(Y)_m\text{—}(R')_q \quad \text{V-1}$$

wherein a, r, l, and m are 0 or 1; n, j, and k are 0, 1, 2, or 3; each $R^2$ and $R^3$, which may be the same or different, is independently selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, and substituted polycyclic; each Y, which may be the same or different, is independently selected from the group consisting of N, O, and S; when r is 1 and Y is N, p is 2 or 3; when m is 1 and Y is N, q is 2 or 3; when r is 1 and Y is O, p is 1; when m is 1 and Y is O, q is 1; when r is 1 and Y is S, p is 1 or 2; when m is 1 and Y is S, q is 1 or 2; A is selected from the group consisting of H, C=O, O=S=O, S=O, O=P(H)OH, O=P(OH)$_2$, and O=B(H)OH; Q is selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, and substituted polycyclic; each R, which may be the same or different when p>1, and each R', which may be the same or different when q>1, is independently selected from the group consisting of H, alkyl, substituted alkyl, dialkyl, substituted dialkyl, aralkyl, substituted aralkyl, aryl, substituted aryl, diaryl, substituted diaryl, acyl, substituted acyl, cycloalkyl, substituted cycloalkyl, benzoyl, substituted benzoyl, trifluoroacetyl, alkyloxycarbonyl, substituted alkyloxycarbonyl, aryloxycarbonyl, substituted aryloxycarbonyl, alkylaminocarbonyl, substituted alkylaminocarbonyl, arylaminocarbonyl, substituted arylaminocarbonyl, amidines, substituted amidines, alkylamidines, substituted alkylamidines, arylamidines, substituted arylamidines, monosaccharide, substituted monosaccharide, disaccharide, substituted disaccharide, trisaccharide, substituted trisaccharide, oligosaccharide, substituted oligosaccharide, phosphorylated saccharides, substituted phosphorylated saccharides, arylacyl, substituted arylacyl, alkylene, substituted alkylene, heterocyclic, substituted heterocyclic, polycyclic, substituted polycyclic and the following three structures V-2:

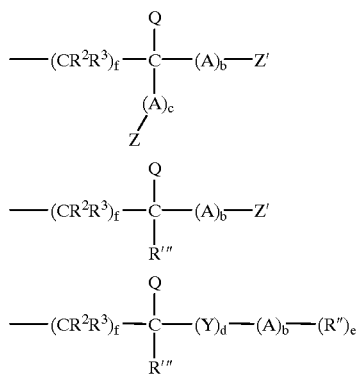

wherein b, c and d are 0 or 1; f is 0, 1, 2, 3, 4, 5., 6, 7, 8, 9, 10; each Y as is defined above; when d is 1 and b is 0 and Y is N, e is 2 or 3; when d is 1 and b is 0 and Y is O, e is 1; when d is 1 and b is 0 and Y is S, e is 1 or 2; A is as defined above; Q is selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, substituted polycyclic; R'" and Q together may form a cyclic structure; any of the $R^3$'s and Q together may form a cyclic structure; any of the $R^3$'s and R'"'s together may form a cyclic structure; Z and Z' may be the same or different and are independently selected from OH, —O⁻X⁺, OR", NH₂, NHR", N(R")₂; R" is selected from alkyl, branched alkyl, aryl, aralkyl, alkaryl, cycloalkyl, substituted alkyl, substituted cycloalkyl substituted aryl, substituted aralkyl, substituted alkaryl; R'" is selected from alkyl, branched alkyl, aryl, aralkyl, alkaryl, cycloalkyl, substituted alkyl, substituted cycloalkyl, substituted aryl, substituted aralkyl, substituted alkaryl, and an amino acid side chain; where CH—CH or CH₂—CH₂ bonds exist the level of unsaturation may be increased by removing one or more hydrogen atoms from each carbon atom participating in the CH—CH or CH₂—CH₂ bonds; X⁺ is selected from H⁺ or a physiologically acceptable cation; and physiologically acceptable salts of any of the foregoing compounds.

2. A composition according to claim 1 wherein the tastand is selected from the group consisting of:
  1. L-aspartyl-L-phenylalanine,
  2. L-β-aspartyl-L-phenylalanine,
  3. L-aspartyl-L-tyrosine,
  4. N-(L-aspartyl)-o-aminobenzoic acid,
  5. N-(L-aspartyl)-p-aminobenzoic acid,
  6. N-(p-cyanophenyl-carbamoyl)-L-aspartyl-L-phenylalanine,
  7. N-(phenylcarbamoyl)-L-aspartyl-L-phenylalanine,
  8. N-(L-aspartyl)-p-aminobenzenesulfonic acid,
  9. N-(aminomalonyl)-p-aminobenzenesulfonic acid,
  10. amino ethane phosphoric acid,
  11. N-[N-(p-cyanophenylcarbamoyl)-L-aspartyl]-p-aminobenzenesulfonic acid,
  12. N-(L-aspartyl)-1-aminocyclopentane-1-carboxylic acid,
  13. N-(L-aspartyl)-1-aminocyclopropane-1-carboxylic acid,
  14. N-(L-aspartyl)-1-aminocyclooctane-1-carboxylic acid,
  15. N-(L-aspartyl)-1-aminocyclohexane-1-carboxylic acid,
  16. N-(L-aspartyl)-2-aminocyclopentane-1-carboxylic acid, and physiologically acceptable salts of the foregoing compounds.

3. A composition according to claim 1 wherein the sweetener imparting an undesirable taste to the eatable is selected from the group consisting of:
  L-aspartyl-L-phenylalanine methyl ester (Aspartame®), saccharin, L-aspartyl-D-alanine-N-(2,2,4,4-tetramethyl thiatan-3yl)amide (Alitame®), 1,6-dichloro-1,6-dideoxy-β-D-fructofuranoysl-4-chloro-4-deoxy-α-D-galactopyranoside (Sucralose®), 6-methyl-1,2,3-oxathiazin-4(3H)-one 2,2-dioxide (Acesulfame®), 6-methyl-1,2,3-oxathiazin-4(3H)-one 2,2-dioxide (Acesulfame-K®), cyclohexylsulfamic acid (cyclamate®),N-(l-aspartyl) N'(2,2,5,5, tetramethyl-cyclopentanoyl)1,1-diaminoethane, guanadinium class sweeteners, dihydrochalcone class sweeteners, stevioside, miraculin, thaumatin, glycerin, high fructose corn syrup, and physiologically acceptable salts thereof.

4. A composition according to claim 1 wherein the eatable comprises L-aspartyl-L-phenylalanine methyl ester.

5. A composition according to claim 4 wherein the tastand is selected from the group consisting of L-aspartyl-L-phenylalanine, L-aspartyl-L-tyrosine, and physiologically acceptable salts thereof.

6. A composition according to claim 1 wherein the eatable is a sweetened drink.

7. A composition according to claim 6 wherein the eatable comprises L-aspartyl-L-phenylalanine methyl ester.

8. A composition according to claim 6 wherein the tastand is selected from the group consisting of L-aspartyl-L- phenylalanine, L-aspartyl-L-tyrosine and physiologically acceptable salts thereof.

9. A composition according to claim 7 wherein the tastand is selected from the group consisting of L-aspartyl-L-phenylalanine, L-aspartyl-L-tyrosine and physiologically acceptable salts thereof.

10. A composition according to claim 1 wherein the eatable comprises 6-methyl-1,2,3-oxathiazin-4(3H)-one 2,2-dioxide potassium salt (Acesulfame-K®).

11. A composition according to claim 10 wherein the tastand is selected from the group consisting of L-aspartyl-L-phenylalanine, L-aspartyl-L-tyrosine and physiologically acceptable salts thereof.

12. A composition according to claim 1 wherein the eatable comprises glycerin.

13. A composition according to claim 12 wherein the tastand is selected from the group consisting of L-aspartyl-L-phenylalanine, L-aspartyl-L-tyrosine and physiologically acceptable salts thereof.

14. A composition comprising a diet soft drink sweetened with L-aspartyl-L-phenylalanine methyl ester and a sufficient amount of a tastand selected from the group consisting of L-aspartyl-L-phenylalanine, or a physiologically acceptable salt thereof, to at least reduce the undesirable taste associated with the L-aspartyl-L-phenylalanine methyl ester.

15. A composition according to claim 14 where the undesirable taste is selected from the group consisting of an undesireable lingering taste and an undesirable lingering sweet taste.

16. A composition according to claim 14 wherein the diet soft drink is diet Pepsi Cola®.

17. A composition according to claim 15 wherein the diet soft drink is diet Pepsi Cola®.

18. A composition according to claim 14 wherein the diet soft drink is diet Coca-Cola®.

19. A composition according to claim 15 wherein the diet soft drink is diet Coca-Cola®.

20. A composition according to claim 1 wherein the eatable comprises a compound selected from the group consisting of saccharin and physiologically acceptable salts thereof.

21. A method of making an eatable composition according to claim 1 from an eatable which comprises a sweetener which imparts an undesirable taste to the eatable, which method comprises the step of incorporating in, or ingesting with, said eatable at least one tastand in a substantially tasteless amount of from about 0.0000001 to about 300% by weight, based on the weight of the eatable, which amount is sufficient to reduce said undesirable taste, said tastand being selected from the group consisting of compounds which are substantially tasteless in the amount used and have the structure V-1:

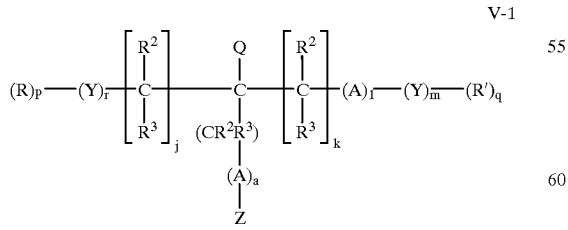

wherein a, r, l, and m are 0 or 1; n, j, and k are 0, 1, 2, or 3; each $R^2$ and $R^3$, which may be the same or different, is independently selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, and substituted polycyclic; each Y which may be the same or different, is independently selected from the group consisting of N, O, and S; when r is 1 and Y is N, p is 2 or 3; when m is 1 and Y is N, q is 2 or 3; when r is 1 and Y is O, p is 1; when m is 1 and Y is O, q is 1; when r is 1 and Y is S, p is 1 or 2; when m is 1 and Y is S, q is 1 or 2; A is selected from the group consisting of H, C=O, O=S=O, S=O, O=P(H)OH, O=P(OH)$_2$, and O=B(H)OH; Q is selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, and substituted polycyclic; each R, which may be the same or different when p>1, and each R', which may be the same or different when q>1, is independently selected from the group consisting of H, alkyl, substituted alkyl, dialkyl, substituted dialkyl, aralkyl, substituted aralkyl, aryl, substituted aryl, diaryl, substituted diaryl, acyl, substituted acyl, cycloalkyl, substituted cycloalkyl, benzoyl, substituted benzoyl, trifluoroacetyl, alkyloxycarbonyl, substituted alkyloxycarbonyl, aryloxycarbonyl, substituted aryloxycarbonyl, alkylaminocarbonyl, substituted alkylaminocarbonyl, arylaminocarbonyl, substituted arylaminocarbonyl, amidines, substituted amidines, alkylamidines, substituted alkylamidines, arylamidines, substituted arylamidines, monosaccharide, substituted monosaccharide, disaccharide, substituted disaccharide, trisaccharide, substituted trisaccharide, oligosaccharide, substituted oligosaccharide, phosphorylated saccharides, substituted phosphorylated saccharides, arylacyl, substituted arylacyl, alkylene, substituted alkylene, heterocyclic, substituted heterocyclic, polycyclic, substituted polycyclic and the following three structures V-2:

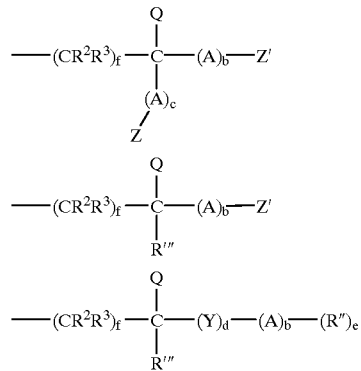

wherein b, c and d are 0 or 1; f is 0, 1, 2, 3, 4, 5, 6, 7, 8, 9, 10; each Y is defined above; when d is 1 and b is 0 and Y is N, e is 2 or 3; when d is 1 and b is 0 and Y is O, e is 1; when d is 1 and b is 0 and Y is S, e is 1 or 2; A is as defined above; Q is selected from the group consisting of H, alkyl, substituted alkyl, alkylene, substituted alkylene, branched alkyl, substituted branched alkyl, branched alkylene, substituted branched alkylene, aryl, substituted aryl, aralkyl, substituted aralkyl, cycloalkyl, substituted cycloalkyl, acyl, substituted acyl, benzoyl, substituted benzoyl, alkoxy, substituted alkoxy, aryloxy, substituted aryloxy, trifluoromethyl, halogen, cyano, heterocyclic, substituted heterocyclic, polycyclic, substituted polycyclic; R''' and Q together may form a cyclic structure; any of the $R^3$'s and Q together may form a cyclic structure; any of the $R^3$'s and R''''s together may form a cyclic structure; Z and Z' may be the same or different and are independently selected from OH, —$O^+X^+$, OR'', $NH_2$, NHR'', $N(R'')_2$; R'' is selected from alkyl, branched alkyl, aryl, aralkyl, alkaryl, cycloalkyl, substituted alkyl, substituted cycloalkyl substituted aryl, substituted aralkyl, substituted alkaryl; R''' is selected from alkyl, branched alkyl, aryl, aralkyl, alkaryl, cycloalkyl, substituted alkyl, substituted cycloalkyl, substituted aryl, substituted aralkyl, substituted alkaryl, and an amino acid side chain; where CH—CH or $CH_2$—$CH_2$ bonds exist the level of unsaturation may be increased by removing one or more hydrogen atoms from each carbon atom participating in the CH—CH or $CH_2$—$CH_2$ bonds; $X^+$ is selected from $H^+$ or a physiologically acceptable cation; and physiologically acceptable salts of any of the foregoing compounds.

22. A method in accordance with claim 21 wherein the tastand is selected from the group consisting of:

1. L-aspartyl-L-phenylalanine,
2. L-β-aspartyl-L-phenylalanine,
3. L-aspartyl-L-tyrosine,
4. N-(L-aspartyl)-o-aminobenzoic acid,
5. N-(L-aspartyl)-p-aminobenzoic acid,
6. N-(p-cyanophenyl-carbamoyl)-L-aspartyl-L-phenylalanine,
7. N-(phenylcarbamoyl)-L-aspartyl-L-phenylalanine,
8. N-(L-aspartyl)-p-aminobenzenesulfonic acid,
9. N-(aminomalonyl)-p-aminobenzenesulfonic acid,
10. amino ethane phosphoric acid,
11. N-[N-(p-cyanophenylcarbamoyl)-L-aspartyl]-p-aminobenzensulfonic acid,
12. N-(L-aspartyl)-1-aminocyclopentane-1-carboxylic acid,
13. N-(L-aspartyl)-1-aminocyclopropane-1-carboxylic acid,
14. N-(L-aspartyl)-1-aminocyclooctane-1-carboxylic acid,
15. N-(L-aspartyl)-1-aminocyclohexane-1-carboxylic acid,
16. N-(L-aspartyl)-2-aminocyclopentane-1-carboxylic acid, and physiologically acceptable salts of the foregoing.

23. A method in accordance with claim 21 wherein the sweetener imparting an undesirable taste to the eatable is selected from the group consisting of:

L-aspartyl-L-phenylalanine methyl ester (Aspartame®), saccharin, L-aspartyl-D-alanine-N-(2,2,4,4-tetramethyl thiatan-3yl)amide (Alitame®), 1,6-dichloro-1,6-dideoxy-β-D-fructofuranoysl-4-chloro-4-deoxy-α-D-galactopyranoside (Sucralose®), 6-methyl-1,2,3-oxathiazin-4(3H)-one 2,2-dioxide (Acesulfame®), 6-methyl-1,2,3-oxathiazin-4(3H)-one 2,2-dioxide (Acesulfame-K®), cyclohexylsulfamic acid (cyclamate), N-(1-aspartyl)-N'(2,2,5,5,tetramethylcyclopentanoyl)1,1-diaminoethane, guanadinium class sweeteners, dihydrochalcone class sweetener, stevioside, miraculin, thaumatin, glycerin, high fructose corn syrup, and physiologically acceptable salts thereof.

24. A method in accordance with claim 21 wherein the eatable comprises L-aspartyl-L-phenylalanine methyl ester.

25. A method in accordance with claim 24 wherein the tastand is selected from the group consisting of L-aspartyl-L-phenylalanine, L-aspartyl-L-tyrosine and physiologically acceptable salts thereof.

26. A method in accordance with claim 21 wherein the eatable is a sweetened drink.

27. A method in accordance with claim 26 wherein the drink is sweetened with L-aspartyl-L-phenylalanine methyl ester.

28. A method in accordance with claim 26 wherein the tastand is selected from the group consisting of L-aspartyl-L-phenylalanine, L-aspartyl-L-tyrosine and physiologically acceptable salts thereof.

29. A method in accordance with claim 27 wherein the tastand is selected from the group consisting of L-aspartyl-L-phenylalanine, L-aspartyl-L-tyrosine and physiologically acceptable salts thereof.

30. A method in accordance with claim 21 wherein the eatable comprises 6-methyl-1,2,3-oxathiazin-4(3H)-one 2,2-dioxide potassium salt (Acesulfame-K®).

31. A method in accordance with claim 30 wherein the tastand is selected from the group consisting of L-aspartyl-L-phenylalanine, L-aspartyl-L-tyrosine and physiologically acceptable salts thereof.

32. A method in accordance with claim 21 wherein the eatable comprises glycerin.

33. A method in accordance with claim 21 wherein the tastand is selected from the group consisting of L-aspartyl-L-phenylalanine, L-aspartyl-L-tyrosine and physiologically acceptable salts thereof.

34. A method of providing an improved tasting diet soft drink sweetened with L-aspartyl-L-phenylalanine methyl ester, said method comprising the steps of incorporating in, or ingesting with, said soft drink a sufficient amount of a tastand selected from the group consisting of L-aspartyl-L-phenylalanine, or a physiologically acceptable salt thereof; to reduce or remove the undesirable taste associated with the L-aspartyl-L-phenylalanine methyl ester.

35. A method according to claim 34 where the undesirable taste is selected from the group consisting of an undesireable lingering taste and an undesirable lingering sweet taste.

36. A method in accordance with claim 34 wherein the diet soft drink is diet Pepsi Cola®.

37. A method in accordance with claim 35 wherein the diet soft drink is diet Pepsi Cola®.

38. A method in accordance with claim 34 wherein the diet soft drink is diet Coca Cola®.

39. A method in accordance with claim 35 wherein the diet soft drink is diet Coca Cola®.

40. A method in accordance with claim 21 wherein the eatable comprises a compound selected from the group consisting of saccharin and physiologically acceptable salts thereof.

* * * * *